United States Patent
Kake et al.

(10) Patent No.: US 7,290,213 B2
(45) Date of Patent: Oct. 30, 2007

(54) METHOD FOR PERUSING INFORMATION

(75) Inventors: Tomokazu Kake, Tokyo (JP); Yousuke Kimoto, Kanagawa (JP); Tadashi Nakamura, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 623 days.

(21) Appl. No.: 10/177,399

(22) Filed: Jun. 21, 2002

(65) Prior Publication Data

US 2003/0043185 A1 Mar. 6, 2003

(30) Foreign Application Priority Data

Jun. 22, 2001 (JP) ............................. 2001-190234
Mar. 8, 2002 (JP) ............................. 2002-062935

(51) Int. Cl.
G06F 3/048 (2006.01)
G06F 7/06 (2006.01)
G06F 17/30 (2006.01)

(52) U.S. Cl. ...................... 715/738; 715/768; 715/848; 707/3

(58) Field of Classification Search ................ 715/738, 715/739, 766, 767, 768, 782, 783, 848, 862, 715/822, 823, 808, 838, 839, 784, 785, 786; 707/3

See application file for complete search history.

(56) References Cited

U.S. PATENT DOCUMENTS

| 5,548,699 | A | | 8/1996 | Ishida et al. |
| 5,550,969 | A | * | 8/1996 | Torres et al. ................ 715/787 |
| 5,678,015 | A | * | 10/1997 | Goh ............................ 715/782 |
| 5,680,563 | A | * | 10/1997 | Edelman ...................... 715/835 |
| 5,752,023 | A | | 5/1998 | Choucri et al. |
| 5,808,613 | A | | 9/1998 | Marrin et al. |
| 5,819,235 | A | | 10/1998 | Tamai et al. |

(Continued)

FOREIGN PATENT DOCUMENTS

JP 3113672 A 5/1991

(Continued)

OTHER PUBLICATIONS

Keahey, T.A. "The Generalized Detail-In-Context Problem." Proceedings of the IEEE Symposium on Information Visualization. IEEE Visualization. pp. 44-51. Oct. 1998.*

(Continued)

*Primary Examiner*—John Cabeca
*Assistant Examiner*—Blaine Basom
(74) *Attorney, Agent, or Firm*—Lerner, David, Littenberg, Krumholz & Mentlik, LLP

(57) ABSTRACT

An information perusal program arranges information within a virtual space, where the information is arranged in uniquely specified storage positions. The information perusal program detects a position specified arbitrarily by the user within the virtual space. The information perusal program then detects an arrangement position within the virtual space in an area having a virtual spread in relation to the specified position and acquires information from the storage position corresponding to the arrangement position. Accordingly, the user is able to easily peruse information whose storage position is uniquely specified, such as, for example, a site on the Internet, a local folder and/or file, and so forth without performing complex and complicated input operations in order to specify the storage position. In addition, it is possible to easily realize perusal information without a specific object.

51 Claims, 36 Drawing Sheets

U.S. PATENT DOCUMENTS

| | | | |
|---|---|---|---|
| 6,121,969 A | | 9/2000 | Jain et al. |
| 6,160,553 A | * | 12/2000 | Robertson et al. .......... 715/767 |
| 6,253,218 B1 | | 6/2001 | Aoki et al. |
| 6,313,855 B1 | * | 11/2001 | Shuping et al. ............. 715/854 |
| 6,433,798 B1 | * | 8/2002 | Smith et al. ................ 715/764 |

FOREIGN PATENT DOCUMENTS

| | | |
|---|---|---|
| JP | 5-303596 | 11/1993 |
| JP | 7-121565 | 5/1995 |
| JP | 7319905 A | 12/1995 |
| JP | 7325842 A | 12/1995 |
| JP | 8287086 A | 11/1996 |
| JP | 8292758 A | 11/1996 |
| JP | 9138745 A | 5/1997 |
| JP | 10187761 A | 7/1998 |
| JP | 10-307936 | 11/1998 |
| JP | 10-334119 A | 12/1998 |
| JP | 11296528 A | 10/1999 |
| JP | 2001060206 A | 3/2001 |
| JP | 2002-158598 A | 5/2002 |
| WO | WO-99/10820 A1 | 3/1999 |

OTHER PUBLICATIONS

Card et al. "The WebBook and the Web Forager: An Information Workspace for the World-Wide Web." Proceedings of the SIGCHI conference on Human Factors in computing systems. ACM Press. pp. 111-117. Apr. 1996.*

Tenev, T. Rao, R. "Managing Multiple Focal Levels in Table Lens." Proceedings of the IEEE Symposium on Information Visualization. IEEE Visualization. pp. 59-63, 122. Oct. 1997.*

Rao, R. Card, S. "The Table Lens: Merging Graphical and Symbolic Representations in an Interactive Focus+Context Visualization for Tabular Information." Proceedings of the SIGCHI conference on Human Factors in computing systems. ACM Press. 1994.*

"Information Retrieval Utilizing Text Information Visualization", IPSJ Magazine vol. 41 No. 4, Apr. 2000.

Tetsuyuki Mutuo et al., "A Proposal of WWW Browser Which Supports The Browsing Task of Information Search", Research Report of Information Processing Society of Japan, vol. 99, No. 18, pp. 43-48 (Feb. 25, 1999).

* cited by examiner

```
                <HTML>
                <HEAD>
MDn ────▶<META name="Author" CONTENT="Name">
MDf ────▶<META http-equiv="content-type" content="text/html;
                charset=shift_jis">
MDc ────▶<META channel="NEWS">
                <TITLE>PAGE FOR NEWS</TITLE>
                </HEAD>
                <BODY BGCOLOR="#FFFFFF" TEXT="#000000" LINK=
                "#0000F0" VLINK="#000080">
                                  .
                                  .
                                  .
                </BODY>
                </HTML>
```
PH

METHOD FOR PERUSING INFORMATION

CROSS-REFERENCE TO RELATED APPLICATIONS

This application claims priority from Japanese Patent Application No. 2001-190234 filed on Jun. 22, 2001, and No. 2002-062935 filed on Mar. 8, 2002, the disclosures of which are hereby incorporated by reference herein.

BACKGROUND OF THE INVENTION

The present invention relates to a method for perusing information and apparatus for the same, a method for generating information and apparatus for the same, an information generation perusal system, a recording medium having recorded thereon an information perusal program, a recording medium having recorded thereon an information generation program, the information perusal program, and the information generation program, all of which are applicable to retrieving and perusing details of, for example, a so-called Web page on the Internet, or a local file, local folder or so forth.

In recent years, connection to the Internet has been made easily and frequently, so that a user is capable of easily perusing and collecting various kinds of information by accessing various Web sites (hereinafter appropriately referred to as a Site) on the Internet.

When accessing a desired site from among a huge amount of sites existing on the Internet, the user performs operations such that the user inputs to a Web Browser, for example, a URL (Uniform Resource Locator) which is an address on the Internet, or the user traces a link address (address of another page buried in a Web Page) that is stuck on another site.

It should be noted that the above-described URL is a uniquely determined value for each Web Page on the Internet. Accordingly, if an accurate URL is ascertained and the user is capable of accurately inputting the URL on the Web Browser, the user can peruse a target Web Page (hereinafter appropriately referred to as a Page).

In addition, for example, when the user does not intend to access a specific site, but the user intends to browse by accessing various sites, namely, the user performs so-called Web-surfing, the user carries out operations such as tracing links on respective Web Pages, as the most general way.

However, for example, when the user does not know the URL of a target site, or links from another site are not available, he or she has difficulty in accessing the target site from among a huge amount of sites existing on the Internet. This problem is particularly noticed in the case of Web-surfing. Thus, it is very difficult for the user to peruse sites on which links from other sites are not stuck by performing Web-surfing.

In addition, when the user accesses the target site, it is very complicated and inefficient for the user to repeat operations such as inputting a URL every time, tracing a link from another site, or returning to the link from another site.

Further, the above-described URL is comprised of a plurality of letters and/or numeric characters and so forth, and has inherent values in every Web page. For this reason, if the user when inputting the URL makes an input error, even though the error is only one out of that plurality of characters and/or numerical characters and so forth, the user is not capable of accessing the target site. In particular, the work of accurately inputting all of the characters and so forth of the URL may be burdensome for the user who is unused to manipulating the keyboard.

SUMMARY OF THE INVENTION

The present invention has been proposed in consideration of the above-mentioned problems, and an object of the present invention is to provide a method for perusing information and apparatus for the same, a method for generating information and apparatus for the same, an information generation perusal system, a recording medium having recorded thereon an information perusal program, a recording medium having recorded thereon an information generation program, the information perusal program, and the information generation program, all of which enable easy perusing of information whose storage position is uniquely specified, such as a Web site on the Internet, a local folder and/or local file and so forth, without performing complicated input operations in order to specify the storage position. In addition, the present invention enables a user to easily realize perusal even in the case where a user does not intend to perusal specific information.

In the present invention, a specified position arbitrarily specified by the user is detected within a virtual space having information arranged in uniquely set storage positions; an arrangement position of the information within the virtual space in an area having a virtual spread in relation to the specified position is detected; and the information from the storage position corresponding to the detected arrangement position is acquired to indicate such information.

In addition, according to the present invention, information arranged in uniquely set storage positions is collected and arranged within a virtual space. The information within the virtual space is generated as perusal information used at the time of perusal.

Namely, in the present invention, information whose storage position is uniquely specified is arranged within a virtual space in which a position of the information is specified within the virtual space; an arrangement position of the information within the virtual space in an area having a virtual spread in relation to the specified position is detected; and the information from the storage position corresponding to the detected arrangement position is acquired. For this reason, the user, when acquiring information, does not need to specify directly the storage position. In addition, the user is able to acquire information without accurately specifying a storage position.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing the invention in practice.

DETAILED DESCRIPTION

Figure 1:
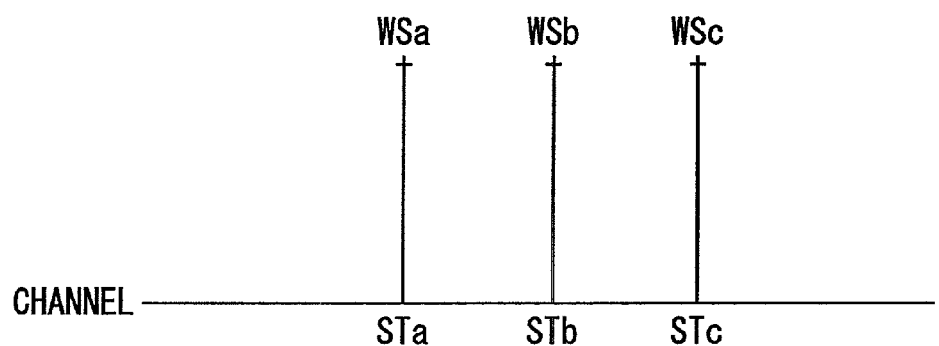
FIG. 1 is a view used for explanation of a site arranged within a channel.

Various embodiments of the present invention will be described with reference to the accompanying drawings. It is to be noted that the same or similar reference numerals are applied to the same or similar parts and elements throughout the drawings, and the description of the same or similar parts and elements therefore will be omitted or simplified.

An embodiment of the present invention, as one example of information to be perused, exemplifies a Web site existing on the Internet.

Figure 2:
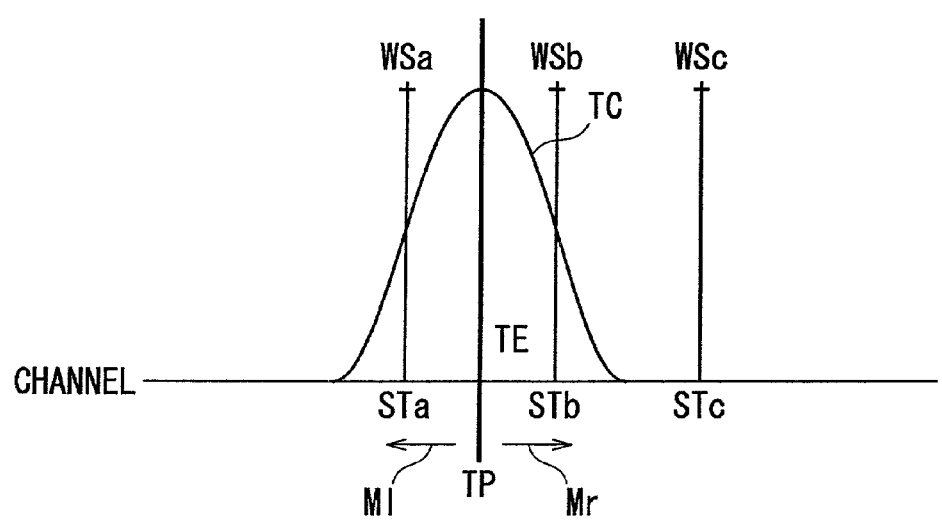
FIG. 2 is a view used for explanation of a tuning position within the channel and its analog-based spread.

In the present embodiment, respective sites existing on the Internet, as illustrated in FIG. 1 and FIG. 2, are arranged on a virtual space. FIG. 1 and FIG. 2 exemplify three sites WSa, WSb, and WSc arranged within a certain virtual space, and indicate arrangement positions of those three sites WSa, WSb and WSc within the virtual space as STa, STb and STc within the drawings.

Respective sites existing on the Internet are classified according to the concept of channels. The virtual space illustrated in FIG. 1 and FIG. 2 corresponds to one channel. In the following description, respective arrangement positions STa, STb and STc of the three sites WSa, WSb, and WSc within one channel are referred to as within-channel site positions. These respective within-channel site positions STa, STb and STc correspond to URLs of respective sites WSa, WSb, and WSc of those respective positions. Here, it is assumed that the URLs of respective sites WSa, WSb, and WSc corresponding to respective within-channel site positions STa, STb and STc are those of respective top pages. Of course, it is alternatively possible that the URLs of respective sites WSa, WSb, and WSc are also those belonging to another Web page other than the top page. It should be noted that, hereinafter, in the case of describing a site without specifying any site among respective sites WSa, WSb, and WSc, only site WS is simply used, similarly in the case of describing a site position without specifying any positions among respective within-channel site positions STa, STb and STc, only within-channel site position ST is simply used.

The above-described channel is prepared by one or a plurality of channels. It can be noted that a channel is comparable to respective directories of layered directories prepared at, for example, a general retrieval site. In this case, each within-channel site position ST is established in relation to each site WS that is classified for each directory (namely, for each channel).

In addition, similar to the concept of an additional registration for a folder structure, such as a so-called "favorite" or "bookmark" of general Web browsers, it is also possible for a channel to be generated depending on the taste (preference) of the user. In this case, each within-channel site position ST in relation to each site WS is established, where respective sites WS are additionally registered within respective folders (namely, respective channels). The channel responding to the taste of the user is generated by a client terminal or a channel service provision site based on an input from the user.

It is also suitable that the channel is that which depends on, for example, the kind of contents that each site WS on the Internet provides. As kinds of contents that respective sites provide, "car", "sports", "weather", "music", "gourmet", "news", "game" and so forth can be cited.

Since the number of channels and classification are one example, it is alternatively possible that the entire Internet may be one channel, and the classification of channels is not limited to the above-described example.

Further, it is possible for the arrangement interval (interval of within-channel site position) of each site within a channel to be whichever interval of a fixed interval or arbitrary interval. In addition, it is possible for the arrangement order of respective sites within a channel to be a registration order of the respective sites, or an order in which respective site names are arranged in the order of the Japanese syllabary or alphabetical order or so forth. Details of specific processing for generating the channel will be described later.

Each site within a channel can be perused by specifying a desired position within the channel. Namely, the user, when perusing respective sites existing on the Internet, specifies the desired position within the channel by the tuning position TP as illustrated in FIG. 2 without directly inputting a URL or without tracing the link. Of course, the user is also capable of perusing another page by tracing the link from the Web page he or she is perusing.

Here, the tuning position TP is movable in the direction of arrow Mr or Ml within the channel in response to the operation of a predetermined operating means by the user, and the distance or moving speed of the tuning position TP can be arbitrarily set. Accordingly, when the user moves the tuning position TP by operating the predetermined operating means, the accessed site WS changes accompanying with movement of the tuning position TP. It is to be noted that a specific example of the predetermined operating means for moving the tuning position TP within the channel will be described later.

The tuning position TP, as expressed by a tuning curve TC and a tuning area TE surrounded by the tuning curve TC illustrated in FIG. 2, has a virtual spread (for example, Gaussian distribution-based spread) within the channel. The tuning area TE is an area in which information of each site WS corresponding to all within-channel site positions ST included in the internal section thereof is acquired simultaneously. Accordingly, even though the user does not match accurately the tuning position TP with the within-channel site position, it is possible to peruse simultaneously all sites WS corresponding to the within-channel site positions ST included in the tuning area TE. In the case of the example of FIG. 2, since the within-channel site positions STa and STb are included in the tuning area TE, the user is able to peruse simultaneously both the sites WSa and WSb corresponding to both of the within-channel site positions STa and STb. Namely, the user can specify the site by operation of the tuning position and peruse the site. In addition, the user can also perform perusal such as Web-surfing without a specific site as an object of perusal by carrying out only an operation to move the tuning position TP.

Further, the relative location between the within-channel site position ST and the tuning position TP that exists within the tuning area TE is used as a control parameter of a display condition in the case of displaying the site on a monitor screen. Namely, the display condition of the site on the monitor screen is controlled in accordance with the above-described relative location. Here, as shown FIG. 1 or FIG. 2, in the case where respective sites are arranged within a one-dimensional channel space, the direction and/or distance of the within-channel site position ST in relation to the above-described tuning position TP can be obtained as the above-described relative location. For this reason, when a plurality of sites WS are simultaneously displayed on the monitor screen for example, a display condition of respective sites is changed depending on the direction and/or distance of the within-channel site position ST in relation to the tuning position TP. Accordingly, the user can surmise in which direction each site is arranged in relation to the tuning position TP, or which site WS is close to the tuning position TP, on the basis of the differences of the display condition of those plurality of sites WS. It should be noted that, for example, in the case of expressing an absolute value of distance between the tuning position TP and the within-channel site position ST by x, it is possible to use a value obtained by computing the equation of $\exp(-x^2)$ as a control parameter depending on distance. Details of the control of the display condition depending on the direction and/or distance of the within-channel site position ST in relation to the above-described tuning position TP will be described later.

Specific Display Example of Page

A page, which an information perusal program (hereinafter, simply referred to as Browser) of the present invention displays on a monitor screen will be explained while citing specific example.

Figure 3:
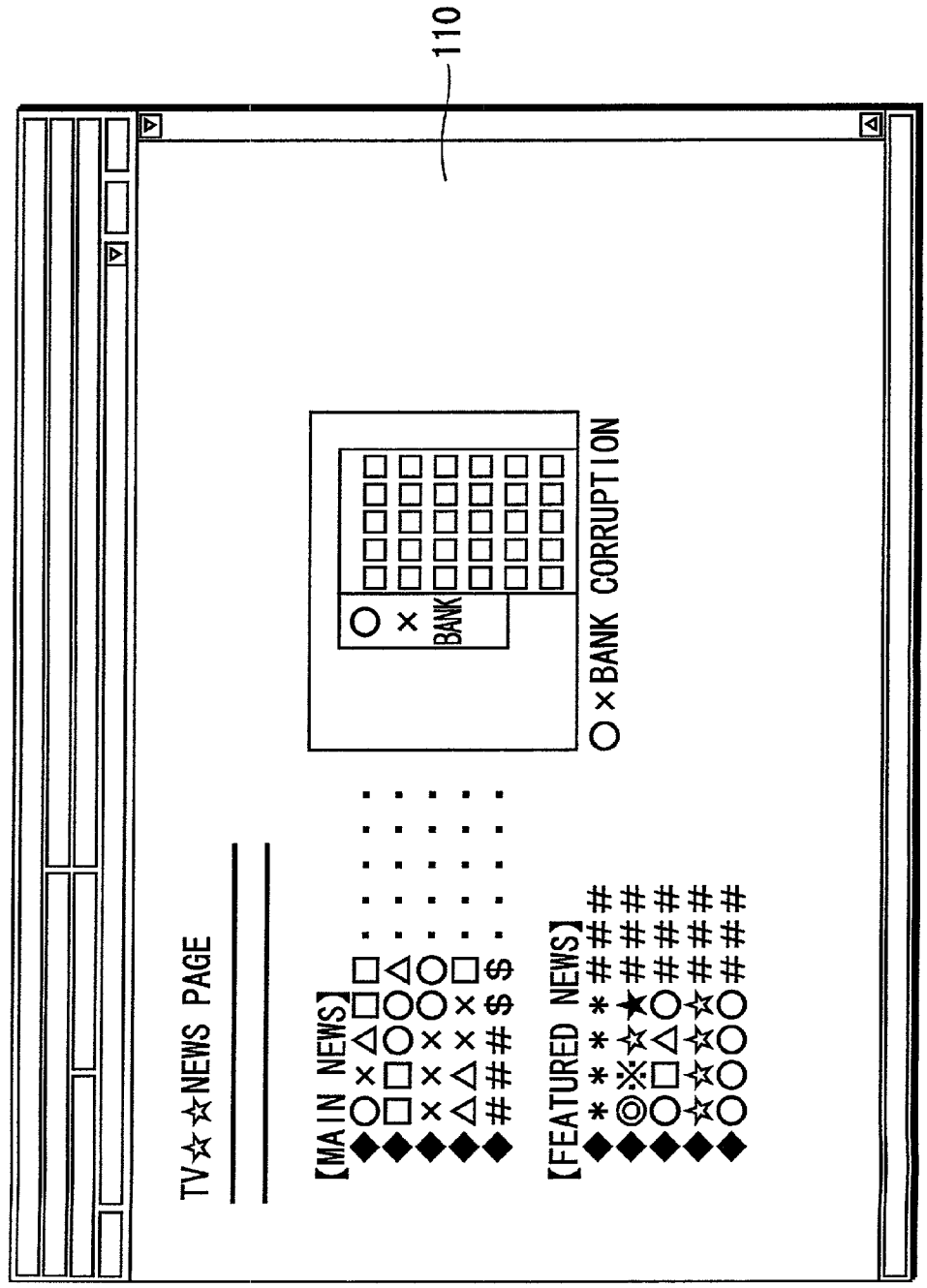
FIG. 3 is a view illustrating an exemplary site classified into news.
Figure 4:
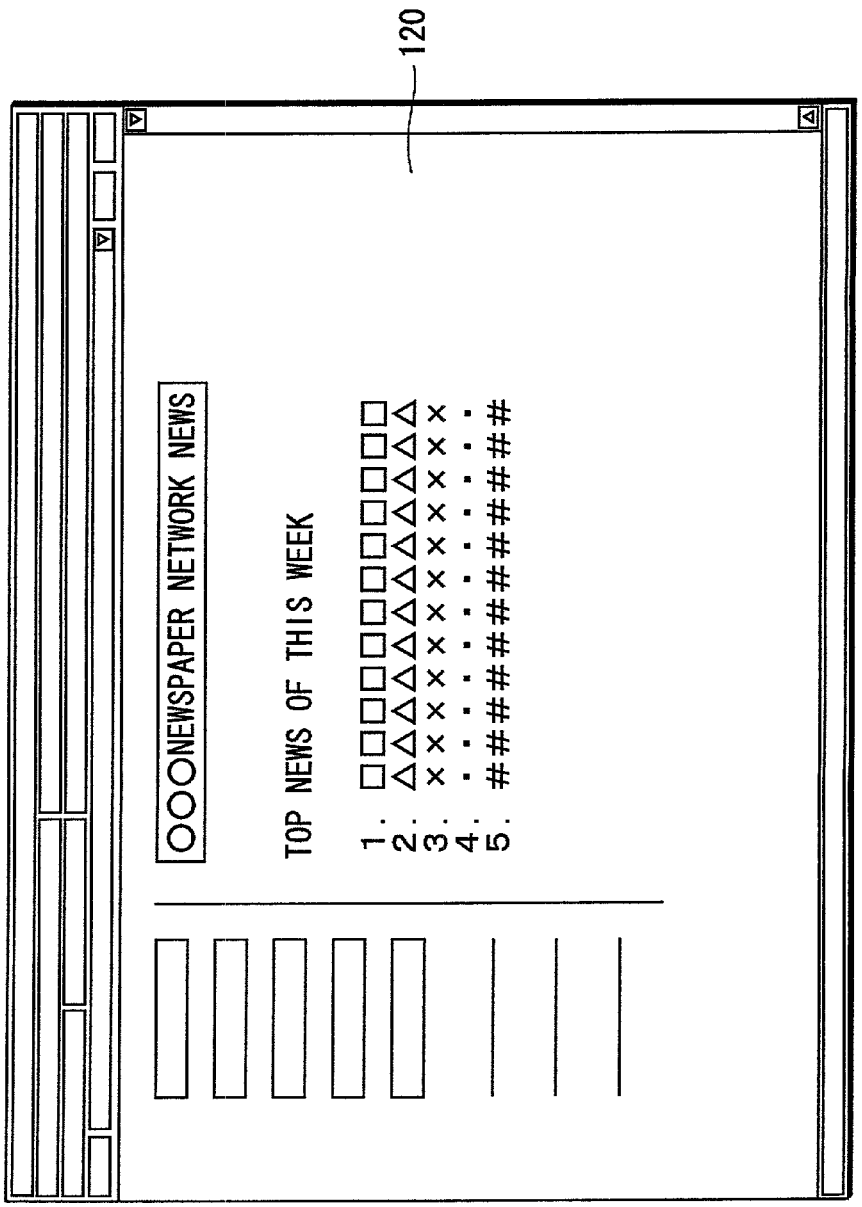
FIG. 4 is a view illustrating another exemplary site classified into news.

FIG. 3 illustrates a display example in the case where only top the page 110 of site WSa corresponding to the within-channel site position STa of FIG. 1 and FIG. 2 is displayed on a monitor screen. In addition, FIG. 4 illustrates a display example in the case where only the top page 120 of site WSb corresponding to the within-channel site position STb is displayed on the monitor screen. It should be noted that the contents provided by these sites WSa and WSb are classified into the genre of "news", for example. Accordingly, a classification of the channel in which these sites WSa and WSb are included is "news".

Here, as illustrated in FIG. 2, for the case that the within-channel site positions STa, STb are included in the tuning area TE of the tuning position TP, the browser displays both the site WSa and the site WSb respectively corresponding to the within-channel site positions STa, STb on the monitor screen simultaneously.

Figure 5:
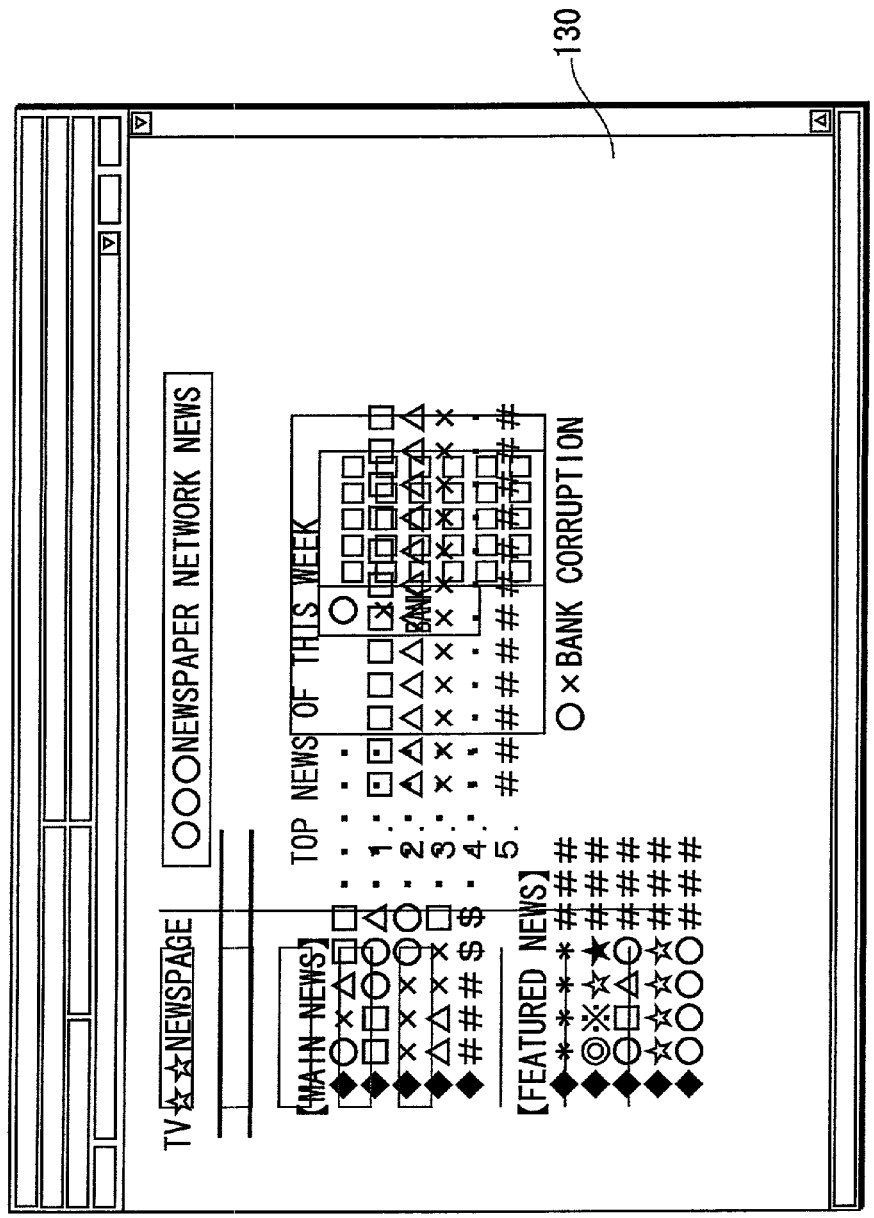
FIG. 5 is a view illustrating a display example, where two sites classified into news undergo translucence synthesis depending on the relative location between those site positions and tuning positions.

At this time, the browser displays on the monitor screen both the sites WSa, WSb under the display condition depending on the relative location between the tuning position TP and the respective within-channel site positions STa, STb. In more specific description, the browser displays both the sites WSa, WSb on the monitor screen while providing translucence synthesis to both the sites WSa, WSb, where the more distance increases between the tuning position TP and the respective within-channel site positions STa, STb, the smaller is the degree of translucence. Namely, the browser, for example, as illustrated in FIG. 5, displays a synthesized image 130 formed so that both top pages 110, 120 of the sites WSa, WSb are overlapped while making those translucent depending on the distance between the tuning position TP and the respective within-channel site positions STa, STb. It should be noted that the term "degree of translucence" here is a so-called alpha value expressed by a real value between "0" to "1", where when the alpha value is 1 (maximum value), the degree of translucence becomes an absolutely opaque condition, while when the alpha value is 0 (minimum value), the degree of translucence becomes an absolutely transparent condition. Accordingly, as an example of FIG. 2, when the distance between the tuning position TP and the within-channel site position STa is shorter than the distance between the tuning position TP and the within-channel site position STb, the browser displays the top page 110 of the site WSa so as to greatly adjust the degree of translucence (the degree of transparence is minimized, so that details can be seen more clearly), while the browser displays the top page 120 of the site WSb so as to adjust the degree of translucence minimally (the degree of transparence is increased). It is to be understood that, when the tuning position TP is placed in the middle of the within-channel site position STa and STb, the browser adjusts the degree of translucence of those top pages 110, 120, respectively, to the same degree. In addition, when the tuning position TP completely matches with any of the within-channel site positions ST, the browser displays the site whose degree of translucence matched with the tuning position TP adjusted to a maximum value. In addition, when the above-described respective distances are changed because the user moves the tuning position TP of FIG. 2 in the direction of arrow Mr or Ml, the browser changes the appearance of those pages while changing the degree of translucence of the respective top pages 110, 120, respectively.

Figure 6:
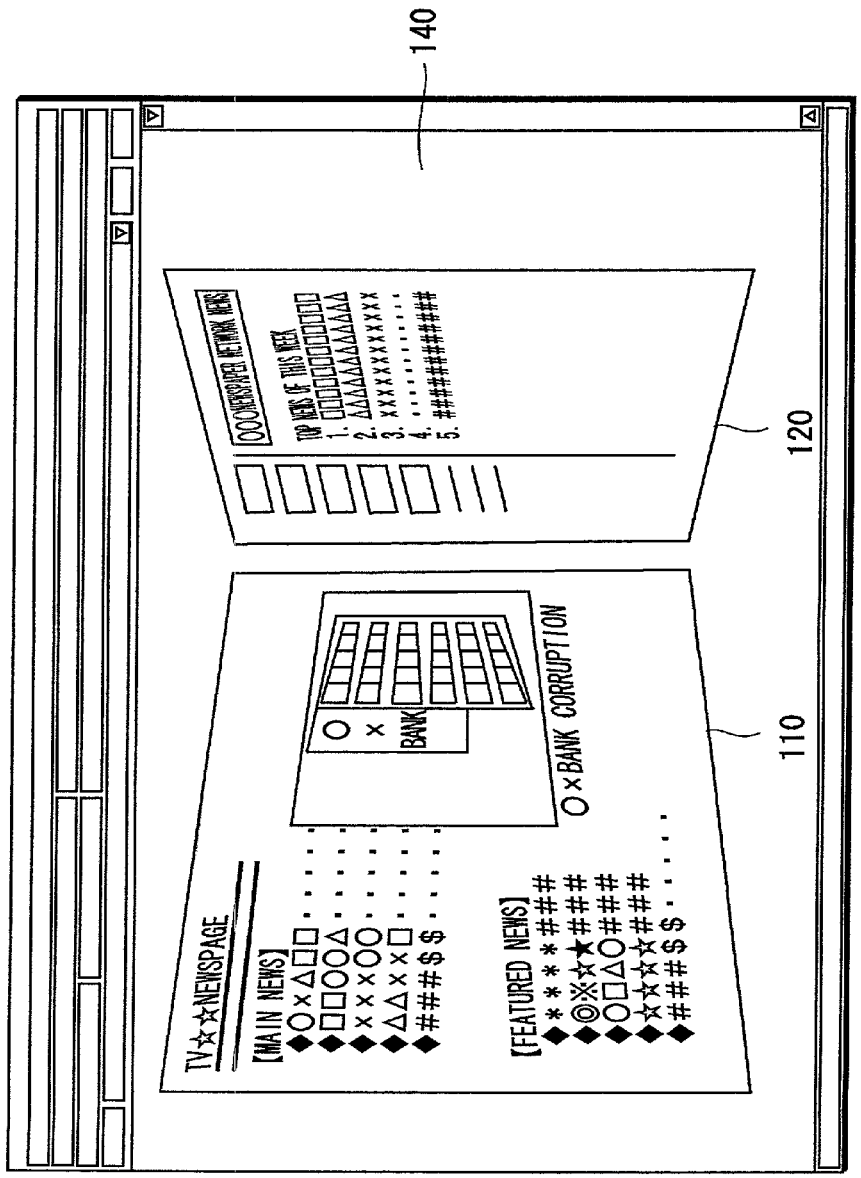
FIG. 6 is a view illustrating a display example, where two sites classified into news are arranged on the same screen depending on the relative location between those site positions and tuning positions.

It is suitable that the sites WSa, WSb may be displayed as illustrated in FIG. 6 for example. In the case of the example of FIG. 6, the browser generates the image 140 in which both top pages 110, 120 of the sites WSa, WSb are arranged alongside one another on the basis of direction and distance of the respective within-channel site positions STa, STb in relation to the tuning position TP, and displays it on the monitor screen. In addition, the browser adjusts the angle of the top pages 110, 120 of those sites WSa, WSb on the screen, where the greater the distance is between the tuning position TP and the respective within-channel site positions STa, STb, the larger is the angle. It should be noted that the above-described angle takes values from 0 degrees to 90 degrees relative to the screen. Accordingly, with respect to the example of FIG. 2, when the distance between the tuning position TP and the within-channel site position STa is shorter than the distance between the tuning position TP and the within-channel site position STb, the browser displays the top page 110 of the site WSa at a small angle (so that the contents can be seen clearly), while the browser displays the top page 120 of the site WSb at a large angle. It should be noted that when the tuning position TP is placed in the middle of the within-channel site positions STa and STb, the browser adjusts the degree of the angle of those top pages 110, 120 to be the same. In addition, when the tuning position TP is completely matched with any of the within-channel site positions ST, the browser displays the site whose degree of angle matched with the tuning position TP is adjusted to 0. In addition, when the above-described respective distances are changed because the user moves the tuning position TP of FIG. 2 in the direction of arrow Mr or Ml, the browser changes the appearance of those pages while changing the degree of angle of the respective top pages 110,120, respectively.

These displays, such as for example, FIG. 5 or FIG. 6, enable the user to peruse contents of the sites WSa, WSb simultaneously, and to recognize visually which site of the sites WSa, WSb is close to the tuning position TP, or in which direction the sites WSa, and WSb exist in relation to the tuning position TP.

It should be noted that these FIG. 5, FIG. 6 are one example. It is possible for the browser to add various kinds of effect processing, filtering processing, three-dimensional conversion processing and so forth to respective pages, thereafter overlapping the pages and/or mixing the pages other than the above-described translucence display and/or inclination display processing, in order to express the direction and/or distance to respective sites WS in relation to the tuning position TP. In addition, the browser is capable of providing a difference in the degree of translucence of respective pages depending on the direction of both sites WSa, WSb in relation to the tuning position TP. Other than that, for example, when respective sites WS included in the tuning area TE have pages with sounds (for example BGM and so forth), the browser is capable of overlapping to play those sounds. In this case, the user not only can visually peruse the overlapped two sites WS, but also can recognize the overlapped state of the sites by those sounds. In addition, the browser can express the distance from the tuning position TP to the within-channel site position ST by utilizing the loudness of the sound (namely, adjustment of the output level of the sound), and can express in which direction (right or left) the within-channel site position is in relation to the tuning position TP by utilizing stereo sound.

Other Example of Virtual Spread of Tuning Position

It is not necessary for the virtual spread state within the channel of the tuning position TP to be constant, so that it is possible to change the virtual spread state as needed. Namely, it is possible that the spread of the tuning area TE is narrower than that of example of FIG. 2 as illustrated in, for example, the tuning curve TCs and tuning area TEs of FIG. 7. Alternatively, it is possible that the spread of the tuning area TE is wider than that of example of FIG. 2 as illustrated in, for example, the tuning curve TCl and tuning area TEl of FIG. 8. It is also possible for the spread state of the tuning area TE to not have a symmetrical shape about the tuning position TP as the center, such as in FIG. 2, FIG. 7 and FIG. 8, but rather to have an asymmetrical shape. Further, it is possible for the spread state of the tuning area TE to have an asymmetrical shape only during the time period when the tuning position TP moves.

Figure 7:
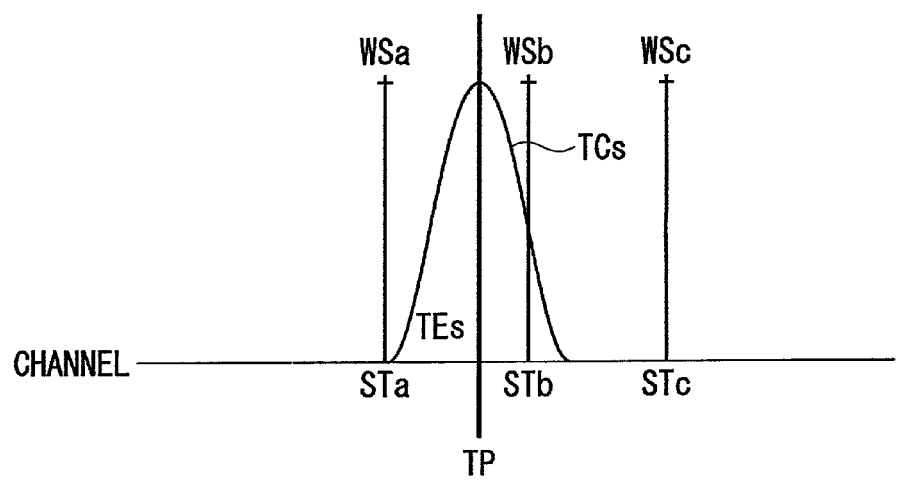
FIG. 7 is a view illustrating conditions where a tuning curve and tuning area are narrowly set.

In particular, with regard to the example of FIG. 7, when the spread of the tuning area TEs is narrowed, the number of the within-channel site positions ST included in the tuning area TEs is reduced. Accordingly, in this case, the number of sites displayed on the monitor screen is simultaneously reduced. In addition, when the tuning position TP is moved, zapping such that pages are displayed on the monitor screen by turns depending on the movement is reduced. In the case of FIG. 7, since only the within-channel site position STb is included in the tuning area TEs, the browser displays only the site WSb corresponding to the within-channel site position STb on the monitor screen. The spread of the tuning area TE can be made a minimum (for example, zero). In this case, the browser displays the site WS only when the tuning position TP is accurately matched on the within-channel site position ST, and the browser does not display another site simultaneously.

Figure 8:
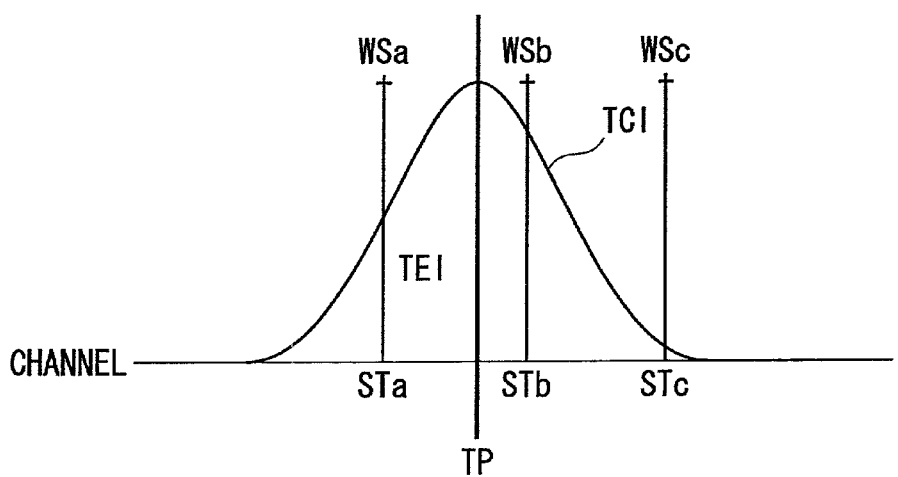
FIG. 8 is a view illustrating conditions where a tuning curve and tuning area are widely set.

In the example of FIG. 8, on the other hand, when the tuning area TEl is widened, the number of the within-channel site positions ST included in the tuning area TEl increases. Accordingly, in this case, the number of sites displayed on the monitor screen simultaneously increases. The user at this time can grasp roughly a great number of sites WS existing in the wide circumference of the tuning position TP. In the case of FIG. 8, since three within-channel site positions STa, STb, STc are included in the tuning area TEl, the browser displays respective sites WSa, WSb, WSc corresponding to those within-channel site positions STa, STb, STc simultaneously. However, in the display of this case, the user can look at the site WSb under the best conditions, and the conditions are degraded in the order of WSa, WSc.

Exemplary Display of Tuning Position and Tuning Curve

Meanwhile, if the tuning position TP, the tuning curve TC, the tuning area TE, the within-channel site positions ST and so forth illustrated in FIG. 2 are displayed on the monitor screen, the user can easily recognize the relationship between the tuning position TP as well as the tuning area TE and the respective within-channel site positions ST.

In addition, in the case of displaying the tuning position TP, the tuning curve TC, the tuning area TE, the within-channel site positions ST and so forth, the browser further displays simultaneously the access frequency of the respective sites (namely, the rating of sites), or the lapsed time after an update of respective sites (namely, the freshness of information), or so forth, whereby the user can peruse more comfortably.

Figure 9:
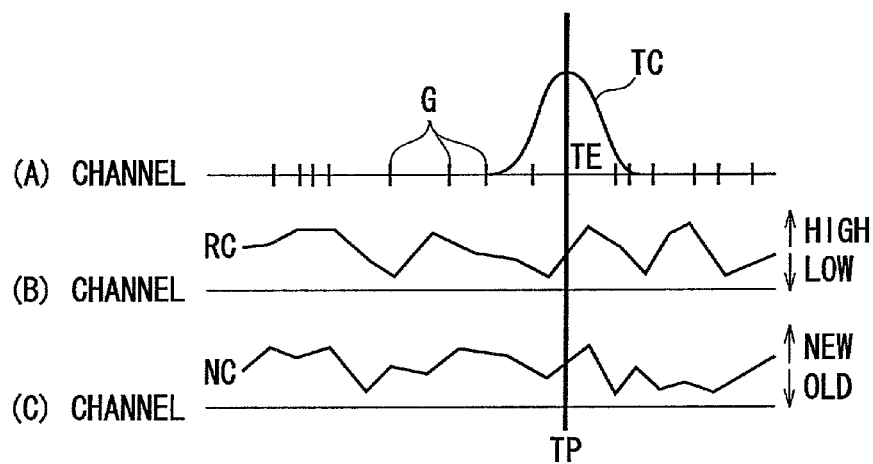
FIG. 9 is a view illustrating an operative example of the case in which a channel display as well as an access frequency and update condition of the site are displayed.

FIG. 9 illustrates a specific example of the case where a curve RC expressing the access frequency of sites and a curve NC expressing the update condition of sites are displayed with the tuning position TP, the tuning curve TC, the tuning area TE, and the within-channel site positions ST. Namely, the browser displays on the monitor screen, as illustrated in (A) of FIG. 9, scales G expressing the rough positions of respective sites within the channel, the tuning curve TC and the tuning area TE; as illustrated in (B) of FIG. 9, the curve RC expressing the access frequency of the sites; as illustrated in (C) of FIG. 9, the curve NC expressing the update condition of the sites; and further displays a line expressing the tuning position TP going through these three curves. It should be noted that it is possible for the scale G to be a line arranged with regular intervals (or irregular intervals) for simply providing a measure, or a line expressing an accurate position of respective sites WS (within-channel site positions ST). In addition, the browser is capable of displaying at rough positions within the channel, alphabetical characters depending on respective site names or numerical characters indicating the registration order together with the scale G (or instead of the scale G).

Channel Zooming

It is possible that the display illustrated at (A) of FIG. 9 may be one in which all of the sites within the channel space are included, or may be one in which a portion of the channel space is enlarged. Namely, the browser is capable of zooming in on the portion within the channel space, where the browser displays details of the portion within the channel space while gradually enlarging the portion, or the browser is capable of zooming out on the channel space, where the browser gradually displays the entire channel space from the portion within the channel space.

Figure 10:
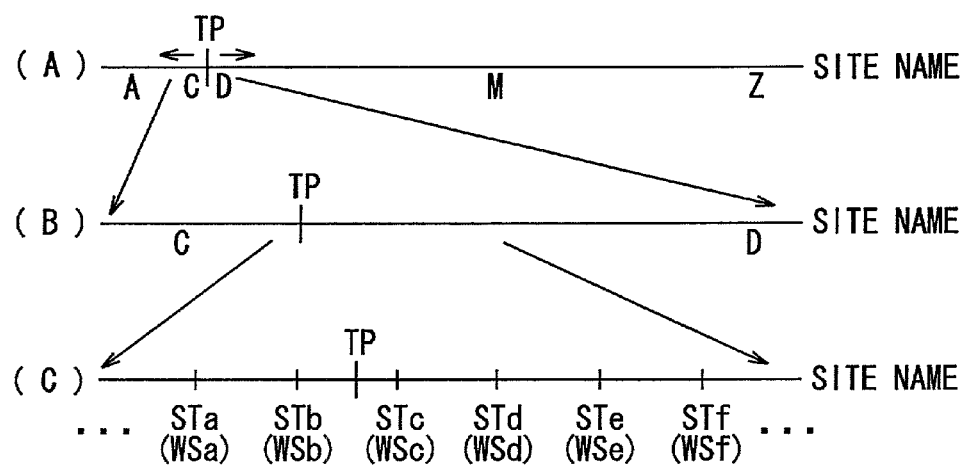
FIG. 10 is a conceptual diagram used for explaining the case of arranging respective sites within a channel in alphabetic order while zooming in a channel space to display with the channel space enlarged.

FIG. 10 is a conceptual view in which respective sites within the channel are aligned in alphabetical order of the site name and then the browser zooms in on the channel space to display a portion in detail. Namely, (A) of FIG. 10 expresses a state in which all of the sites within the channel space are displayed, and the tuning position TP exists between the letters "C" and "D" expressing the site name. (B) of FIG. 10 expresses a state in which the browser zooms in to enlarge the neighborhood of the tuning position TP, and (C) of FIG. 10 expresses a state in which the browser further zooms in on the neighborhood to enlarge it. When (C) of FIG. 10 is enlarged for display, the browser displays the within-channel site positions STa, STb, STc, . . . of the sites WSa, WSb, WSc . . . .

Thus, when the browser zooms in on the portion of the channel space, namely, when the browser enlarges the portion of the channel space for display, the user can know which neighborhood of position within the channel space is enlarged for display. In addition, the user can narrow down the range within the channel space due to the zooming-in. These enable the user to peruse comfortably the site WS within the channel.

When the browser zooms out on the channel space so that the browser gradually displays the entire channel space from the portion of the channel space, the browser, as one example, displays the channel space so as to display (B) of FIG. 10 from (C), and then displays (A) of FIG. 10 from (B) gradually.

It is to be understood that it is possible that the display according to the zooming in or the zooming out may be continuously variable without steps, or may be variable in incremental steps.

When zooming in or zooming out on the channel space is performed, the browser of the present embodiment is capable of changing the appearance of respective sites by adjusting the number of sites included in the channel space depending on the level of those zooming in or zooming out (hereinafter referred to as zooming-level).

Figure 11:
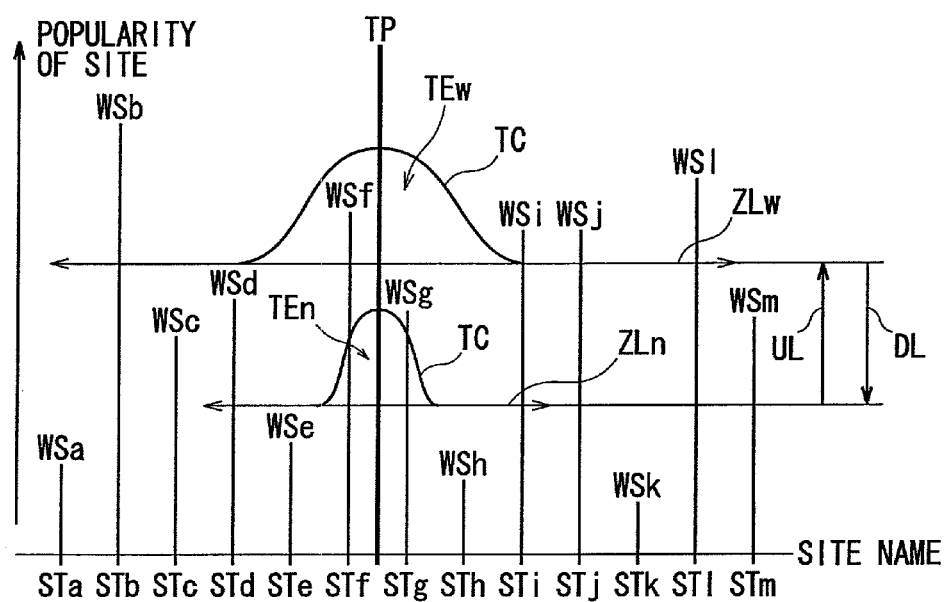
FIG. 11 is a conceptual diagram used for explaining the relation between the degree of popularity of a site (ups and downs of access frequency) and zooming-level.

FIG. 11 conceptually illustrates the relationship between the degree of popularity (ups and downs of access frequency) of the site and the zooming-level. It is noted that the horizontal axis of FIG. 11 expresses the order of respective sites where respective sites within the channel are arranged in alphabetical order of the site name. At the same time, the vertical axis expresses the degree of popularity (access frequency) of the respective sites. The sites whose access frequency is high (whose value on the vertical axis is large) are the sites that are popular. It will be appreciated that the vertical axis is not limited to the degree of popularity, and the horizontal axis is not limited to the site name.

FIG. 11 illustrates ZLn, ZLw as an exemplary zooming-level when zooming is performed. FIG. 11 illustrates the width of the zooming-level in the horizontal axis direction, where the more the width spreads, the more zooming is performed in zooming-out direction. Conversely, the more the width narrows, the more zooming is performed in the zooming-in direction. In addition, FIG. 11 illustrates the height of the zooming-level in the vertical axis direction, where the higher the zooming-level, only sites having high popularity are included in the channel space. Conversely, the lower the zooming-level, the more sites are included in the channel space, including those having low popularity.

Here, in the case of giving attention to only the width of the zooming-level, for example, zooming out is performed from zooming-level ZLn to ZLw, so that the width of zooming-level ZLw after zooming out spreads more than that of zooming-level ZLn before zooming out. Accordingly, a wide range within the channel is included in tuning area TEw after this zooming out. Thus, when a wide range within the channel is included in the tuning area TEw, the number of sites simultaneously displayed on the screen increases, thereby causing the display screen vexatious complication. In the case that zooming out is performed, for example, from zooming-level ZLn to ZLw, the browser of the present embodiment adjusts so as to minimize the number of sites simultaneously included in the tuning area TEw by raising the zooming-level in the vertical axis direction as illustrated by an arrow UL within FIG. 11. Namely, in the exemplary case of FIG. 11, the channel space of the zooming-level ZLw only includes the sites WSb, WSf, Wsi, WSj and WSl which have particularly high popularity. In addition, the within-channel site positions included in the tuning area TEw are only STf and STi within FIG. 11. Accordingly, the sites displayed on the monitor screen at this time are only the sites WSf and WSi having high popularity corresponding to the within-channel site positions STf and STi. Thus, the browser of the present embodiment limits the number of sites simultaneously displayed on the monitor screen by raising the zooming-level upon the zooming out, so that it is possible to prevent vexatious complications by simultaneously displaying a large number of sites. The browser can display only the main sites.

In addition, in the case of giving attention to only the width of the zooming-level, for example, zooming in is performed from zooming-level ZLw to ZLn, so that the width of zooming-level ZLn after zooming in narrows less than that of zooming-level ZLw before zooming in. Accordingly, only a narrow range within the channel is included in the tuning area TEn after this zooming in. Thus, when a narrow range within the channel is included in the tuning area TEn, the number of sites displayed simultaneously on the screen remarkably decreases, so that there is a possibility that perusal of the site will become difficult. In the case that zooming in is performed, for example, from zooming-level ZLw to ZLn, the browser of the present embodiment adjusts so as to increase the number of sites simultaneously included in the tuning area TEn by lowering the zooming-level in the vertical axis direction as illustrated by an arrow DL within FIG. 11. Namely, in the exemplary case of FIG. 11, the channel space of the zooming-level ZLn includes not only the sites WSf, WSi having high popularity, but also the sites WSd, WSg having low popularity. In addition, within-channel site positions included in the tuning area TEn are only STf and STg within FIG. 11. Accordingly, the sites displayed on the monitor screen at this time are the site WSf of high popularity corresponding to the within-channel site position STf and the site WSg of low popularity corresponding to the within-channel site position STg. Thus, the browser of the present embodiment is capable of displaying the sites having low popularity that are not displayed at the time of zooming out on the monitor screen by lowering the zooming-level upon zooming in, thereby enabling the user to peruse the sites having low popularity.

It should be noted that the sites to be included in the channel space when the zooming-level becomes the zooming-level ZLw may be sites in which, as one example, the number of accesses per day is more than 1000. On the other hand, the sites to be included in the channel space when the zooming-level becomes the zooming-level ZLn may be sites in which, as one example, the number of accesses per day is more than 500.

Fine Tuning

When the site a user desires to peruse is determined under the condition that, for example, a translucence display and/or an inclination display or so forth are added to the monitor screen, where the site WS is searched by moving the tuning position TP, it is desired for the display on the monitor screen to shift from the condition of the translucence display or inclination display to a condition in which only the desired site is displayed.

Consequently, when the site WS a user desires to peruse is determined, the browser moves the tuning position TP immediately to the accurate within-channel site position ST corresponding to the site WS, and the browser makes the size of the tuning area TE zero (to remove the spread of the tuning position TP). It is noted that hereinafter this processing is called "fine-tuning".

Figure 12:
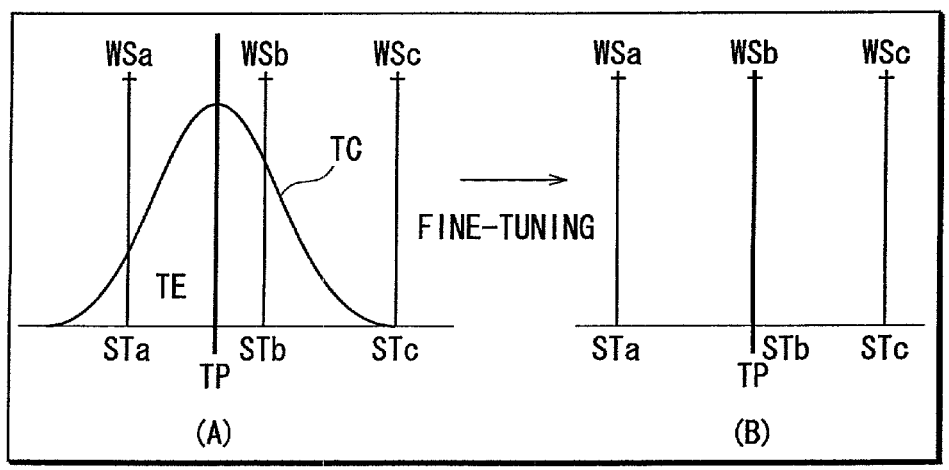
FIG. 12 is a view illustrating the condition of change of a tuning area before and after fine-tuning.

FIG. 12 illustrates the condition of change of the tuning position TP and the tuning area TE before and after the process of fine-tuning. In FIG. 12, (A) illustrates the condition before the process of fine-tuning. The tuning position TP exists between the within-channel site positions STa and STb, and the within-channel site position STb is nearest to the tuning position TP. Upon executing fine-tuning at this condition, the tuning position TP, as illustrated in (B) of FIG. 12, moves to the nearest within-channel site position (in this example, STb) and the size of the tuning area TE becomes zero. For this reason, the page displayed on the monitor screen is only the site WSb corresponding to the within-channel site position STb.

Registration of Favorites

A position on the channel space of the site WS that the user preferably peruses can be registered previously. Hereinafter, registration of the site position on the channel space is referred to as "registration of favorites". Here, the following two techniques can be considered as techniques for the registration of favorites on the channel space.

One registration technique is one in which the specific sites WS are set (registered) in plural registration buttons prepared for the favorite registration, such as the so-called broadcasting preset buttons of a radio tuner. In this registration technique, the number of sites that the user can register as favorites corresponds to the number of prepared registration buttons. As one example, where there are six registration buttons, a total of six sites can be registered as favorites if one site WS is registered to each registration button. Then, the user is immediately capable of perusing the site WS registered to a button by pressing the desired registration button. A specific example of the registration button will be described later.

Figure 13:
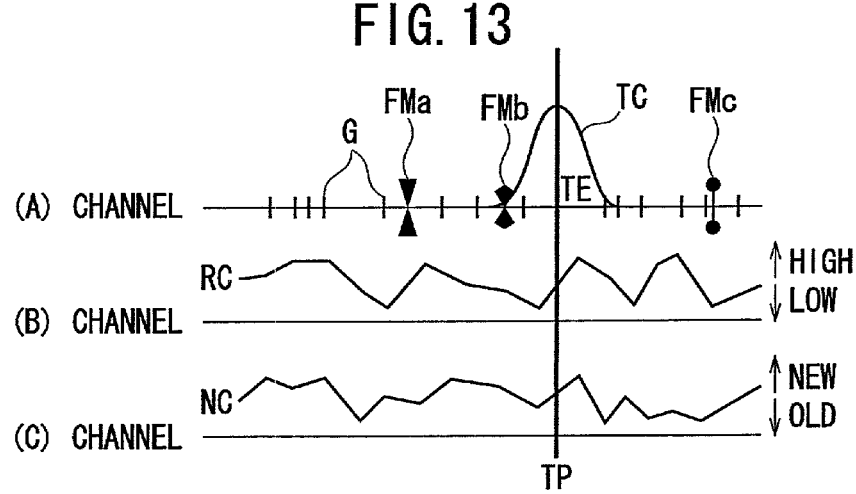
FIG. 13 is a view illustrating an exemplary case of displaying a favorite mark on a channel space.

The other registration technique is one in which, as illustrated in FIG. 13, marks expressing the positions of the registration of favorites (hereinafter, referred to as favorite marks FM) are displayed on the channel space. It should be noted that FIG. 13 is an example in which favorite marks FM are added to the example of FIG. 9. When the user peruses a certain site WS, for example, the favorite marks FM are arranged on the channel space by pressing a predetermined favorite registration button. Thus, the user is capable of easily recognizing visually on which positions favorite sites exist on the channel space by arranging favorite marks FM on the channel space. In addition, it is possible for the favorite marks FM to have the same color and/or the same shape, and also it is possible that, as illustrated in FIG. 13, the favorite marks have different colors and/or different shapes (FMa, FMb, FMc and so forth). In particular, when favorite marks (FMa, FMb, FMc and so forth) having different colors and/or different shapes are employed, the user is able to recognize respective sites WS registered as the favorite due to the color and/or shape of the favorite marks. A specific example of the registration button of the favorite marks will be described later.

Tuning Control at the Neighborhood of Site Position Registered as Favorite

The browser, when carrying out a search of the site WS, executes tuning control depending on the existence of a favorite registration.

As one example of tuning control, the browser, when moving the tuning position TP, changes the maximum value of the moving speed thereof at the position where a favorite registration is made. For this reason, the user definitely recognizes the position where the favorite registration is made.

Figure 14:
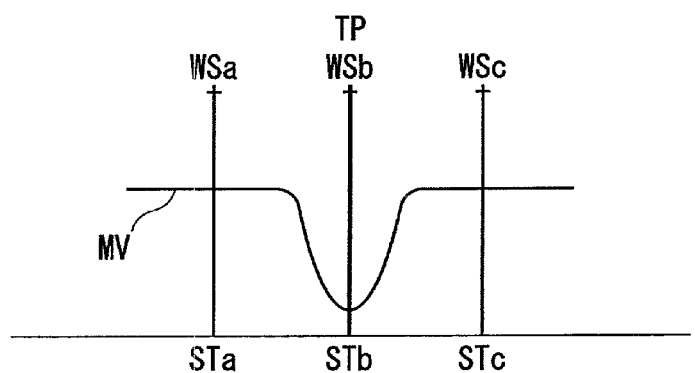
FIG. 14 is a view used for explaining the case that the maximum value of the moving speed of a tuning position in the neighborhood of a favorite site decreases.

FIG. 14 illustrates the concept of decreasing the maximum value of the moving speed of the tuning position TP in the neighborhood of the site (the site WSb in this example) of a favorite registration. Namely, the browser, when the site WSb is registered as a favorite in FIG. 14, reduces the maximum value MV of the moving speed of the tuning position TP in the vicinity of the within-channel site position STb corresponding to the site WSb.

Instead of this process, the browser may control the operation of a predetermined operating means for moving the tuning position TR Namely, when the predetermined operating means is provided with a so-called force feedback function, the browser controls the force feedback. For this reason, the user definitely recognizes positions of favorite registrations. The force feedback function causes the operating means to be vibrated, or causes a sense of operation of the operating means to be changed.

Figure 15:
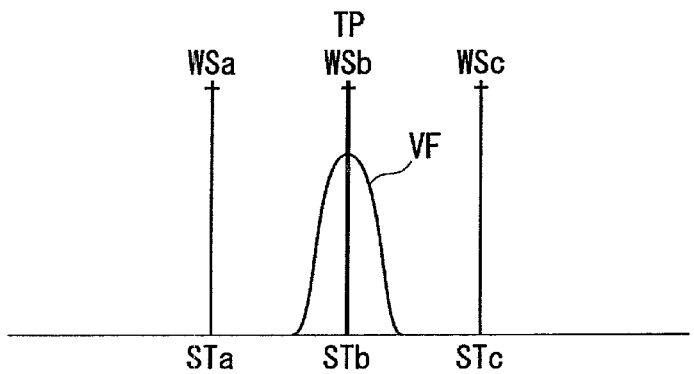
FIG. 15 is a view used for explaining the case that the vibration strength of the operating means is made larger in the neighborhood of a favorite site.

The force feedback control for vibrating the operating means, for example, as illustrated in FIG. 15, forces the operating means to vibrate in accordance with a vibration intensity control curve indicated by VF when the tuning position TP approaches the position of a favorite registration. Namely, the browser, when the tuning position TP approaches the neighborhood of the within-channel site position STb of the site WSb of a favorite registration, gradually executes control of the vibrating operating means. When the tuning position TP arrives on the within-channel site position STb, the browser causes the amount of vibration of the operating means to be at a maximum. It should be noted that the browser suitably controls the vibration period of the operating means, where the browser shortens the vibration period of the operating means as the tuning position TP approaches the position of a favorite registration. Conversely, the browser lengthens the vibration period of the operating means as the tuning position TP becomes more distant from the position of a favorite registration. In addition, the browser suitably controls the vibration pattern, where the browser changes the pattern of vibration depending on the distance between the position of a favorite registration and the tuning position TP.

The force feedback control which changes a sense of operation of the operating means may be one, for example, in which the browser lightens the sense of operation of the operating means as the tuning position TP approaches the position of a favorite registration. Conversely, the browser may make the sense of operation heavier as the tuning position TP becomes more distant from the position of a favorite registration. For example, the browser, when the operating means is a dial type means, may control the operation of an electromagnetic clutch for changing the rotation torque (weight) when rotating the dial. In addition, the browser, when the operating means is a button type means, may control the power of resistance to a pressing down force on the button. Of course, it is alternatively possible that the force feedback control is one in which the browser makes the sense of operation of the operating means heavier as the tuning position TP approaches the position of a favorite registration, and lightens the sense of operation of the operating means as the tuning position TP becomes more distant from the position of a favorite registration.

It should be noted that the force feedback function is one example, and the present invention is not limited by these means.

Specific Display Example on the Monitor Screen

Figure 16:
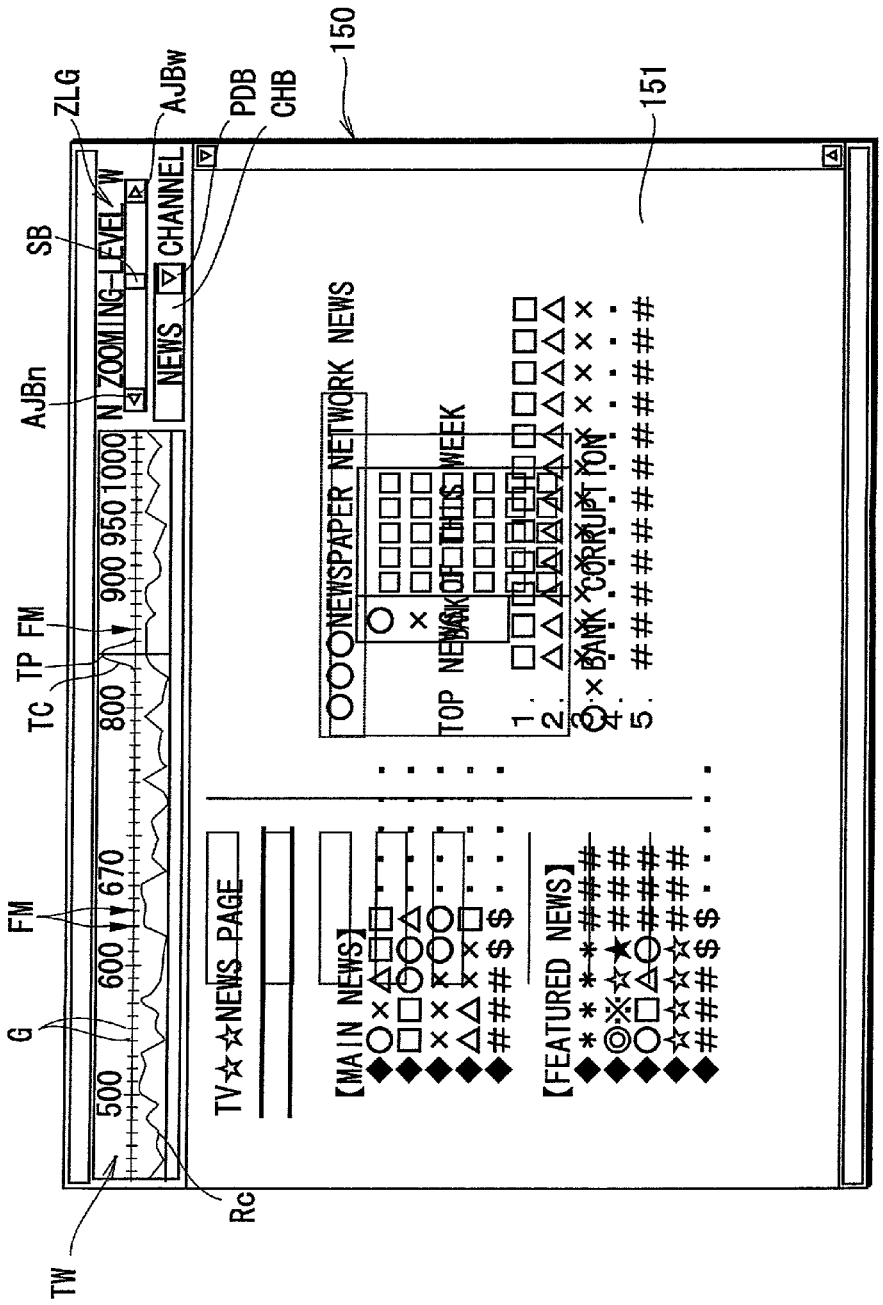
FIG. 16 is a view illustrating an operative example of a screen display in the case that the display window of a channel is displayed.

FIG. 16 illustrates a specific exemplary screen display for the case in which the above-described tuning position TP, tuning curve TC, access frequency curve RC expressing the degree of popularity of the site, favorite mark FM, zooming-level, channel and so forth are displayed on the monitor screen. It should be noted that the example of FIG. 16 illustrates a window 150 in the condition in which the top pages 110 and 120 are subjected to translucence synthesis.

The window 150 illustrated in FIG. 16 has a page display 151, tuning display TW, zooming-level display (zooming-level gauge) ZLG, and channel display CHB as main configuration elements. The page display 151 displays Web pages. The zooming-level display ZLG displays the level of zooming. The channel display CHB displays which channel is tuned.

The tuning display TW displays in what manner tuning is made within the channel space. The tuning display TW displays the tuning position TP, the tuning curve TC, the favorite mark FM, the access frequency curve RC, the scale G and so forth. The tuning position TP and the tuning curve TC express which position the tuning position TP exists in at the present moment. A line expressing the tuning position TP is, for example, red in color. The favorite mark FM expresses which position a favorite registration exists in. The favorite mark FM is, for example, an inverted triangle with a blue color. The access frequency curve RC expresses the access frequency condition. It also should be noted that the tuning display TW preferably displays the access frequency curve RC and/or, instead of that, the update condition curve NC.

The zooming-level display ZLG is provided at a right lateral position of the tuning display TW for example, and expresses the present zooming-level by scroll box SB. In addition, the zooming-level display ZLG is provided at the right and left end sections with adjusting buttons AJBw and AJBn for moving the scroll box SB. The adjusting button AJBw is a button that the user operates when adjusting the zooming-level in the direction of enlargement (zooming-out). The adjusting button AJBn is a button that the user operates when adjusting the zooming-level in the direction of narrowing (zooming-in). In addition, it is possible to move the scroll box SB by dragging it directly.

The channel display CHB, which is provided below the zooming-level display ZLG, is prepared in order to select the kind of channel space, including sites for perusal and so forth, as a pull down menu. In addition, the channel display CHB is provided with instruction button PDB in order for the user to operate the pull down menu display at the right end section of the channel display CHB.

Specific Example of Operating Means for Operating Tuning Position TP

The operating means that the user operates when moving the tuning position TP can be tuning controllers as illustrated in, for example, FIG. 17 and FIG. 18 to FIG. 20. It is possible for the tuning controller to be not only a hardware-based controller that the user operates by hand practically, but also a virtual controller which is displayed on the monitor screen and which is operated in response to, for example, a mouse click operation or a rotation operation of a wheel button and so forth.

Figure 17:
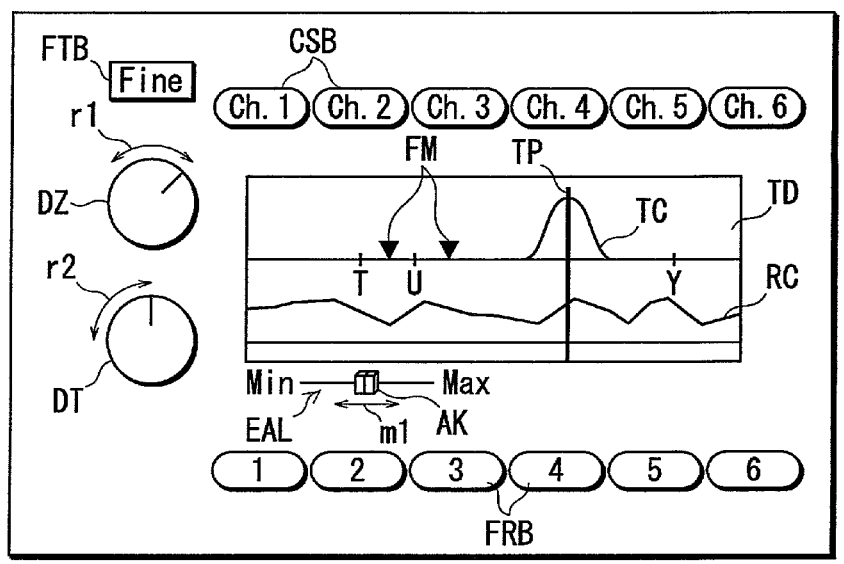
FIG. 17 is a view illustrating an exemplary tuning controller that is realized by hardware or software.

FIG. 17 illustrates an exemplary virtual tuning controller displayed on the monitor screen. Tuning dial DT is a dial that the user rotates to move the tuning position TP on the channel space. When the user rotates the tuning dial DT in the direction indicated by arrow r2 within the drawing, the browser changes the tuning position TP on the channel in response to the rotation.

Tuning area-adjusting lever EAL is a lever that the user operates to adjust the size of the tuning area TE. When the user moves a knob AK in the left direction or right direction as illustrated by arrow ml within the drawing, the browser changes the size of the tuning area TE. It should be noted that the size of the tuning area TE is capable of being changed from zero to a predetermined maximum value.

Zooming level-adjusting dial DZ is a dial that the user operates to adjust the zooming-level of the channel displayed (selected). When the user rotates the zooming-level adjusting dial DZ in the direction indicated by arrow r1 within the drawing, the browser changes the zooming-level in response to the rotation.

A tuning display window TD displays the tuning position TP, the tuning curve TC, the favorite marks FM, the access frequency curve RC of the site expressing the degree of popularity and so forth other than the channel section having a size adjusted to the zooming-level. The tuning display window TD may also display the curve NC expressing the update condition of the site.

Fine tuning button FTB is a button that the user presses to execute fine-tuning as described above.

Channel selection buttons CSB are buttons that the user presses to register desired channels from among plural kinds of channels and that the user presses to select any channel from among those registered channels. In the case of FIG. 17, six channel selection buttons CSB are provided, therefore, six channels are capable of being registered.

Favorite registering buttons FRB are buttons that the user presses to register the sites of favorites and that the user presses to select a desired site from among those favorite sites registered. It should be noted that the site of a favorite may be registered in every respective channel, or may be registered regardless of channels.

For example, in the case where favorite sites are registered in every respective channel that is registered to a channel selection button CSB, six favorite sites are capable of being registered in each of the six channels that are registered to the six channel selection buttons. In this case, a total of 36 sites (6 channels×6 sites/channel) are registered as favorites. It should be noted that if the user wants to peruse a desired site within another channel when a site within a certain channel is being displayed, the user firstly presses the channel selection button CSB to which such another channel is registered to execute channel selection. As a result, the channel that the browser deals with becomes such another channel, which is then displayed on the tuning display window TD. Next, the user selects the desired site by pressing the favorite registration button FRB to which the desired site within such another channel is registered. As a result, the browser displays the desired site on the monitor screen.

If favorite sites are registered regardless of the channel, it is possible to register a total of 6 sites by using 6 favorite registration buttons FRB. Namely, the respective sites being registered in respective favorite registration buttons FRB in this case are sites within the same channel or are sites within different channels. It should be noted that, in cases in which the channels of respective sites registered in respective favorite registration buttons FRB are different from one another, for example, if the user wants to peruse a desired site within another channel when a site within a certain channel is being displayed, the user presses the favorite registration button FRB to which the desired site of such another channel is registered. As a result, the channel that the browser deals with is switched to such another channel and, simultaneously, the browser displays the desired site within such another channel on the monitor screen.

Figure 18:
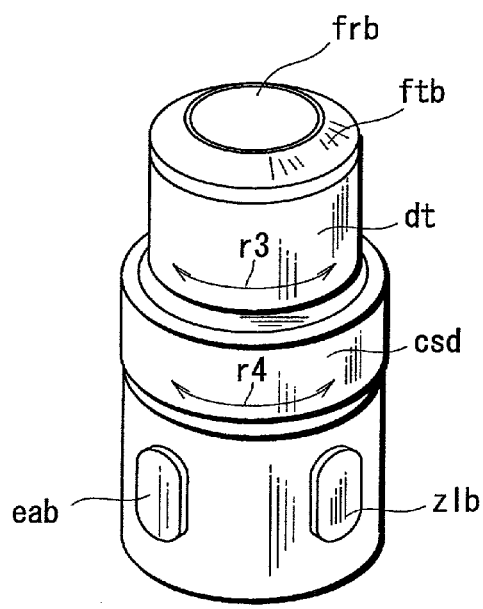
FIG. 18 is a perspective view illustrating an exemplary tuning controller operable by only one hand.
Figure 19:
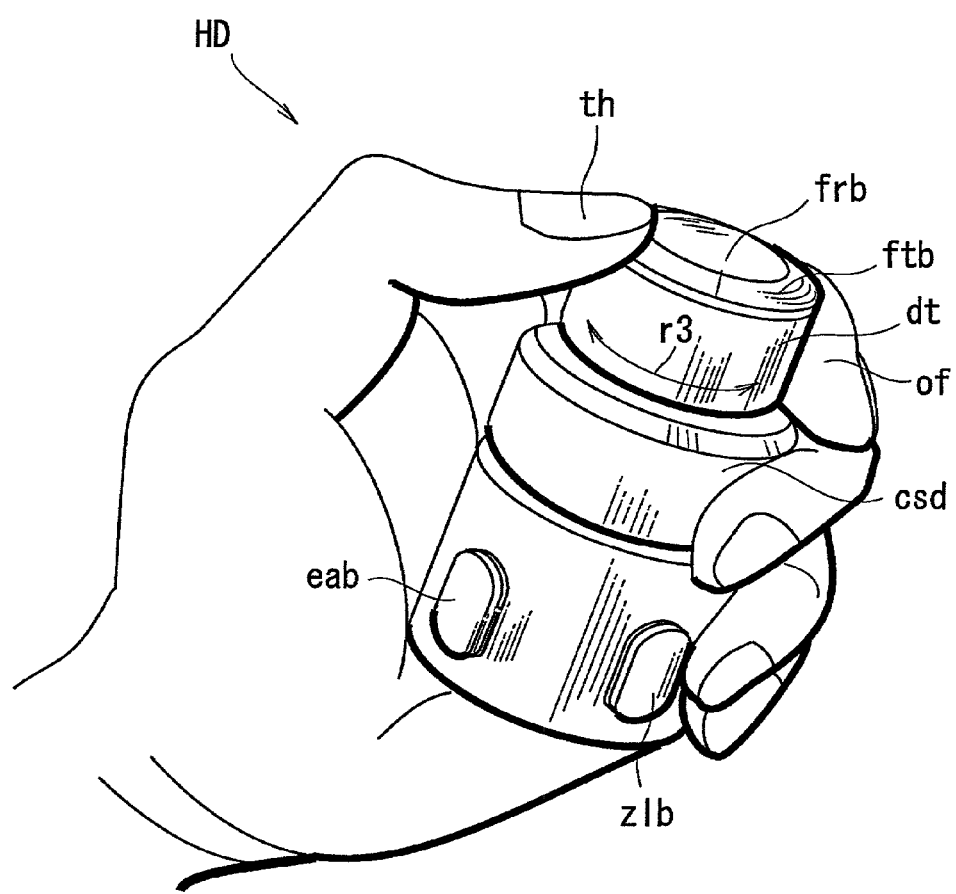
FIG. 19 is a perspective view illustrating the condition where a jog dial of the tuning controller is operated.
Figure 20:
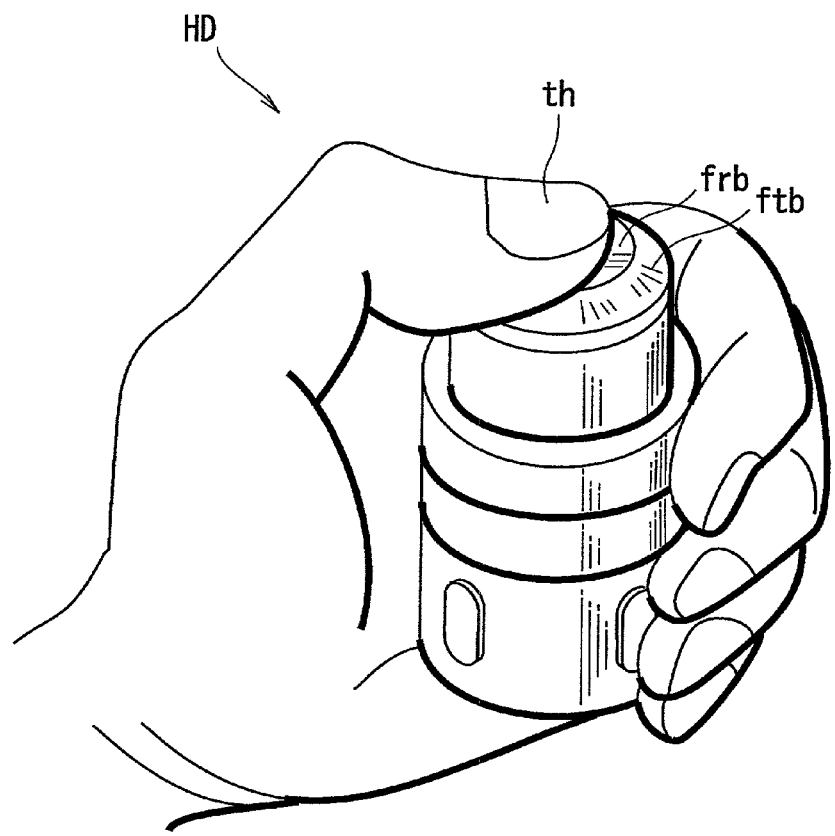
FIG. 20 is a perspective view illustrating the condition where a favorite registration button of the tuning controller is operated.

FIG. 18 to FIG. 20 illustrate an exemplary hardware-based tuning controller that the user actually operates by hand. The tuning controller illustrated in FIG. 18 to FIG. 20 is operated by the user while being gripped by hand HD. The tuning controller may be wired or wireless, however, it is preferable to be wireless for convenience of use.

In FIG. 18 to FIG. 20, a jog dial dt is rotated by the user in order to move the tuning position TP on the channel space. As illustrated in FIG. 19, when the user rotates the jog dial dt in the direction indicated by arrow r3 within the drawing by using the thumb th and first finger of hand HD, the browser changes the tuning position TP on the channel in response to the rotation. It should be noted that if the jog dial dt is rotated under the condition that, for example, only one site is displayed, the browser enables its page to be scrolled in response to the rotation.

Shuttle ring csd is a dial that the user rotates in order to select a desired channel from among plural kinds of channels. When the user rotates the shuttle ring csd by using the thumb th and first finger of hand HD in the direction indicated by arrow r4 within the drawing, the browser places the respective channels in a selectable condition where the respective channels are capable of being selected in order in response to the rotation.

Favorite registration button frb is a button that the user depresses in order to register the site of a favorite. When the user depresses the favorite registration button frb by using the thumb th of hand HD as illustrated in FIG. 20 under the condition that, for example, only one site is displayed, the browser registers the site as the favorite site.

Fine-tuning button ftb is a button that the user depresses in order to execute fine-tuning. If the user depresses the fine-tuning button ftb by using the thumb th, the browser starts the execution of fine-tuning. It should be noted that the fine-tuning button ftb is integrally constituted with the jog dial dt. Accordingly, if the fine-tuning button ftb is depressed, the jog dial dt also is depressed.

Tuning area adjusting button eab is a button that the user presses in order to adjust the size of the tuning area TE, and is, for example, a seesaw-type button. When one side of the seesaw button (for example, the upper side) is pressed, the browser enlarges the size of the tuning area TE, while, when the other side of the seesaw button (for example, the lower side) is pressed, the browser reduces the size of the tuning area TE. In addition, when one side or the other side (upper side or lower side) of the seesaw button is pressed continuously, the browser continuously changes the tuning area TE.

Zooming-level adjusting button zlb is a button that the user presses in order to adjust the zooming-level, and is, for example, a seesaw type button. When one side of the seesaw button (for example, the upper side) is pressed, the browser causes the screen to be zoomed out, while, when the other side of the seesaw button (for example, the lower side) is pressed, the browser causes the screen to be zoomed in. In addition, when one side or the other side (upper side or lower side) of the seesaw button is pressed continuously, the browser continuously changes the zooming-level.

When carrying out perusal and so forth of a site by using the tuning controller illustrated in FIG. 18 to FIG. 20 provided with the above-described features, the user first selects a desired channel by rotating the shuttle ring csd. Next, the user determines the size of the tuning area TE through use of the tuning area adjusting button eab. The user then moves the tuning position TP by rotating the above-described jog dial dt while adjusting the zooming-level with the zooming-level adjusting button zlb. This enables the user to peruse the desired site.

Digital Tuning

The tuning operation to move the tuning position TP on the channel space may be a digital-based tuning operation so as to move the tuning position TP depending on the duration that the user continues to press the predetermined tuning button, for example.

Figure 21:
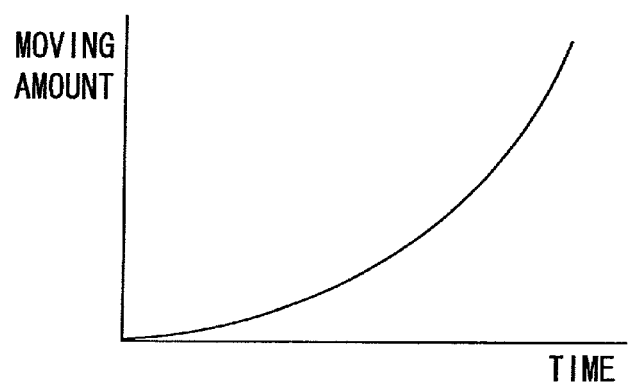
FIG. 21 is a view used for explaining the relation between the ON time of a tuning button and the movement amount of the tuning position in the case that a digital-based tuning operation is carried out.

As an example of digital-based tuning, the browser, as illustrated in FIG. 21, variably sets the moving amount (vertical axis) of the tuning position TP depending on the time (horizontal axis) during which the user continues to press the predetermined tuning button. For example, the browser increases the moving speed of the tuning position TP as the time the user continues to press the predetermined tuning button is lengthened. As a result, the user is able to obtain the same sense of operation as that of an analog-based tuning operation.

The tuning position TP may be moved by operating the tuning dial of a radio receiver, operating a button or cross-shaped key provided on a game controller, operating a cursor control key, operating a mouse for a computer, or so forth.

Two-Dimensional Arrangement of Within-Channel Site Position

The above-described example is one in which respective sites WS are arranged in a one-dimensional-based arrangement. However, respective sites are capable of being arranged in a two-dimensional-based space. In addition, a two-dimensional space includes not only the case in which the space is constituted by one channel, but also the case in which the space is constituted by a plurality of channels.

Figure 22:
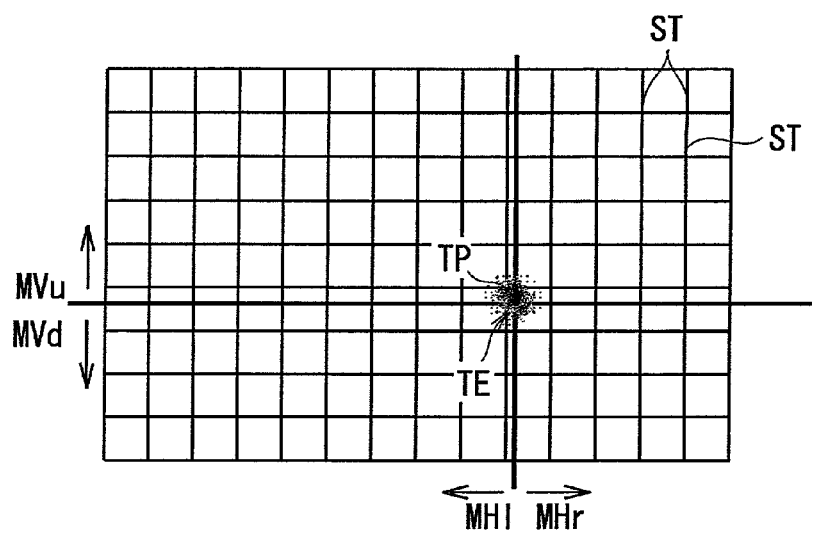
FIG. 22 is a view used for explaining the site arrangement condition in the case that respective sites are arranged in two-dimensional space.
Figure 23:
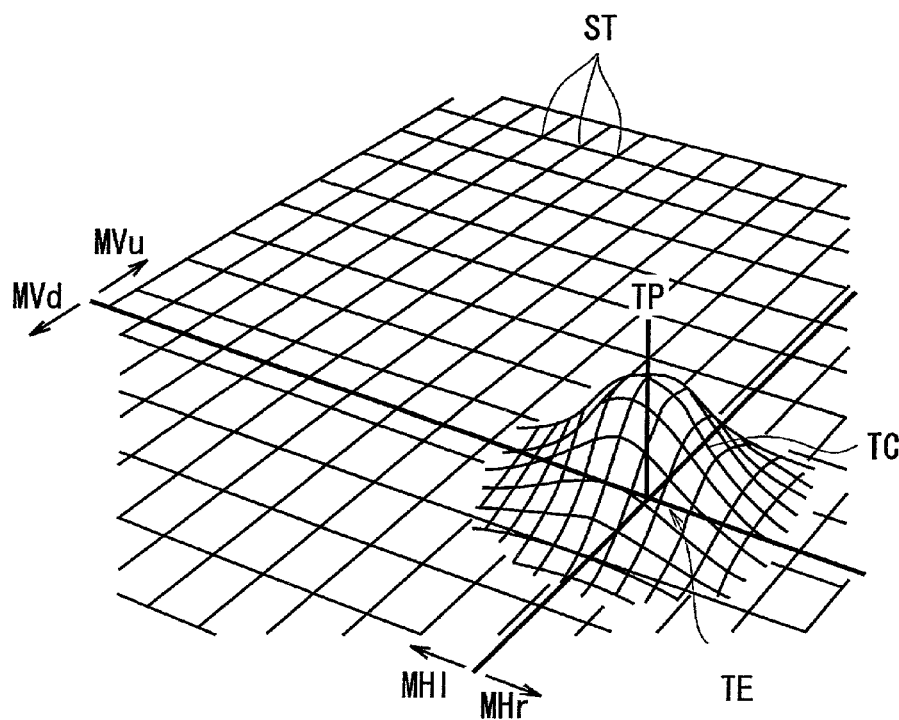
FIG. 23 is a view where the spread of the tuning position is expressed in three dimensions in the case that respective sites are arranged in two-dimensional space.

FIG. 22 and FIG. 23 conceptually illustrate a site arrangement condition in the case that respective sites are arranged in a two-dimensional space. FIG. 22 is a view in which the two-dimensional space is observed from directly above. FIG. 23 is a view in which the two-dimensional space is observed obliquely from above. In FIG. 22 and FIG. 23, respective lattice points indicate the within-channel site positions ST. The tuning position TP is expressed by a point on the two-dimensional plane (or a line extending in the vertical direction relative to the two-dimensional plane). In addition, the tuning position TP is movable in a horizontal direction on the two-dimensional plane as indicated by arrows MHl, MHr within the drawing, as well as in a vertical direction on the two-dimensional plane as indicated by arrows MVu, MVd within the drawing. It should be noted that movement in the horizontal direction and the vertical direction are suitably carried out individually or simultaneously.

The tuning position TP, in the case of the example of this two-dimensional space, has a virtual spread as expressed by the tuning curve TC and the tuning area TE on this curve TC illustrated in FIG. 22 and FIG. 23. Then, the sites WS corresponding to the within-channel site positions ST included in the tuning area TE are capable of being perused simultaneously with the sites WS displayed on the monitor screen.

In addition, as with the case of arranging the sites WS on the one-dimensional space, the display condition of the respective pages displayed on the monitor screen is controlled depending on the distance from the tuning position TP to the respective within-channel site positions ST.

Figure 24:
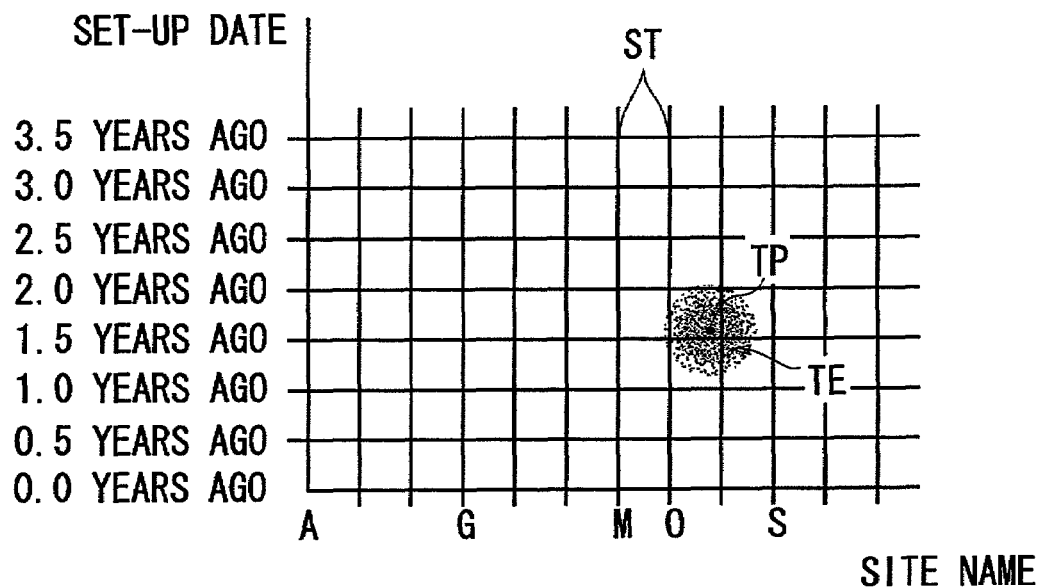
FIG. 24 is a view used for explaining the site arrangement state in the case that respective sites are arranged in two-dimensional space with the horizontal axis as the site name and with the vertical axis as the set-up day.

Here, for example, as illustrated in FIG. 24, it is possible to decide that the horizontal axis (axis in the horizontal direction) of the two-dimensional space is, for example, the site name, and that the vertical axis (axis in the vertical direction) is the number of years. The site names on the horizontal axis of FIG. 24 are arranged in alphabetical order, and the vertical axis is the number of years from the set-up date of the site up to the present. Alternatively, the vertical axis is capable of expressing, for example, the updated date, the number of accesses, the number of pages, file size of the page and so forth. Of course, the site name may be set to the vertical axis, while the set-up date or updated date or so forth may be set to the horizontal axis.

Figure 25:
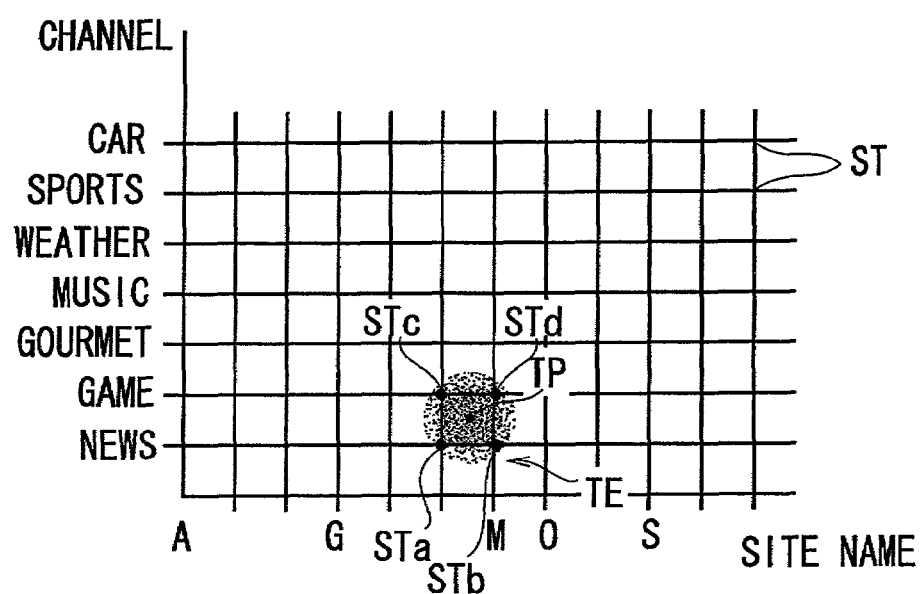
FIG. 25 is a view used for explaining the site arrangement state in the case that respective sites are arranged in two-dimensional space with the horizontal axis as the site name and with the vertical axis as the kind of channel.

In addition, as illustrated in FIG. 25, the horizontal axis of the two-dimensional space can be suitably the site name, while the vertical axis can be suitably the kind of the channel. Namely, an example of FIG. 25 is that in which the two-dimensional space is constituted by a plurality of channels, and respective channels of "car", "sports", "weather" and so forth are arranged on the vertical axis. Alternatively, the vertical axis may be the site name, while the horizontal axis may be the kind of channels. It should be noted that, in this case, not only the sites, but also the channels are displayed under a condition such as translucence and so forth while being overlapped.

Specific Display Example of Web Page in the Case of Two-Dimensional Space

If, for example, one axis of the two-dimensional space is taken to be the site name, and the other axis of the two-dimensional space is taken to be the kind of channels, the site WS obtained from the tuning position TP and the tuning area TE is displayed on the monitor screen for example as described later.

Figure 26:
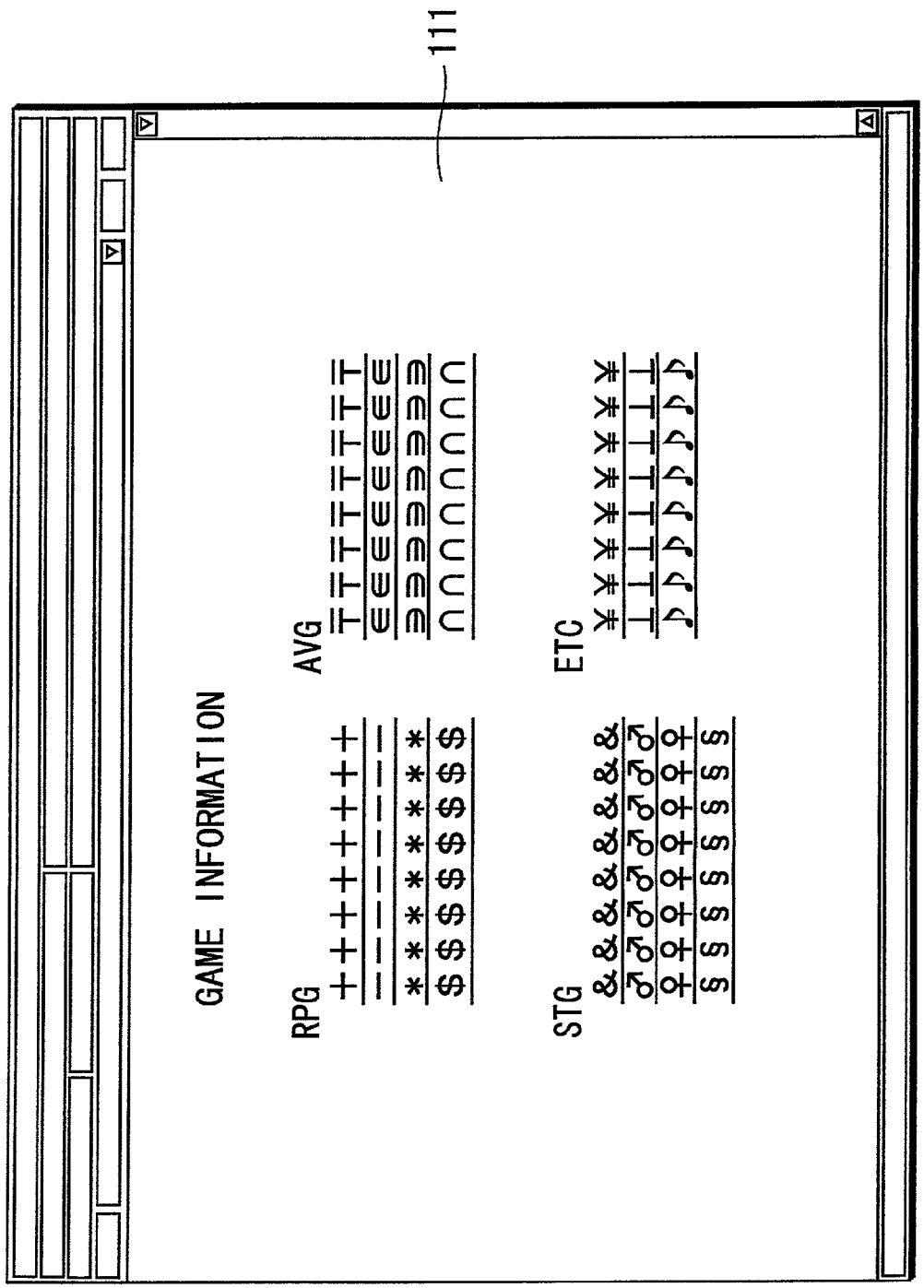
FIG. 26 is a view illustrating an exemplary display of a site classified into a game.
Figure 27:
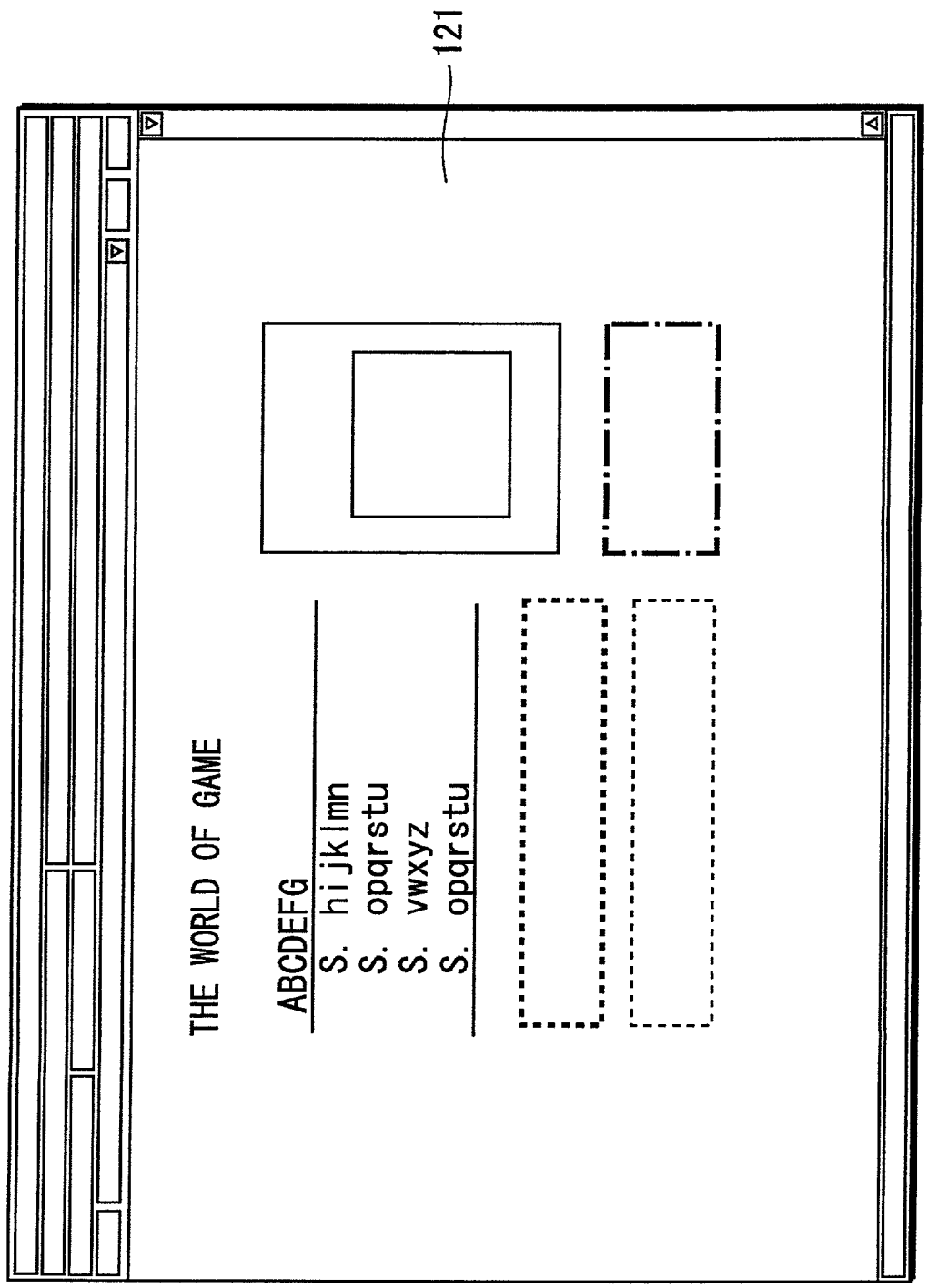
FIG. 27 is a view illustrating another exemplary display of a site classified into a game.

Here, it is assumed that a total of four within-channel site positions are included in the tuning area TE illustrated in FIG. 25, namely, the within-channel site positions STa and STb corresponding to two sites classified as "news" channels and the within-channel site positions STc and STd corresponding to two sites classified as "game" channels, and that the site corresponding to the within-channel site position STa is the site of the top page 110 explained at FIG. 3, and the site corresponding to the within-channel site position STb is the site of the top page 120 explained at FIG. 4. In addition, the site corresponding to the within-channel site position STc is the site of the top page 111 explained at FIG. 26 and the site corresponding to the within-channel site position STd is the site of the top page 121 explained at FIG. 27.

In this case, the browser controls on the monitor screen the arrangement position and degree of translucence of the above-described four top pages 110, 120, 111, 121 in accordance with the relative location of the respective within-channel site positions STa, STb, STc, STd relative to the tuning position TP.

Figure 28:
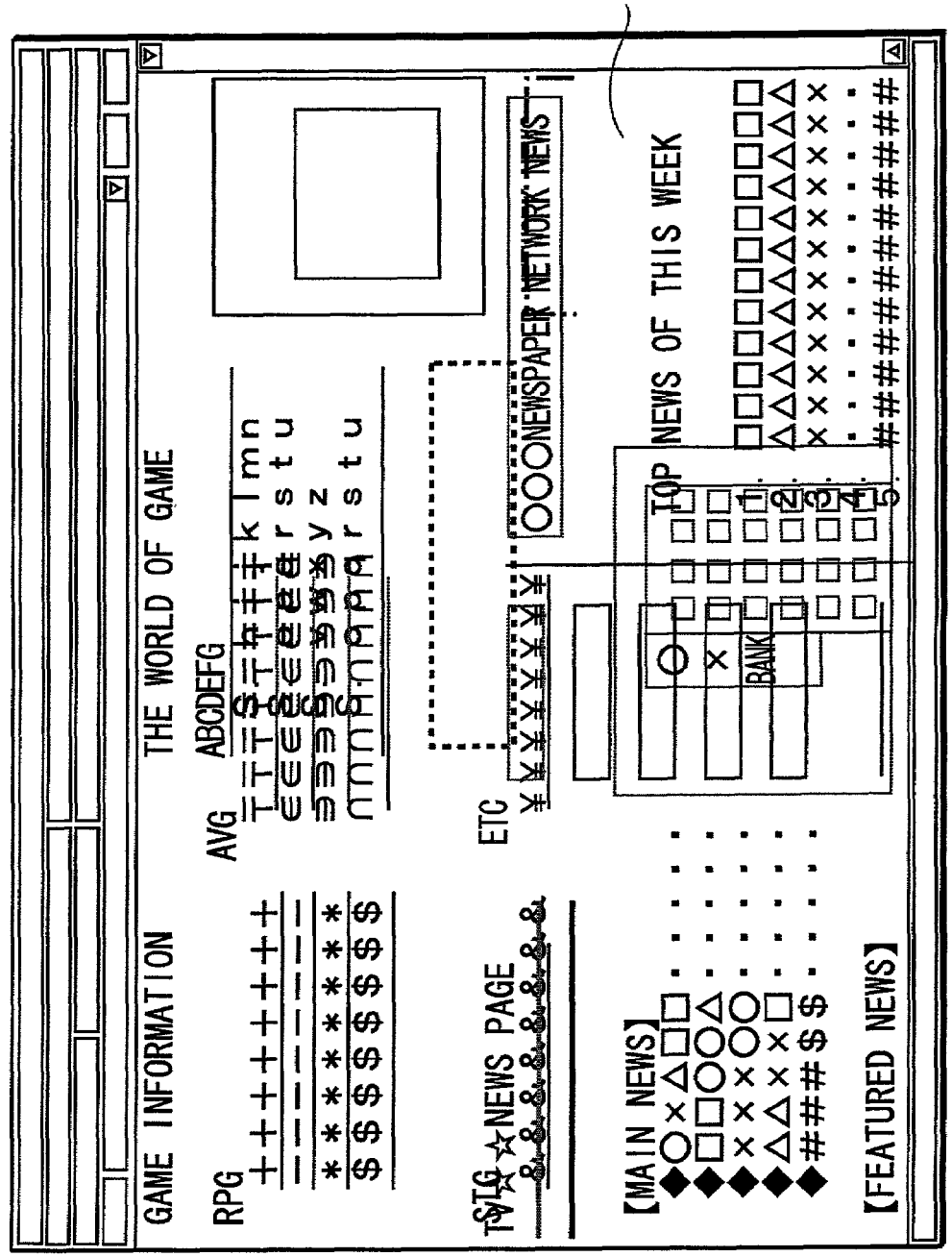
FIG. 28 is a view illustrating an exemplary display where two sites classified into news and two sites classified into a game undergo translucence synthesis while arranging depending on relative location between those site positions and tuning positions.

Namely, as illustrated in FIG. 25, if the within-channel site position STa on the channel space is positioned obliquely left downward relative to the tuning position TP, the within-channel site position STb on the channel space is positioned obliquely right downward relative to the tuning position TP, the within-channel site position STc on the channel space is positioned obliquely left upward relative to the tuning position TP, and the within-channel site position STd on the channel space is positioned obliquely right upward relative to the tuning position TP. The browser, as illustrated in FIG. 28, positions the tuning position TP at the center of the screen, and then arranges the top page 110 obliquely left downward on the monitor screen, arranges the top page 120 obliquely right downward on the monitor screen, arranges the top page 111 obliquely left upward on the monitor screen, and arranges the top page 121 obliquely right upward on the monitor screen. In addition, the browser determines the degree of translucence of the respective top pages 110, 120, 111, 121 depending on the distance between the tuning position TP and the respective within-channel site positions STa, STb, STc, STd, and then, as illustrated in FIG. 28, the browser displays the page 131 providing translucence synthesis for the respective top pages 110, 120, 111, 121 having those determined degrees of translucence. According to these matters, concerning the display on the monitor screen, as illustrated in FIG. 28, conditions are provided in which the top page 111 has the best looking display area obliquely left upward on the screen, the top page 121 has the best looking display area obliquely right upward on the screen, the top page 110 has the best looking display area obliquely left downward on the screen, and the top page 120 has the best looking display area obliquely right downward on the screen.

Thus, the browser of the present embodiment controls the arrangement and degree of translucence on the screen in connection with the four respective top pages 110, 120, 111, 121 depending on the relative location between the respective within-channel site positions STa, STb, STc, STd and the tuning position TP. Accordingly, the user can recognize in which direction the respective sites exist within the channel space in relation to the tuning position TP due to the positions of the respective top pages 110, 120, 111, 121 arranged on the monitor screen. In addition, the user can recognize how far the respective sites within the channel space are from the tuning position TP due to the degree of translucence of the respective top pages 110, 120, 111, 121 on the monitor screen. As a result, the user can easily know in which direction to tune and by how much in order to peruse a particular site by only observing the respective top pages 110, 120, 111, 121 displayed on the monitor screen.

It should be noted that it is also possible that the display on the monitor screen may be a page that is formed so that characteristic parts of the four pages can be observed easily and then overlapped with one another.

In addition, like the example of FIG. 6 described above, the display on the monitor screen may be one in which the browser adjusts the inclination of the four pages on the screen depending on the distance from the tuning position TP to the within-channel site position ST. Other than the above, it is possible that the display on the monitor screen may be subjected to various effect processing, filtering processing, three-dimensional conversion processing and so forth for the four pages.

Figure 29:
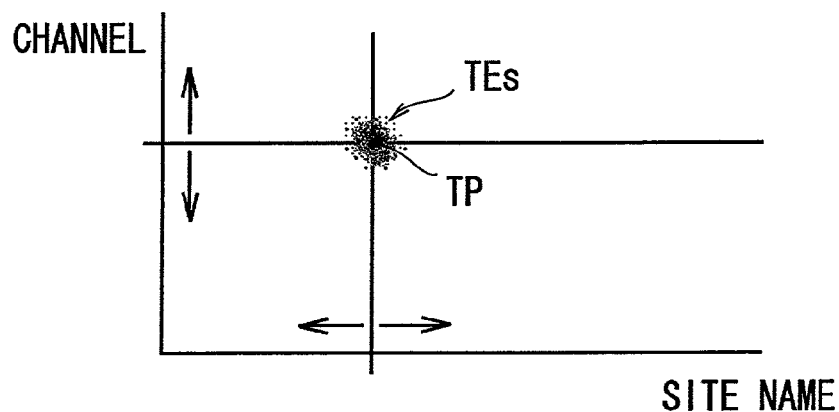
FIG. 29 is a view illustrating the conditions where a tuning curve and tuning area are narrowly set in an example in which respective sites are arranged in two-dimensional space.

The virtual spread state of the tuning position TP in the case that respective sites are arranged in a two-dimensional space may be constant, or, as illustrated in the tuning area TEs of FIG. 29, the virtual spread state of the tuning position TP may be smaller than the tuning area TE of FIG. 25. Conversely, the virtual spread state of the tuning position TP may be wider than the tuning area TE of FIG. 25 as illustrated in the tuning area TEl of FIG. 30.

Figure 30:
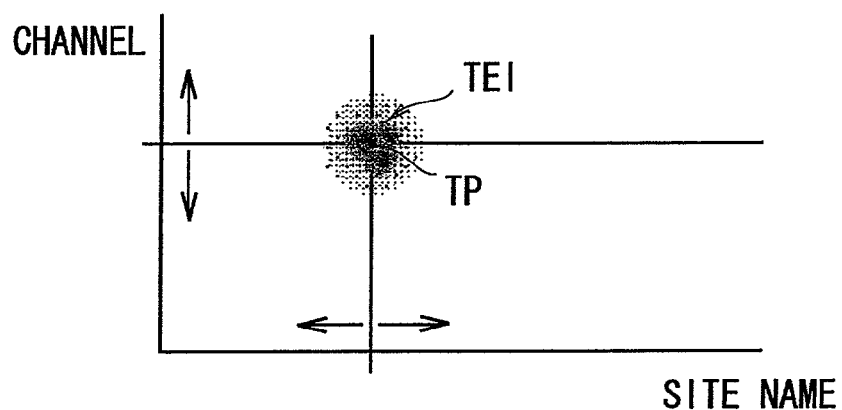
FIG. 30 is a view illustrating the conditions where a tuning curve and tuning area are widely set in an example in which respective sites are arranged in two-dimensional space.
Figure 31:
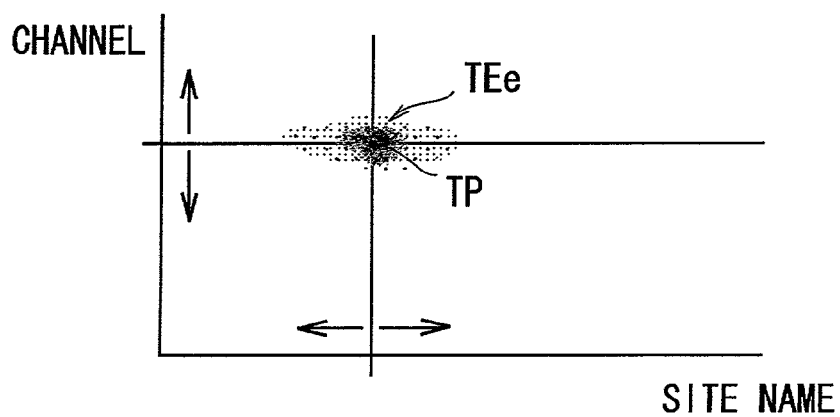
FIG. 31 is a view illustrating the conditions where a tuning area is set in an elliptical shape in an example in which respective sites are arranged in two-dimensional space.

In addition, the tuning area TE is not necessarily in the shape of a concentric circle as in FIG. 25, FIG. 29, and FIG. 30, but may also be elliptical in shape as illustrated in FIG. 31. FIG. 31 is an example in which the vertical axis provides the kinds of channels and the horizontal axis provides the site names, and the shape of the tuning area TEe is elliptical where the elliptical shape is narrow in the vertical direction and wide in the horizontal direction. In the case of the tuning area TEe in FIG. 31, the sites displayed simultaneously among channels decreases, while the number of sites displayed simultaneously within the same channel increases. Of course, it is possible that an elliptical shaped tuning area TE may be wide in the vertical direction and narrow in the horizontal direction, and except for the above, it is possible that an elliptical shaped tuning area TE may be wide in an oblique direction.

Expression Using Shading of Color

Figure 32:
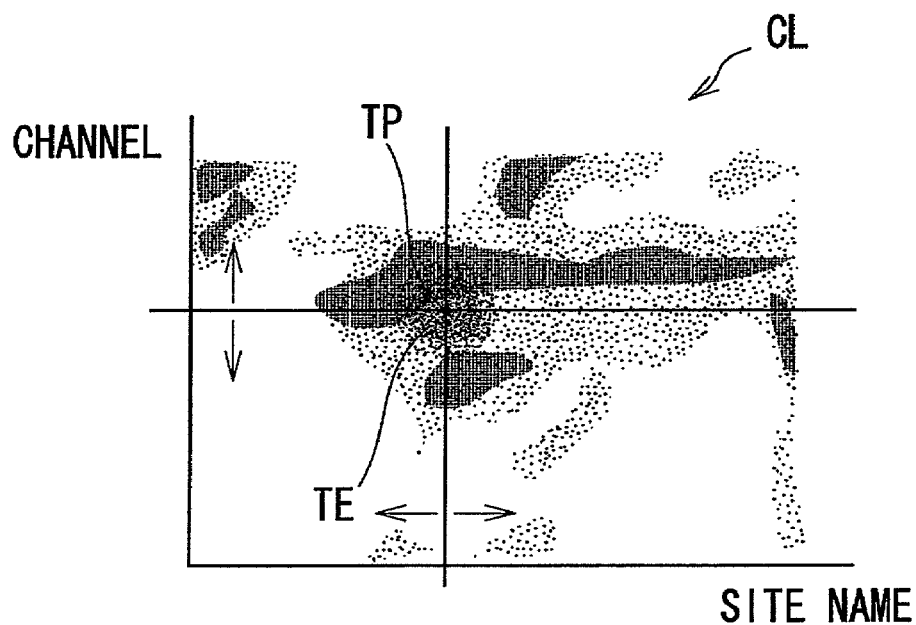
FIG. 32 is a view used for explaining a condition where a layer expressing other information is overlapped onto a position layer expressed by a channel and site name.

FIG. 32 illustrates a condition in which the horizontal axis provides the site names and the vertical axis provides the kinds of channels, and then the two-dimensional plane consisting of those site names and kinds of channels is taken to be a position layer (layer) on which a layer CL expressing other information is overlapped. Namely, the two-dimensional space illustrated in FIG. 32 expresses not only site names and kinds of channels, but also other information. The position layer is not limited to one consisting of site names and kinds of channels.

Here, the other information can be, for example, the number of accesses (degree of popularity) of each site WS, the updated date, the number of pages, the file size of the page, and so forth. The layer CL expresses the number of accesses, updated date, number of pages, file size and so forth by, for example, shading of color, different coloration or degree of brightness. In the case that the number of accesses (degree of popularity) of each site WS is expressed by shading of color of the layer CL, it is possible to express that sites indicated in a deep color in the layer CL have high popularity, while sites indicated in a light color in the layer CL have low popularity. In addition, in the case that the number of accesses of each site WS is expressed by coloration, it is possible to express that sites indicated in a green color in the layer CL have high popularity, while sites indicated in a blue color in the layer CL have low popularity. It should be noted that the tuning position TP and the tuning area TE are expressed by different colors from the color of the layer CL.

Figure 33:
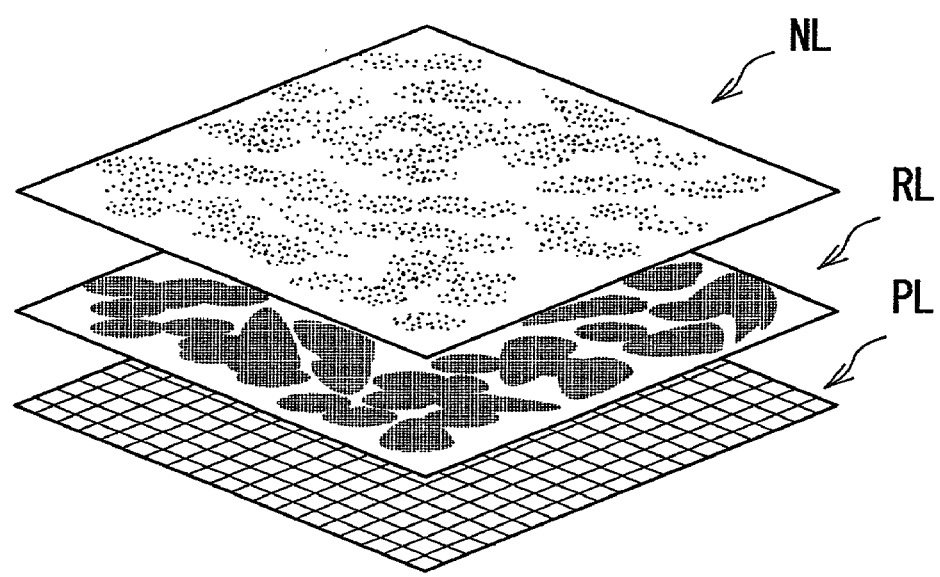
FIG. 33 is a view used for explaining the case in which layers expressing a degree of update and a degree of popularity are overlapped onto a position layer.

It is possible that not only one, but a plurality of layers may be overlapped on the position layer PL. FIG. 33 illustrates an example in which a layer NL expressing the frequency of updating, and a layer RL expressing the degree of popularity (the number of accesses) are overlapped on the position layer PL. It should be noted that layers PL, RL, NL are illustrated in FIG. 33 with each layer separated, however, these respective layers actually are overlapped on the two-dimensional plane. In addition, the layer NL expresses the frequency of updating and the layer RL expresses the degree of popularity by using different colorations, respectively.

Figure 34:
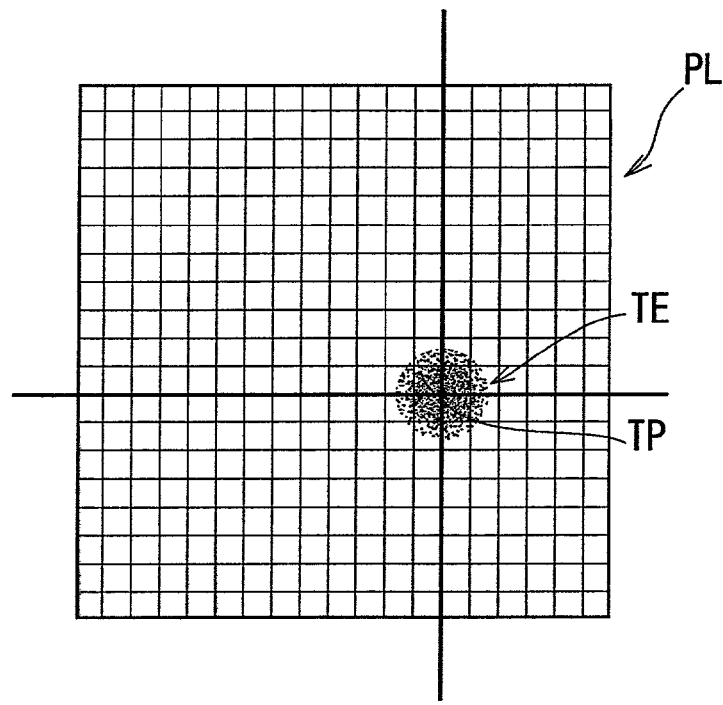
FIG. 34 is a view illustrating only a position layer.
Figure 35:
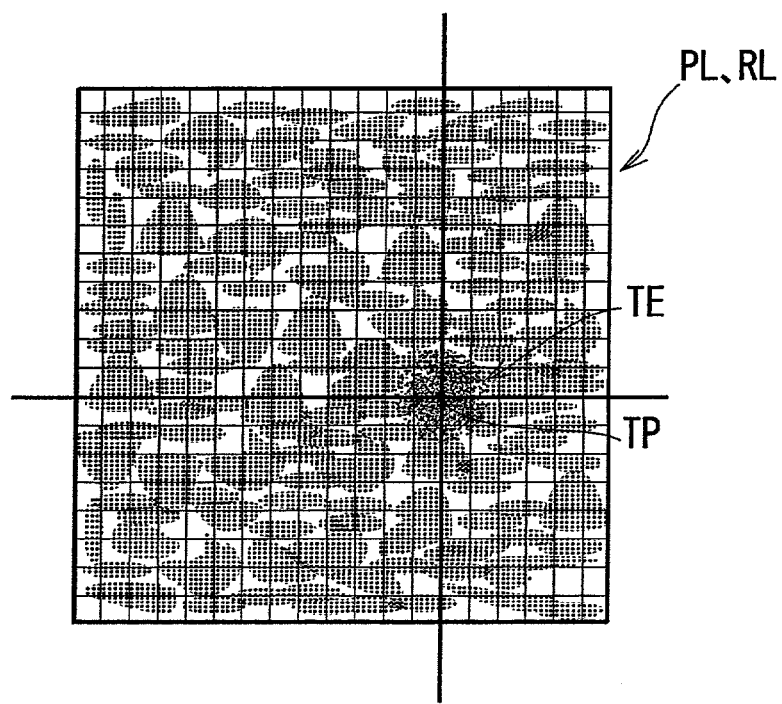
FIG. 35 is a view used for explaining conditions in which a layer expressing a degree of popularity is overlapped onto the position layer.
Figure 36:
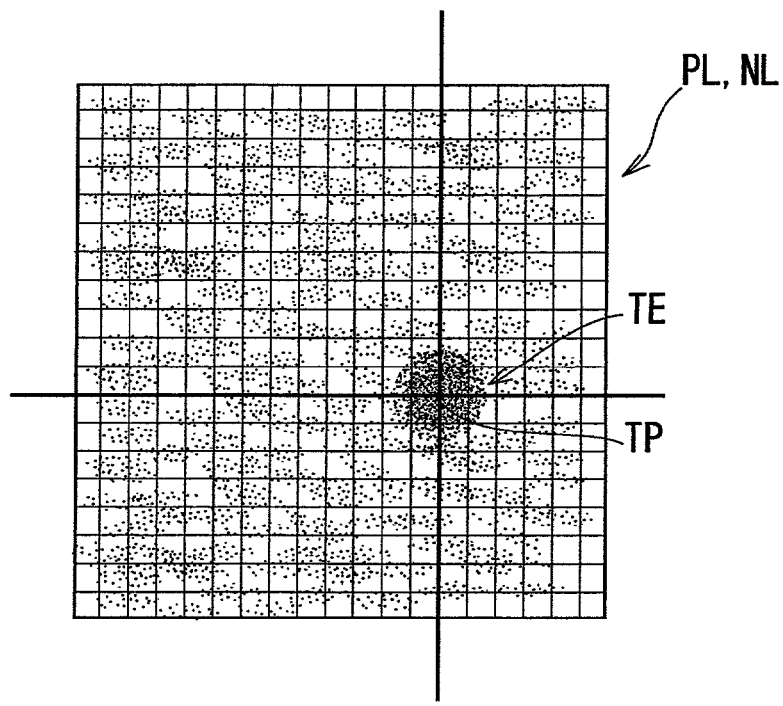
FIG. 36 is a view used for explaining conditions in which a layer expressing a degree of update is overlapped onto the position layer.
Figure 37:
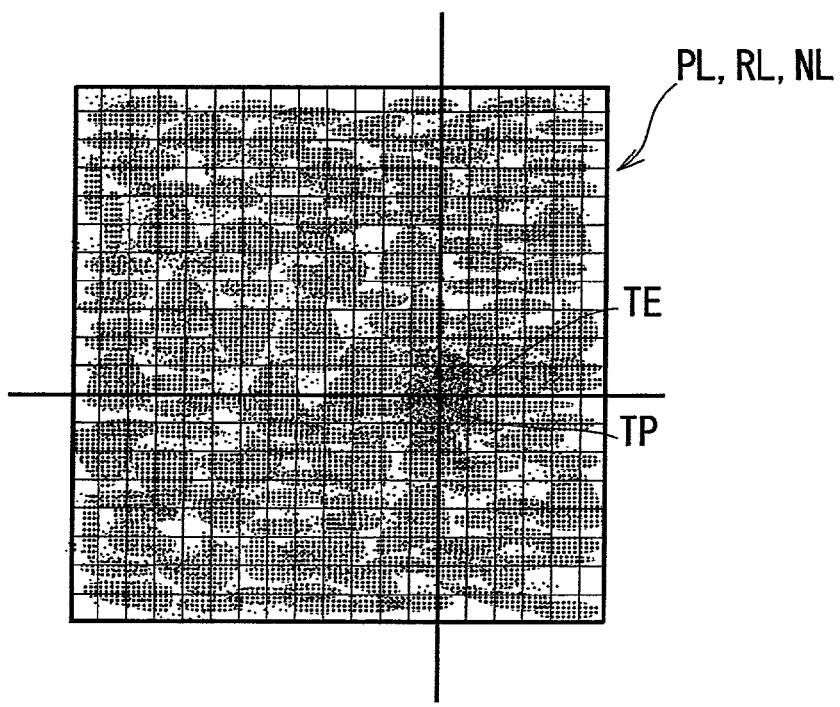
FIG. 37 is a view used for explaining conditions in which layers expressing a degree of popularity and a degree of update are overlapped onto the position layer.

FIG. 34 to FIG. 37 illustrate conditions in which the layer RL expressing the degree of popularity and/or the layer NL expressing the frequency of updating are overlapped on the position layer PL. FIG. 34 illustrates only the position layer PL, and FIG. 35 illustrates the condition in which the layer RL is overlapped on the position layer PL. If the layer RL is overlapped on the position layer PL as in FIG. 35, the degree of popularity of respective sites may be expressed by using the coloration of the layer RL. In addition, FIG. 36 illustrates the condition in which the layer NL is overlapped on the position layer PL. If the layer NL is overlapped on the position layer PL as in FIG. 36, the frequency of updating of the respective sites may be expressed due to the coloration of the layer NL. FIG. 37 illustrates the condition in which both the layer RL and the layer NL are overlapped on the position layer PL. If both the layer RL and the layer NL are overlapped on the position layer PL as in FIG. 37, a condition is provided in which the coloration of both the layer RL and the layer NL are overlapped and then both colors are mixed. Then both the degree of popularity and the frequency of updating of the respective sites may be expressed simultaneously due to the coloration after both colorations are mixed.

Registration of Favorite in the Case of Two-Dimensional Space

If a site arrangement is performed on the above-described two-dimensional space, the browser is capable of displaying the space on the monitor screen and is capable of registering respective sites WS as a favorite registration.

Figure 38:
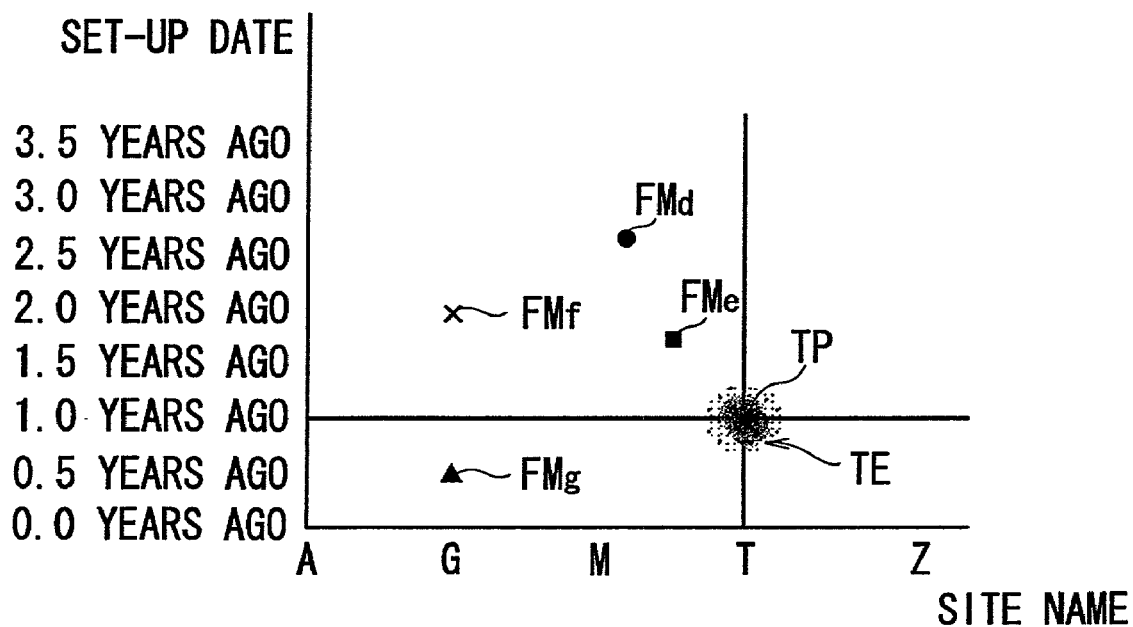
FIG. 38 is a view used for explaining conditions in which a favorite mark of a site is arranged in a two-dimensional space.

FIG. 38 illustrates an example in which the browser displays favorite marks FM expressing favorite registration positions on the two-dimensional space. The favorite marks FM may be have the same color or the same shape, or the favorite marks may have different colors or different shapes (FMd, FMe, FMf, FMg) as illustrated in FIG. 38. Thus, if favorite marks having different colors or different shapes are used, the user distinguishes easily each site WS registered as a favorite depending on the color and/or the shape of the favorite mark.

It should be noted that it is possible to adopt the same concept as that of the exemplary one-dimensional space described above in connection with the movement of the tuning position TP, the adjustment of the tuning area TE, the adjustment of the zooming-level, fine-tuning, and the adjustment of the tuning speed in the case of the two-dimensional space. Provided that in this case, the operating means for moving the tuning position TP is one that is capable of moving the tuning position in the vertical axis direction and in the horizontal axis direction.

Three-Dimensional Arrangement of Within-Channel Site Position

The respective sites are also capable of being arranged in a three-dimensional space.

Figure 39:
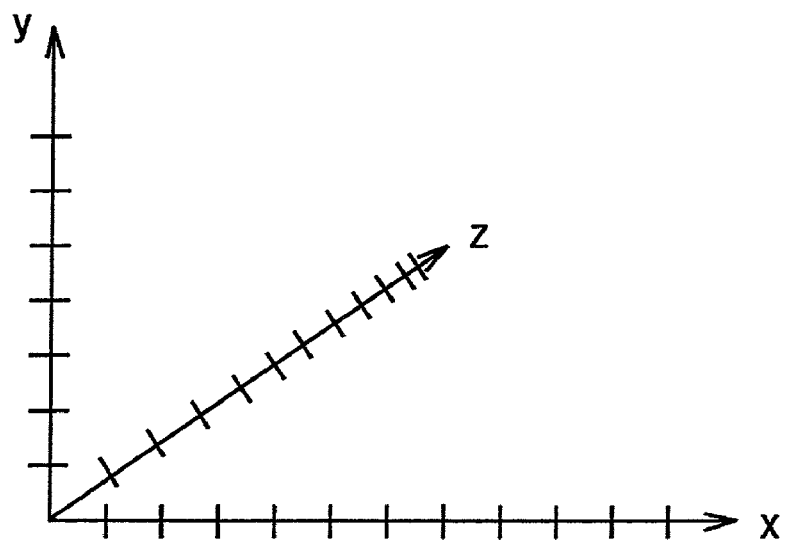
FIG. 39 is a view used for explaining a three-dimensional space in which respective sites are arranged.
Figure 40:
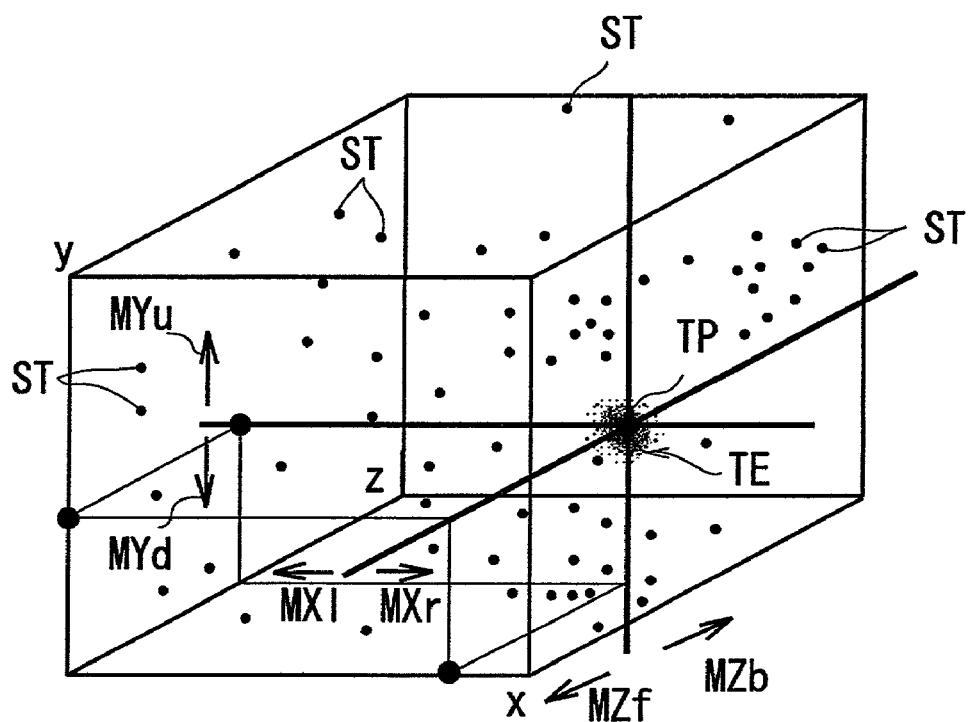
FIG. 40 is a view used for explaining site position, tuning position and tuning area when respective sites are arranged in the three-dimensional space.

FIG. 39 and FIG. 40 conceptually illustrate a site arrangement condition in which the respective sites are arranged in a three-dimensional space. FIG. 39 is a view in which the three-dimensional space is expressed using an x-axis, y-axis, and z-axis. FIG. 40 is a view illustrating the within-channel site position, the tuning position TP, and the tuning area TE within the three-dimensional space. In FIG. 40, respective points ST within the drawing express respective within-channel site positions. The tuning position TP is a point within the three-dimensional space. The tuning area TE is a spherical body having the tuning position TP as the center. In addition, the tuning position TP is capable of moving in the x-axis direction in the three-dimensional space as illustrated by arrows MXl, MXr within the drawing, in the y-axis direction in the three-dimensional space as illustrated by arrows MYu, MYd within the drawing, and in z-axis direction in the three-dimensional space as illustrated by arrows MZf, MZb within the drawing. Movement in the x-axis direction, y-axis direction, and z-axis direction may be carried out individually or simultaneously.

If the site WS is arranged in the three-dimensional space, the tuning area TE has a three-dimensional spread. Then, the sites WS corresponding to respective within-channel site positions ST included in the tuning area TE are displayed on the monitor screen. In addition, the browser controls the display condition of the respective sites WS depending on the distance from the tuning position TP to the respective within-channel site positions ST.

Figure 41:
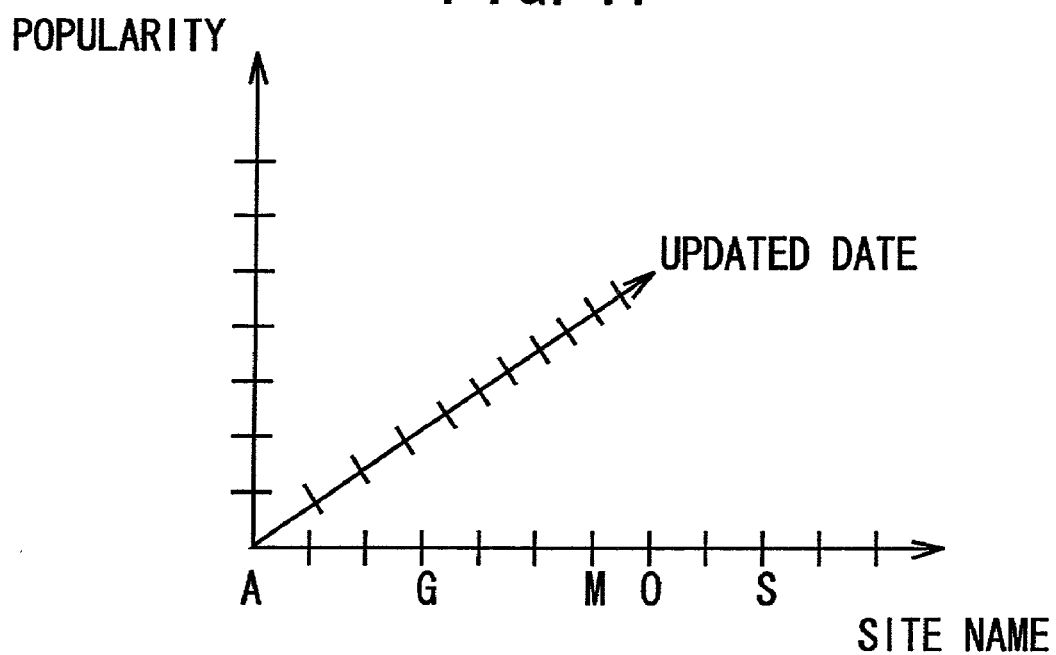
FIG. 41 is a view used for explaining a three-dimensional space consisting of degree of popularity, date of update and site name.
Figure 42:
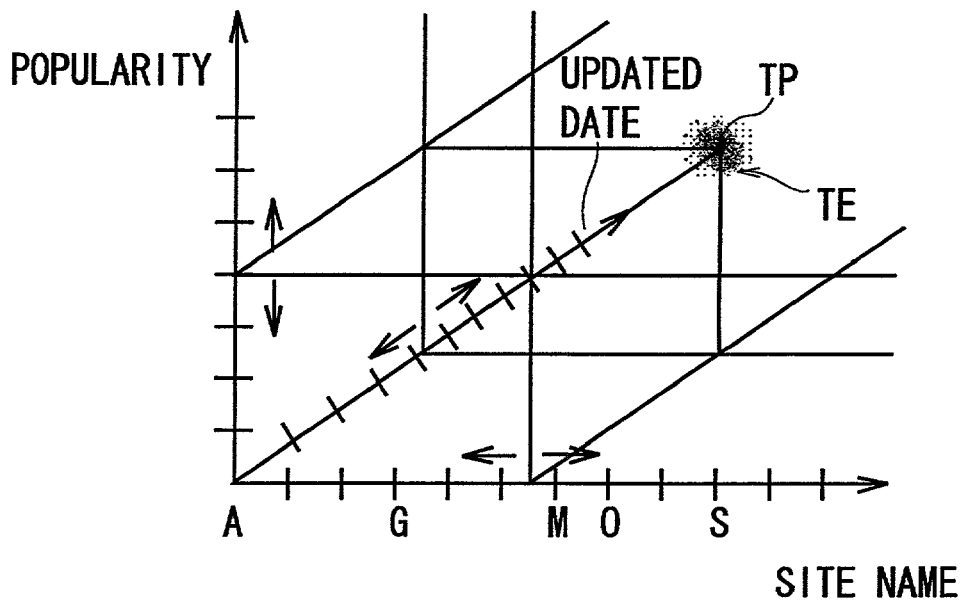
FIG. 42 is a view used for explaining a three-dimensional space consisting of degree of popularity, date of update and site name, tuning position and tuning area.

FIG. 41 and FIG. 42 illustrate the three-dimensional space in the case where the x-axis provides the site name (for example, in alphabetical order), the y-axis provides the degree of popularity, and the z-axis provides the updated date of the site. It is also possible that the y-axis and/or z-axis may provide the number of accesses, the number of pages, the file size of the page and so forth. Of course, the site name may be provided by any axis other than the x-axis. FIG. 42 is a view illustrating only the tuning position TP and the tuning area TE on the three-dimensional space of FIG. 41.

Figure 43:
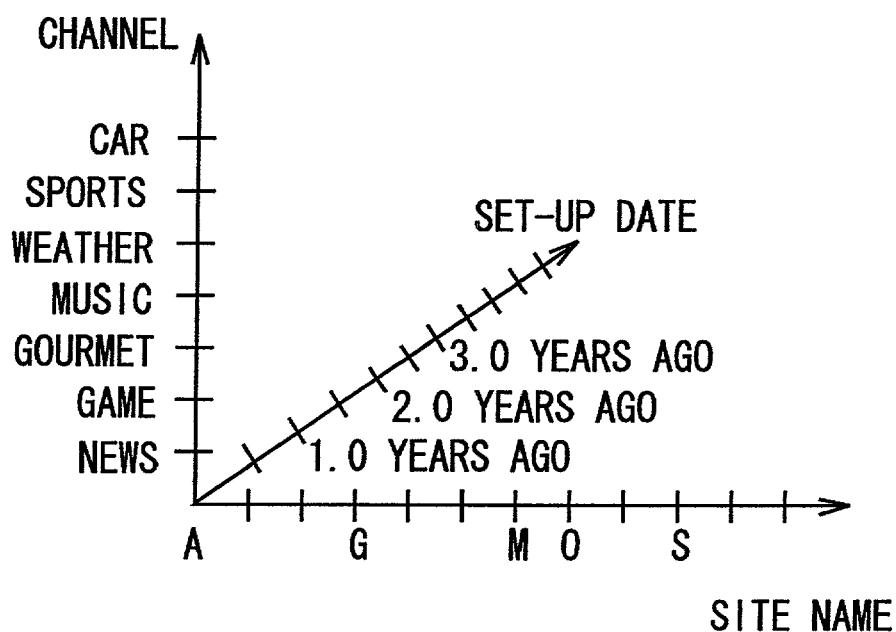
FIG. 43 is a view used for explaining a three-dimensional space consisting of channel, set-up date and site name.
Figures 44, 45:
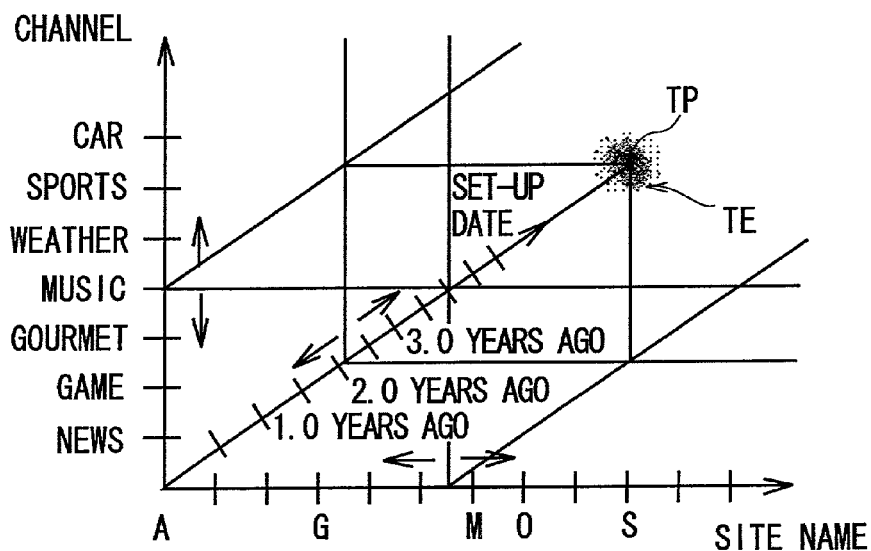
FIG. 44 is a view used for explaining a three-dimensional space consisting of channel, set-up date and site name, tuning position and tuning area.
FIG. 45 is a view used for explaining Metadata described on a page header.

FIG. 43 and FIG. 44 illustrate the three-dimensional space in the case where the x-axis provides the site name, the y-axis provides the kind of channel, and the z-axis provides the set-up date of the site. It is also possible for the z-axis to provide the updated date or degree of popularity, the number of accesses, the number of pages, the file size of the page or so forth. Of course, the site name may be provided by any axis other than the x-axis. FIG. 44 is a view illustrating only the tuning position TP and the tuning area TE on the three-dimensional space of FIG. 43.

It is not necessary for the size of the tuning area TE within the three-dimensional space to be constant, and the size of the tuning area TE may be relatively small or relatively large. It is also possible for the shape of the tuning area TE within the three-dimensional space to be not only a spherical body as in FIG. 40, FIG. 42 and FIG. 44, but also an elliptical body as in a so-called rugby ball. If the tuning area TE is an elliptical body, the number of sites within the tuning area TE changes in each of the x-axis, y-axis, and z-axis directions.

It is possible to adopt the same concept as that of the exemplary one-dimensional space described above in connection with the movement of the tuning position TP, the adjustment of the tuning area TE, the adjustment of the zooming-level, fine-tuning, and the adjustment of the tuning speed in the case of the three-dimensional space. Provided that in this case, the operating means for moving the tuning position TP is one that is capable of moving the tuning position in the x-axis direction, the y-axis direction and the z-axis direction in the three-dimensional space.

It is also possible that respective sites may be arranged in a multidimensional arrangement. In addition, if respective sites are arranged in the above-described two-dimensional or three-dimensional space or a multidimensional space of more than three dimensions, the axes of the respective dimensions can be arbitrarily set by the user, or one axis can be set by the user and others can be set by the browser.

Channel Classification of Site

Next, a classification method will be explained where a site on the Internet is classified in every described channel. The following two classification methods can be considered as methods for classifying the site in every channel.

One classification method is a method for dividing respective sites for each channel on the basis of a decision, where a person decides which channel the respective sites belong to in light of details of information provided by the respective sites on the Internet or the atmospheres of the respective sites. Since a person decides on the selection and division of respective sites in this classification method, it is possible to divide respective sites accurately even though the site has obscure details of information. It should be noted that the respective sites are each divided into one channel among plural kinds of channels prepared beforehand. The sites that are not capable of being classified into an existing channel are classified in a new genre of channel formed on a case-by-case basis.

The other classification method is one in which, when the computer accesses respective sites on the Internet, the computer reads characteristics of the page, and then the computer automatically divides the respective sites into channels on the basis of the characteristics. In this case, the computer divides the respective sites into plural kinds of channels prepared beforehand. In addition, the computer may form channels automatically on the basis of the characteristics of the respective sites, and then divide the sites into the formed channels.

A specific processing example of a classification method by the computer will be explained below, where the computer divides the respective sites for each channel on the basis of characteristics of the respective sites.

Generally, a Web page has a header PH as illustrated in FIG. 45. The header PH includes a Meta-Tag describing Metadata expressing characteristics of information within the page such as the author of the document, character codes, and so forth. In the example of FIG. 45, if the author's name of the Web page is, for example, "Name", the description of the tag for the author's name in the part indicated by MDn within the drawing is <META name="Author" content="Name">. Accordingly, the computer finds from the description of the tag for the author's name MDn that the author's name of this page is "Name". In addition, if the file of this page is described by "shift JIS code", the description of the file code tag in the part indicated by MDf within the drawing is <META http-equiv="content-type" content = "text/html; charset=shift$_{13}$ jis">. Accordingly, the computer finds that the file of this page is described by using "shift JIS code" from this file code tag MDf.

Here, Meta-Tag, as illustrated by MDc within the drawing, can be used as a channel generation dedicated tag for describing the category name of the channel. Namely, if this site is related to "News", the description of the channel generation dedicated tag MDc is <META channel= "NEWS">. Accordingly, if the channel generation dedicated tag MDc is described on the header PH, the computer can recognize that this site is related to "NEWS" by understanding this description of the channel generation dedicated tag MDc as a key word. Then the computer is capable of classifying this site in the channel of "NEWS".

In the case where there are a plurality of characteristics in the page, key words expressing individually those plural characteristics can be described as the Meta-Tag in the header PH. Accordingly, if key words expressing the above plural characteristics are described within the header PH as the Meta-Tag, the computer can classify the site on the basis of those Meta-Tags.

As described above, the computer, when accessing the respective sites, reads out Metadata (key words) expressing a characteristic of the page from the header PH of the respective pages, and analyzes the description of the Metadata, thereby automatically classifying those respective sites in respective channels.

Here, it can be considered that the computer executes channel classification of the sites at the server of the portal site, or at the client terminal of respective users. A specific configuration of a channel service provision site and/or a client terminal will be described later.

For the case that the server of the channel service provision site performs channel classification of the respective sites, since the server can judge simultaneously the number of accesses of respective sites and the update condition of the sites together with the channel classification, it becomes easy to provide information on the degree of popularity and/or the update condition of the respective sites described above. In addition, since the channel service provision site can easily collect information on a plurality of sites, it is possible to channel-classify more sites effectively. It should be noted that if the channel is formed by the channel service provision site, all of the client terminals connected to the Internet share the channel.

On the other hand, the client terminal which executes channel classification of the sites is one installed with software for reading-out Metadata and performing channel classification.

Flow of Acquisition of Metadata and Channel Classification Processing of Site

Figure 46:
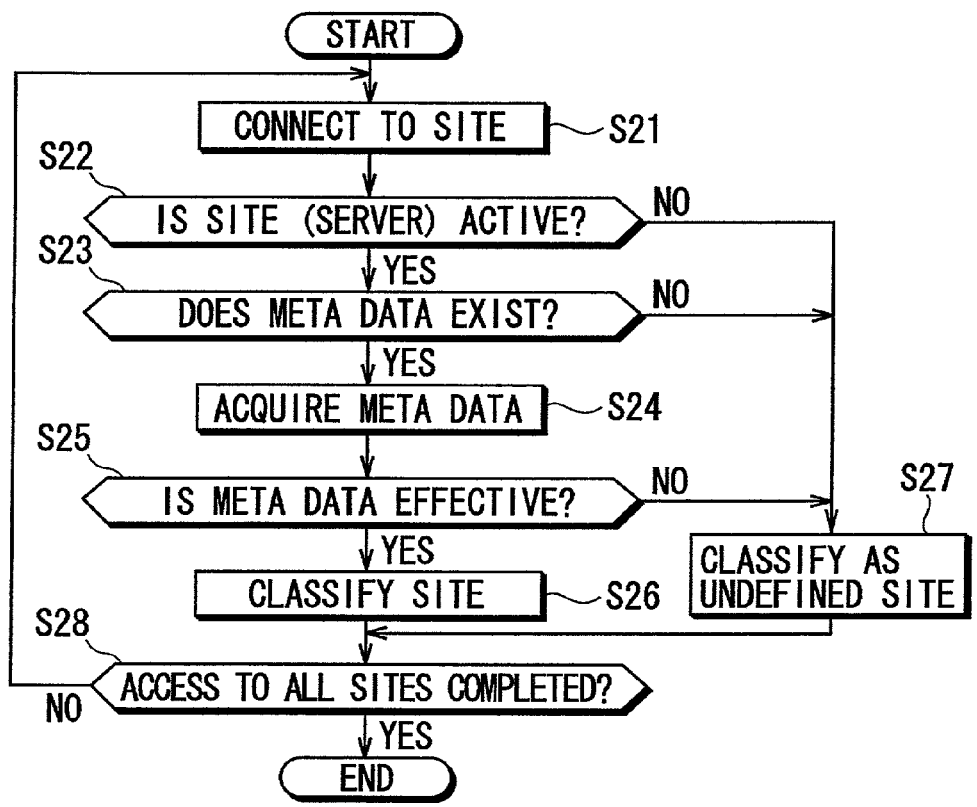
FIG. 46 is a flowchart illustrating the acquisition of Metadata in a computer and the processing of the channel classification of a site.

FIG. 46 illustrates the flow of acquisition of the Metadata and the processing of channel classification of the sites. The processing illustrated in this FIG. 46 is applicable to any computer of the server of the channel service provision site or the client terminal, where this processing is one in which the CPU of the computer executes the processing on the basis of a computer program (information generation program) for the channel classification.

Firstly, as the processing of STEP S21, a computer of the server of the channel service provision site or the client terminal or so forth (hereinafter simply referred to as the computer), accesses the Web site via the Internet. Next, as the processing of STEP S22, the computer determines whether the server of the accessed Web site is running. If the computer determines that the server is not running, the processing proceeds to STEP S27, whereas if the computer determines that the server is running, the processing proceeds to STEP S23.

Proceeding to the processing of STEP S23, after determining that the server is running in STEP S22, the computer determines whether the above-described Metadata exists in the header PH of the page. If the computer determines that the Metadata does not exist, the processing proceeds to STEP S27, whereas if the computer determines that the Metadata exists therein, the processing proceeds to STEP S24.

After determining that the Metadata exists in STEP S23, the computer extracts the Metadata from the header PH in the processing of STEP S24, the computer further determines whether the Metadata is effective information in the processing of STEP S25, namely, the computer determines whether the Metadata is usable information for channel classification of the site. If the computer determines that the Metadata is not effective at this STEP S25, the processing of the computer proceeds to STEP S27, while, if the computer determines that the Metadata is effective, the processing of the computer proceeds to STEP S26.

Proceeding to STEP S26, after determining that the Metadata is effective Metadata at STEP S25, the computer classifies the channel of this site using such effective Metadata.

Next, as the processing of STEP S28, the computer determines whether access to all the sites desired to perform channel classification has been completed. When access has not been completed, the processing of the computer returns to the processing of STEP S21, whereas when access has been completed, the processing of this FIG. 46 ends.

In addition, if the processing of the computer proceeds to the processing of STEP S27, the computer classifies this site as an undefined channel, before proceeding to the processing of STEP S28.

Upon completion of the above processing, the computer realizes channel classification of the respective sites. After that, the computer newly rearranges the sites subjected to channel classification in a desired order depending on the site name and/or the set-up date and so forth. The channel information after sorting is provided to the user as the desired channel.

Formation Example of Original Channel

In the above-described channel classification of the site, the user's taste is not particularly reflected in the arrangement of the sites in the respective channels. The formed channels are directly provided for the user.

A computer program (information generation program) for channel classification of the present embodiment can form original channels in which the user's preference (taste) is reflected, namely, this computer program can customize channels depending on the taste of the user.

Here, an original channel is formed on the basis of adjustment values from adjusting means capable of arbitrarily setting various values, such as, for example, a so-called graphic equalizer. It should be noted that a general graphic equalizer is one in which, if voice is taken as an example, the graphic equalizer adjusts only a desired frequency component from among a plurality of frequency components composing the voice, so that the graphic equalizer compensates for different acoustic characteristics feature caused by the listening environment or caused by the equipment being used. The graphic equalizer for forming the original channel is used when the number of sites to be arranged within respective channels classified into various genres is determined. Namely, the user determines the number of sites to be arranged within the channels of respective genres by determining the adjustment values of the graphic equalizer, depending on the user's own taste (preference). Then, the adjustment values of the graphic equalizer are sent to the computer. The computer classifies respective sites on the basis of the adjustment values of the graphic equalizer so as to arrange them within the respective channels.

Figure 47:
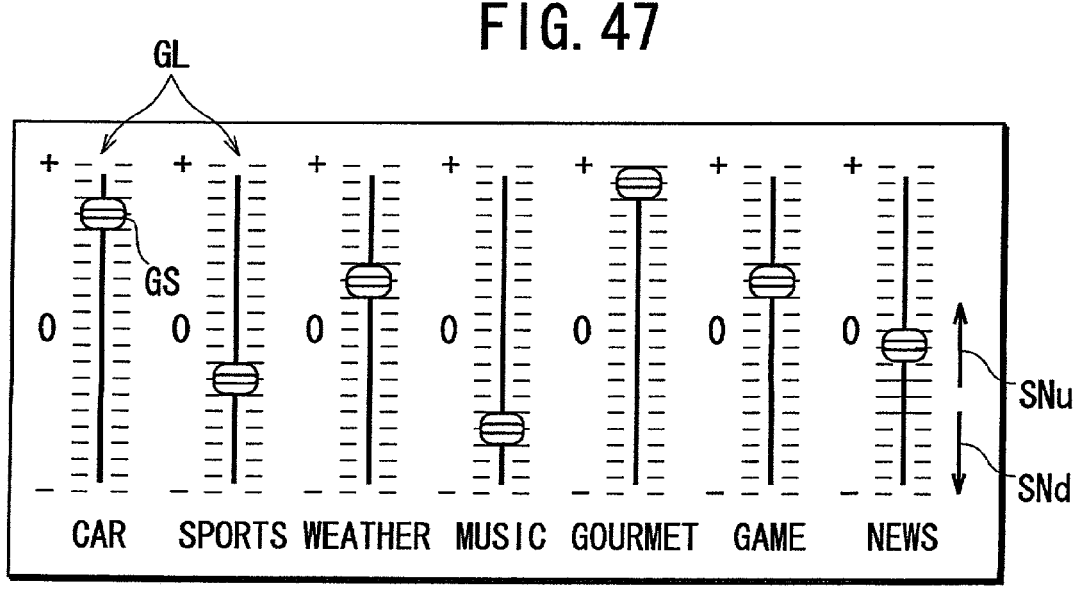
FIG. 47 is a view used for conceptually explaining a graphic equalizer of the present embodiment.

FIG. 47 illustrates a conceptual view of the graphic equalizer for forming original channels. It should be noted that this graphic equalizer may not be only a hardware-based one that the user actually operates by hand, but also may be a virtual one that is displayed on the monitor screen and operated depending on, for example, a mouse click operation, a cursor movement operation, and so forth.

The example of FIG. 47 exemplifies seven kinds of channels, namely, "car", "sports", "weather", "music", "gourmet", "game", and "news". The graphic equalizer is provided with seven adjustment bars GL, one for each of these seven channels. The respective adjustment bars GL are provided with adjusting sliders GS for setting the number of sites arranged within respective corresponding channels.

If the user moves the adjusting slider GS in the direction of arrow SNu (+direction) within the drawing, the computer sets a large number of sites arranged within the channel. Conversely, if the user moves the adjusting slider GS in the direction of arrow SNd (−direction) within the drawing, the computer sets a small number of sites arranged within the channel. The initial state of the original channels can be considered to be one in which, for example, as illustrated in FIG. 48, the respective adjusting sliders GS are all in a flat ("0" level) position.

The total number of sites arranged in all seven original channels may be a fixed number or may be a variable number. In addition, the number of sites arranged in the respective channels may be a fixed number or may be a variable number.

Figure 48:
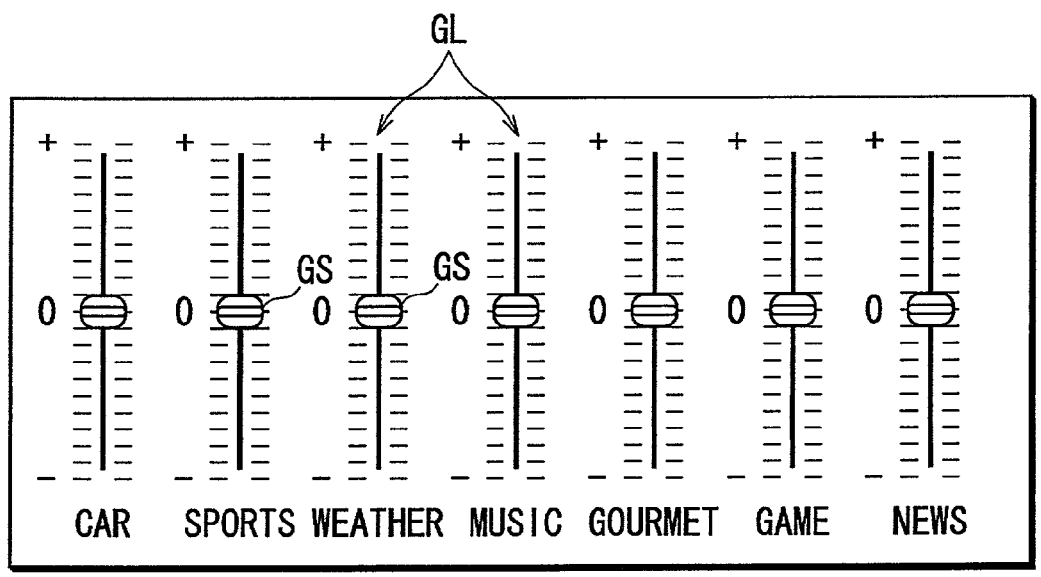
FIG. 48 is a view used for explaining a condition of the graphic equalizer in which the adjusting sliders are adjusted into flatness.

As illustrated in FIG. 48, if the adjustment values of the respective adjusting sliders are evened out (for example, the position of "0" level), the number of sites arranged within the respective channels is the same. For example, if 20 sites are arranged in each channel, the total number of sites in the seven original channels is 140 sites (7 channels×20 sites/channel=140 sites).

Figure 49:
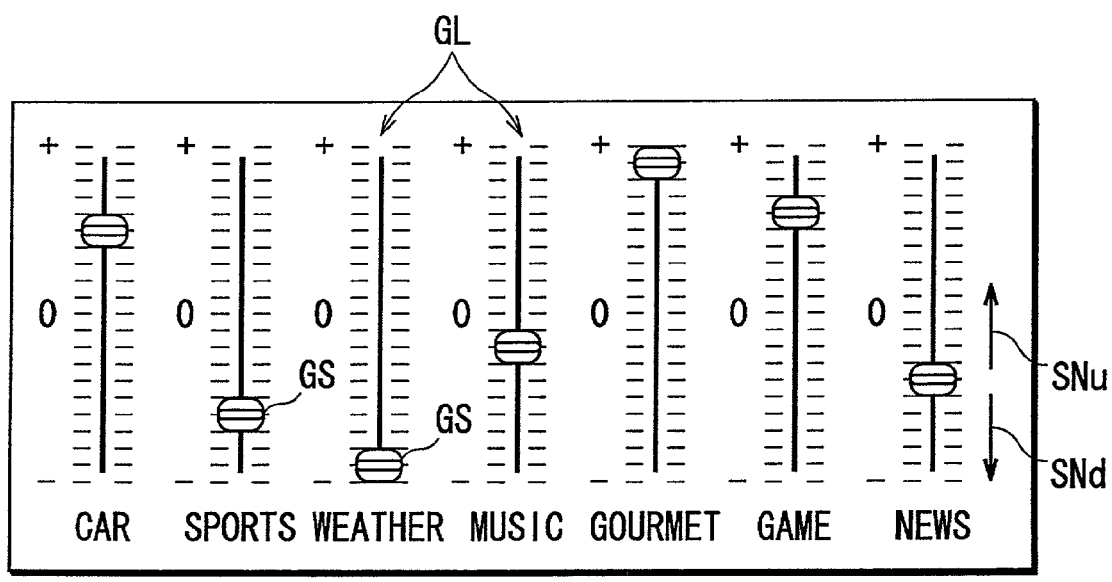
FIG. 49 is a view used for explaining an example of adjusting respective adjusting sliders of the graphic equalizer.

On the other hand, for example, as illustrated in FIG. 49, when the respective adjusting sliders GS are adjusted arbitrarily, the number of sites arranged within the respective channels depends on the adjustment values (level) of the respective adjusting sliders GS. When the total number of sites capable of being arranged in all seven original channels is set to a fixed number, the computer calculates the number of sites in each channel while using the fixed number and the adjustment values of the respective adjusting sliders GS of FIG. 49, and then the computer arranges the sites according to the number of sites at each channel. The calculation is carried out every time the graphic equalizer is operated. It should be noted that, in the example of FIG. 49, it is found that the user is most concerned with the channel of "gourmet", and secondly, the user has an interest in the channels of "game", "car" and "news". Conversely, the user has no interest in the channel of "weather". In particular, the adjustment level of the channel of "weather" is at a minimum value. For this reason, the computer allocates a large number of sites in relation to the channels of "gourmet", and "game", "car" and "news". Conversely, the computer allocates a small number of sites (for example, 0) to the channel of "weather".

When arranging the number of sites depending on the adjustment values of the adjusting sliders GS, the computer is capable of arranging the sites from the top (the popularity is high, or the updated day is latest, or so forth) in order with reference to, for example, the number of accesses of the respective sites (degree of popularity), and/or the update condition. Thus, if the sites are arranged in order from the site having high popularity or a new site having the latest updated date, respective original channels become useful ones for the user. If the arrangement of the sites is performed depending on the degree of popularity of the sites or the update condition, the computer stores therein information indicating the number of accesses (degree of popularity) or the update condition for every site of the respective channels as additional information. Of course, it is possible that the sites arranged within a channel are sites randomly selected without regard to the degree of popularity or updated date.

Figure 50:
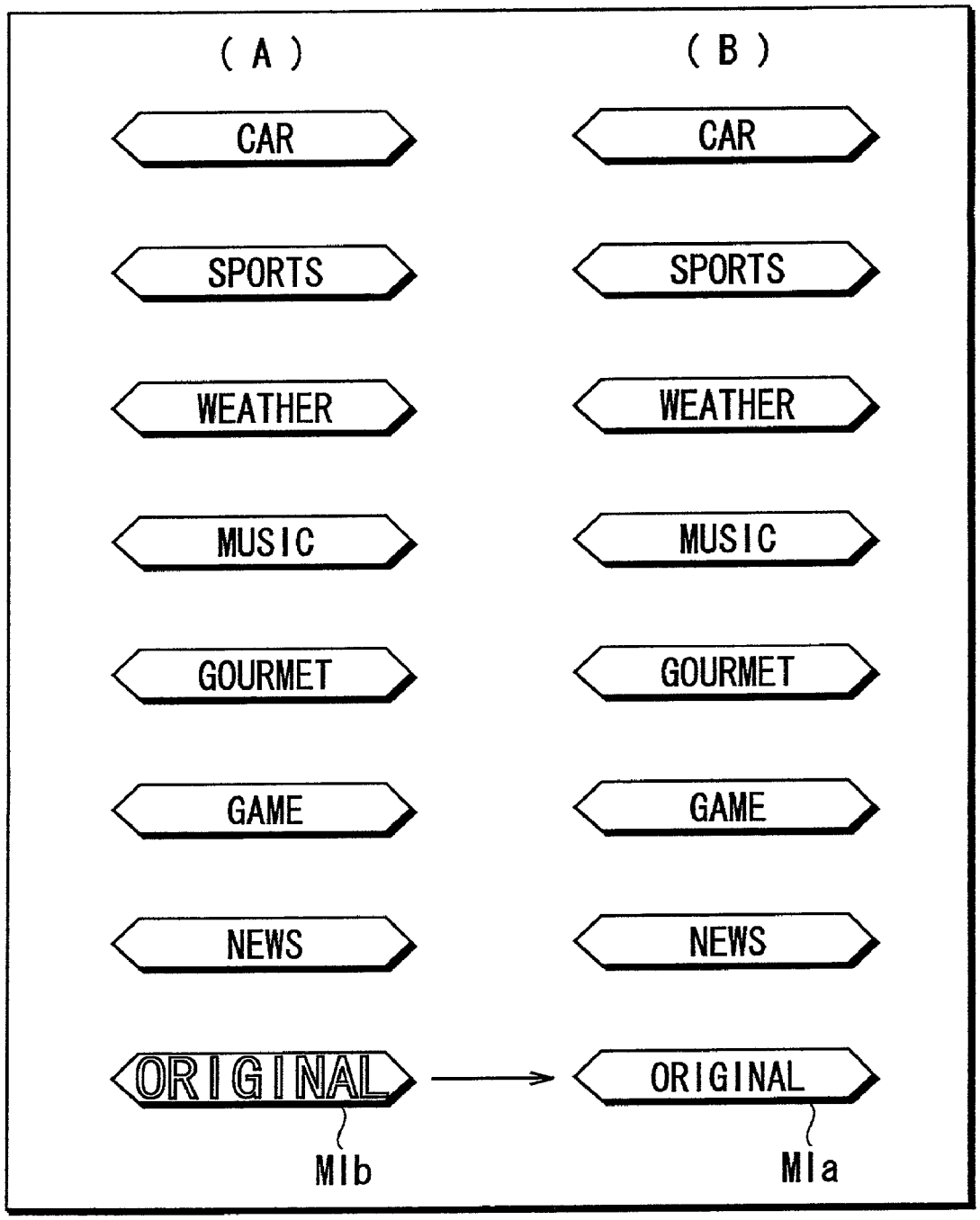
FIG. 50 is a view illustrating an exemplary display of a channel selection menu used on the occasion of selecting a desired channel from among a plurality of channels.

The use of the graphic equalizer is not limited to generating original channels. For example, it is possible to use the adjusting sliders GS of the graphic equalizer for selecting each channel itself. FIG. 50 illustrates a display example of the channel selection menu used when a desired channel is selected from among a plurality of channels. These respective channel selection menus are associated with respective adjusting sliders GS of the graphic equalizer. Here, if the adjusting slider GS corresponding to the original channel is selected by the user from among the adjusting sliders GS of the graphic equalizer, the computer, as illustrated in (A) of FIG. 50, displays menu item MIb indicating the original channel by using a display of outline characters on a colored background. Then, if the adjusting slider GS corresponding to the menu item MIb of the original channel is operated by the user, the computer, as illustrated in (B) of FIG. 50, changes the display of the menu item MIb into menu item MIa.

The computer is capable of preserving the respective adjustment values of the above-described graphic equalizer. If the respective adjustment values of the graphic equalizer are preserved, the computer is capable of easily evoking the channels of the user's taste by reading out the preserved adjustment values.

The adjustment values of the graphic equalizer may be not only values obtained due to operation of the respective adjusting sliders GS by the user, but also may be prepared beforehand as preset values on the channel service provision site. In this case, the channel service provision site provides the preset values to the client terminal for the user if necessary. It should be noted that the channel service provision site provides the preset values for pay, or provides the preset values free of charge for the user. For example, when the preset value expressing the favorite channel of a certain celebrity is prepared at the channel service provision site, the user can peruse the favorite channel of the celebrity by acquiring the preset value. The adjustment values and/or preset values of the graphic equalizer may be exchanged among fellow friends and may be shared with fellow friends.

The preset value may be one that is not defined as a channel on the client terminal of the user. If considering a genre that is not included in the above-described seven channels, such as, for example, "leisure", the preset value is highly set in connection with the adjustment values of the three channels of "weather", "gourmet", and "car", which may be deeply concerned with "leisure", and the adjustment values of the other channels are set flat (for example, the position of "0" level). Accordingly, information of a genre that is not defined is added to the original channel.

Flow of Original Channel Formation Processing

It is considered that there are two cases, in which, for example, the channel service provision site forms the original channel depending on information (the adjustment values of the graphic equalizer) from the user, or the client terminal of the respective users forms the original channel depending on the adjustment values of the graphic equalizer.

When the channel service provision site generates the original channel, the client terminal of the user sends the adjustment values of the graphic equalizer to the channel service provision site. The channel service provision site at this time takes out information of the number of sites depending on the adjustment values of the graphic equalizer from among information of a plurality of the sites classified in every channel beforehand, and then transmits the channel formed by the information of the site taken out to the client terminal side as the original channel for the user.

Figure 51:
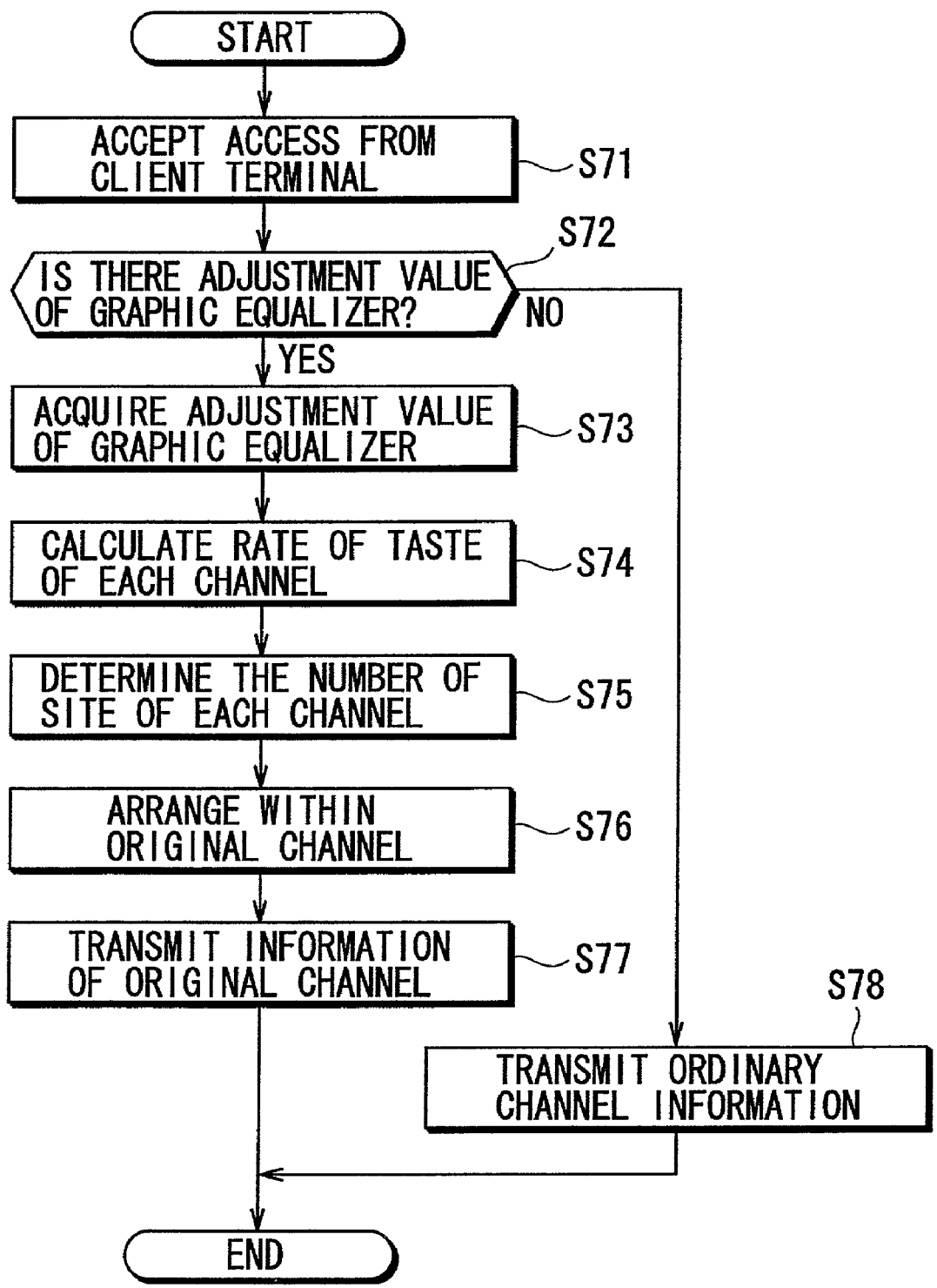
FIG. 51 is a flowchart of processing in the case that a portal site generates an original channel.

FIG. 51 illustrates a flow of processing when the channel service provision site generates the original channel. This processing is principally carried out by the server (computer) of the channel service provision site depending on a computer program (information generation program) for channel classification including original channel formation processes.

Upon receiving access from the client terminal in STEP S71, the server, as the processing of the next STEP S72, determines whether information of the adjustment values of the graphic equalizer is included in the information sent from the client terminal. In STEP S72, when the server determines that information of the adjustment values of the graphic equalizer is not included, the server, as the processing of STEP S78, transmits ordinary channel information that is not the original channel to the client terminal, before terminating processing.

On the contrary, in STEP S72, when the server determines that information of the adjustment values of the graphic equalizer is included in the transmission information from the client terminal, the server, as the processing of STEP S73, extracts the information of the adjustment values from among the transmission information.

Acquiring the adjustment values of the graphic equalizer at STEP S73, the server, as the processing of STEP S74, calculates the rate (the rate of site arrangement in every respective channel) of the user's taste on the basis of the adjustment values. Further, as the processing of STEP S75, the server determines the number of sites being arranged to the respective channels on the basis of the ratio.

Next, as the processing of STEP S76, the server arranges the information of the sites determined in each channel on the inside of the channel, respectively, to generate the original channel. After that, as STEP S77, the server transmits information of the original channel to the client terminal.

On the other hand, when the client terminal forms the original channel, the processing of the following three patterns can be considered.

The first pattern is a processing where the client terminal takes out information of the number of sites depending on the adjustment values of the graphic equalizer from among a plurality of sites that have been classified beforehand. The second pattern is a processing where the channel service provision site acquires only information of the number of sites depending on the adjustment values of the graphic equalizer from among a plurality of sites that have been classified beforehand. The third pattern is a processing where, for example, the channel service provision site entirely acquires all information of a plurality of sites that have been classified beforehand, and then takes out information of the number of sites depending on the adjustment values of the graphic equalizer from among information of a plurality of sites that are acquired in order to form the original channel.

Figure 52:
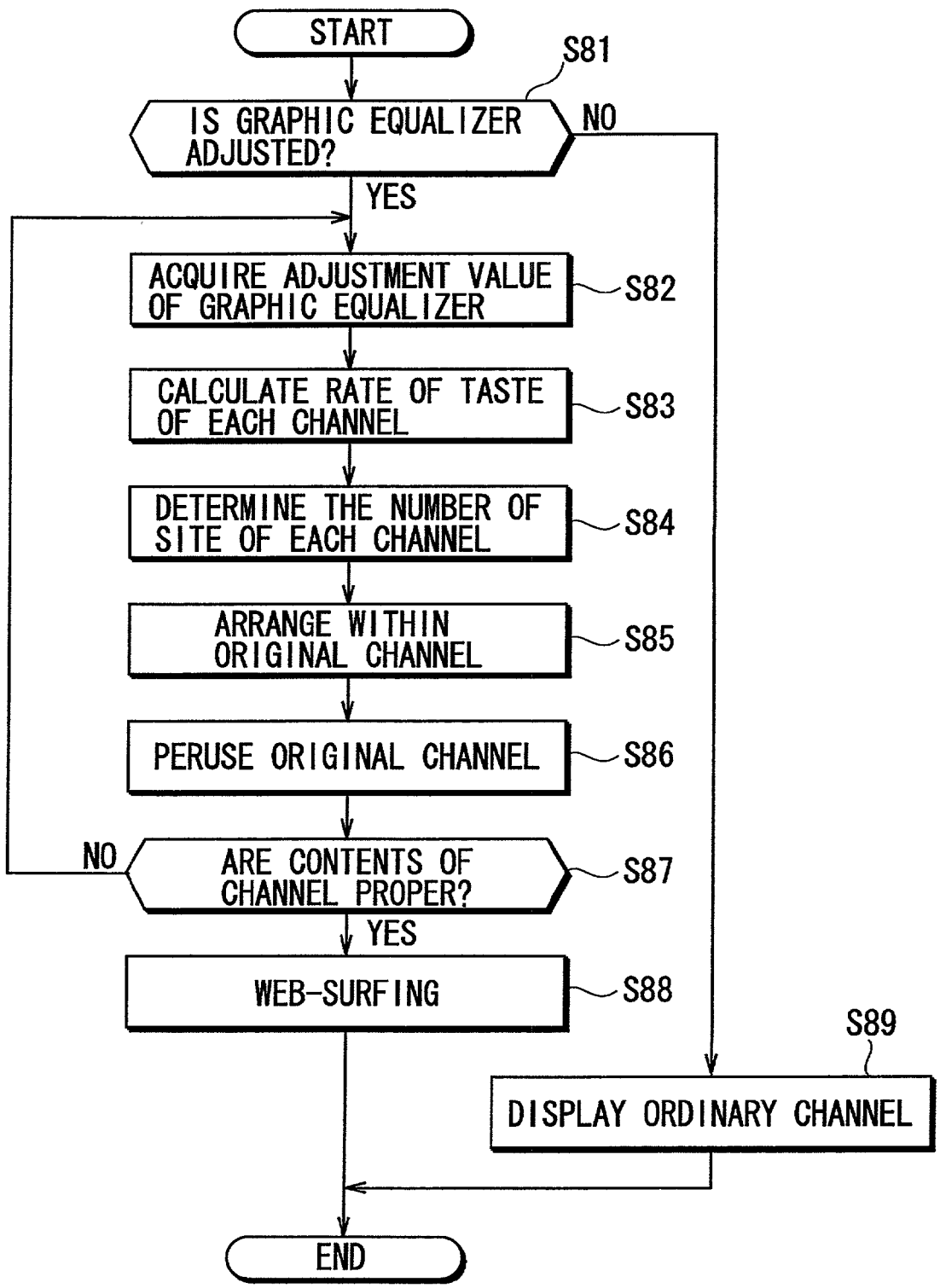
FIG. 52 is a flowchart of processing in the case that a client terminal forms an original channel depending on the adjustment values of the graphic equalizer using information of a plurality of the sites classified beforehand.

FIG. 52 illustrates the flow of processing of the first pattern. It should be noted that this processing of the first pattern is mainly carried out by the internal CPU of the client terminal depending on the computer program (information generation program) for channel classification including the original channel formation processing.

As the processing of STEP S81, the client terminal determines whether the graphic equalizer is adjusted. When the graphic equalizer is not adjusted, as the processing of STEP S89, the client terminal displays an ordinary channel on the monitor screen, then processing is terminated.

On the contrary, when it is determined that the adjustment of the graphic equalizer has been completed, as the processing of STEP S82, the client terminal acquires information of the adjustment values of the graphic equalizer.

Based on the adjustment values of the graphic equalizer, the client terminal, as the processing of STEP S83, calculates the rate of site arrangement in each channel depending on the taste of the user described above. Further, as the processing of STEP S84, the client terminal determines the number of sites arranged at the respective channels on the basis of the rate.

Next, as the processing of STEP S85, the client terminal generates the original channel, where the respective information of the sites determined in each channel is arranged in the channel.

After that, as the processing of STEP S86, the client terminal displays details included in the original channel on the monitor unit. Then, as the processing of STEP S87, the client terminal confirms to the user whether these details of the original channel are proper. When the user declines the details of the original channel in the confirmation request of this STEP S87, the processing of the client terminal returns to STEP S82, while when the user permits the details of the original channel, the processing proceeds to the next STEP S88.

Proceeding to STEP S88, the client terminal displays sites within the respective channels depending on the specification of the tuning position by the user. This enables the user to peruse the sites within the respective channels.

Figure 53:
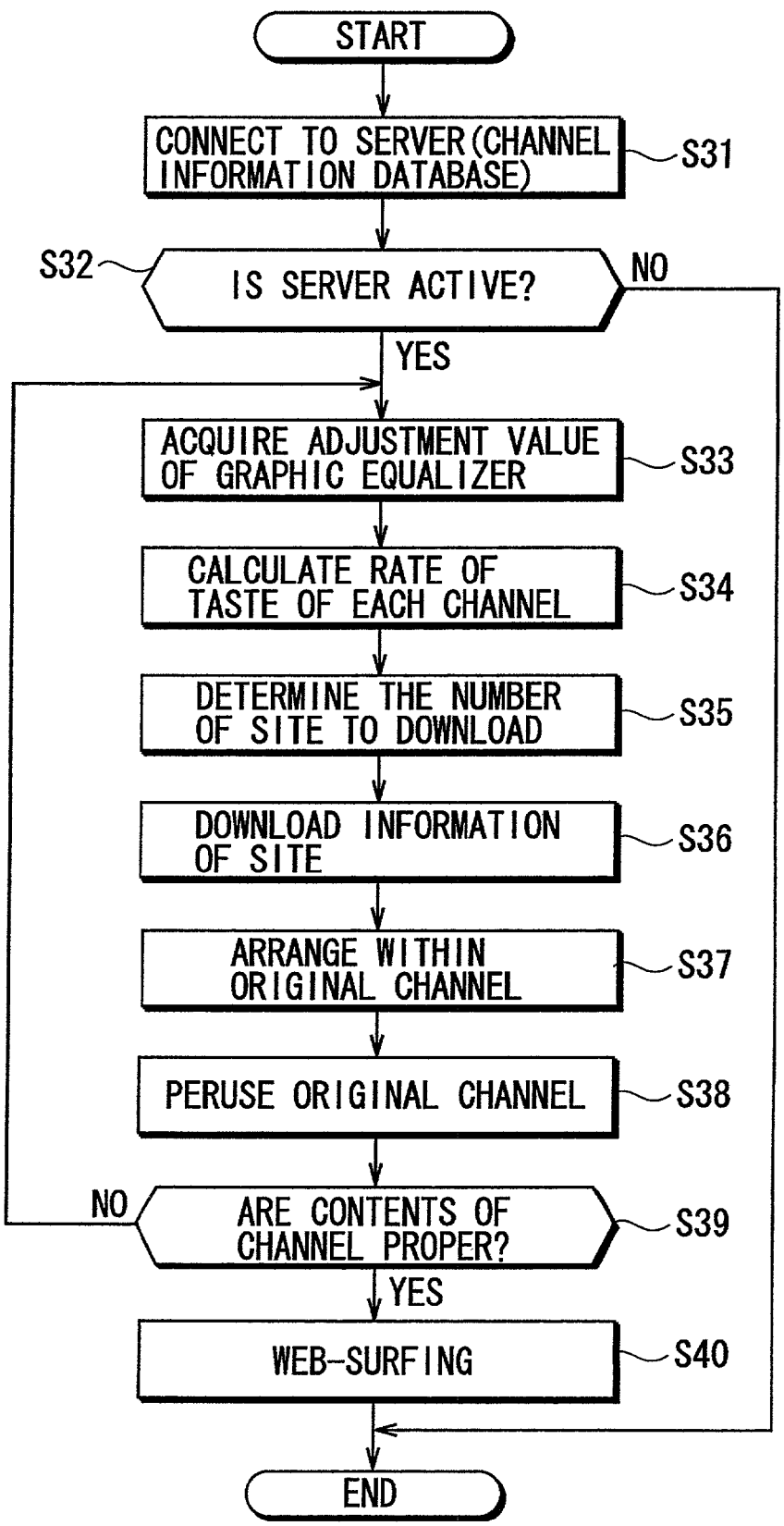
FIG. 53 is a flowchart of processing in the case that a channel service provision site forms an original channel depending on the adjustment values of the graphic equalizer according to a client terminal from among a plurality of sites undergoing channel classification beforehand.

FIG. 53 illustrates the flow of processing of the second pattern. The processing of this second pattern is one which the internal CPU of the client terminal principally carries out depending on the computer program (information generation program) of the embodiment of the present invention.

As the processing of STEP S31, the client terminal connects to the server of the channel service provision site via the Internet. It should be noted that the server, of the channel service provision site, at this time, has a channel information database holding information of a plurality of sites which have been channel-classified beforehand. Connecting to the server, the client terminal, as the processing of STEP S32, determines whether the server is operating normally. If the server is not operating normally, the processing of this FIG. 53 terminates, while if the server is operating normally, the processing proceeds to STEP S33.

Proceeding to the processing of STEP S33, the client terminal acquires information of the adjustment values of the graphic equalizer.

Based on the adjustment values of the graphic equalizer, the client terminal, as the processing of STEP S34, calculates the rate of site arrangement in each channel depending on the taste of the user. Further, as the processing of STEP S35, the client terminal determines the number of sites arranged at the respective channels on the basis of the rate.

Next, as the processing of STEP S36, the client terminal requests information of the number of sites to be acquired in each determined channel from the server of the channel service provision site. The client terminal then acquires the information of the sites sent from the server depending on the requirement.

Acquiring information of the sites from the server of the channel service provision site, the client terminal, as the processing of STEP S37, generates an original channel in which the respective sites in each channel are arranged within the channel.

After that, as the processing of STEP S38, the client terminal displays details included in the original channel on the monitor unit. As the processing of STEP S39, the client terminal then confirms to the user whether these details of the original channel are proper. When the user declines the details of the original channel in STEP S39, the processing of the client terminal returns to STEP S33, whereas when the user accepts the details of the original channel, the processing proceeds next to STEP S40.

Proceeding to STEP S40, the client terminal displays the sites within the respective channels depending on the specification of the tuning position by the user. This enables the user to peruse the sites within the respective channels.

Figure 54:
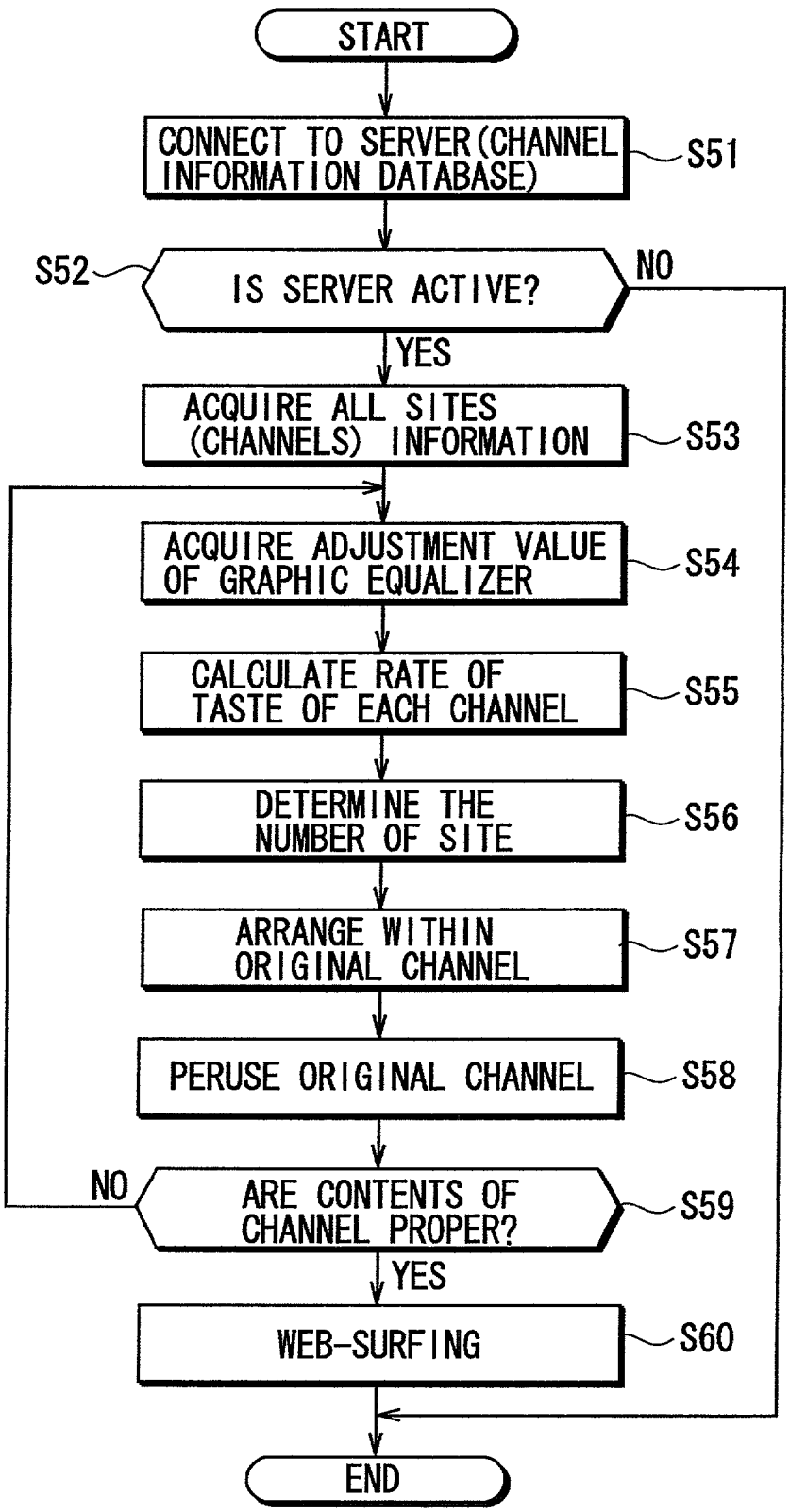
FIG. 54 is a flowchart of processing in the case that a channel service provision site forms an original channel depending on the adjustment values of the graphic equalizer according to a client terminal after acquiring all site information undergoing channel classification beforehand.

FIG. 54 illustrates the flow of processing of the third pattern. This processing of the third pattern is one which the internal CPU of the client terminal principally carries out depending on the computer program (information generation program) of the embodiment of the present invention.

As the processing of STEP S51, which is the same as STEP S31 of FIG. 53, the client terminal connects to the server of the channel service provision site via the Internet. The server of the channel service provision site, at this time, has a channel information database holding information of a plurality of sites which have been channel-classified beforehand. Connecting to the server, the client terminal, as the processing STEP S52, determines whether the server is operating normally. If the server is not operating properly, the processing of this FIG. 54 terminates, while if the server is operating normally, the processing proceeds to STEP S53.

Proceeding to the processing of STEP S53, the client terminal acquires information about all of the sites having been channel classified in the block from the server of the channel service provision site.

Next, as the processing of STEP S54, the client terminal acquires information of the adjustment values of the graphic equalizer.

Based on the adjustment values of the graphic equalizer, the client terminal, as the processing of STEP S55, calculates the rate of site arrangement in each channel depending on the taste of the user. Further, the client terminal, as the processing of STEP S56, determines the number of sites arranged at the respective channels on the basis of the rate.

Next, as the processing of STEP S57, the client terminal takes out only information of the sites determined previously from among the information of all the sites acquired from the channel service provision site by the processing of STEP S53. The client terminal then generates the original channels in which the taken out information of the sites is arranged within the respective channels.

After that, as the processing of STEP S58, the client terminal displays details included in the original channels on the monitor unit. As the processing of STEP S59, the client terminal confirms to the user whether these details of the original channels are proper. When the user declines the details of the original channels in STEP S59, the processing of the client terminal returns to STEP S54. On the other hand, when the user accepts the details of the original channels, the processing proceeds next to STEP S60.

Proceeding to STEP S60, the client terminal displays the sites within the respective channels depending on the specification of the tuning position by the user. As a result, the user is able to peruse the sites within the respective channels.

In the case of the third pattern illustrated in FIG. 54, since the client terminal acquires information about all sites from the server in the block, once the information has been acquired, it is possible for the client terminal to form and update the original channel even though the client terminal is not connected to the server thereafter. This is an advantage for the third pattern.

Flow of Web Site Perusal

Figure 55:
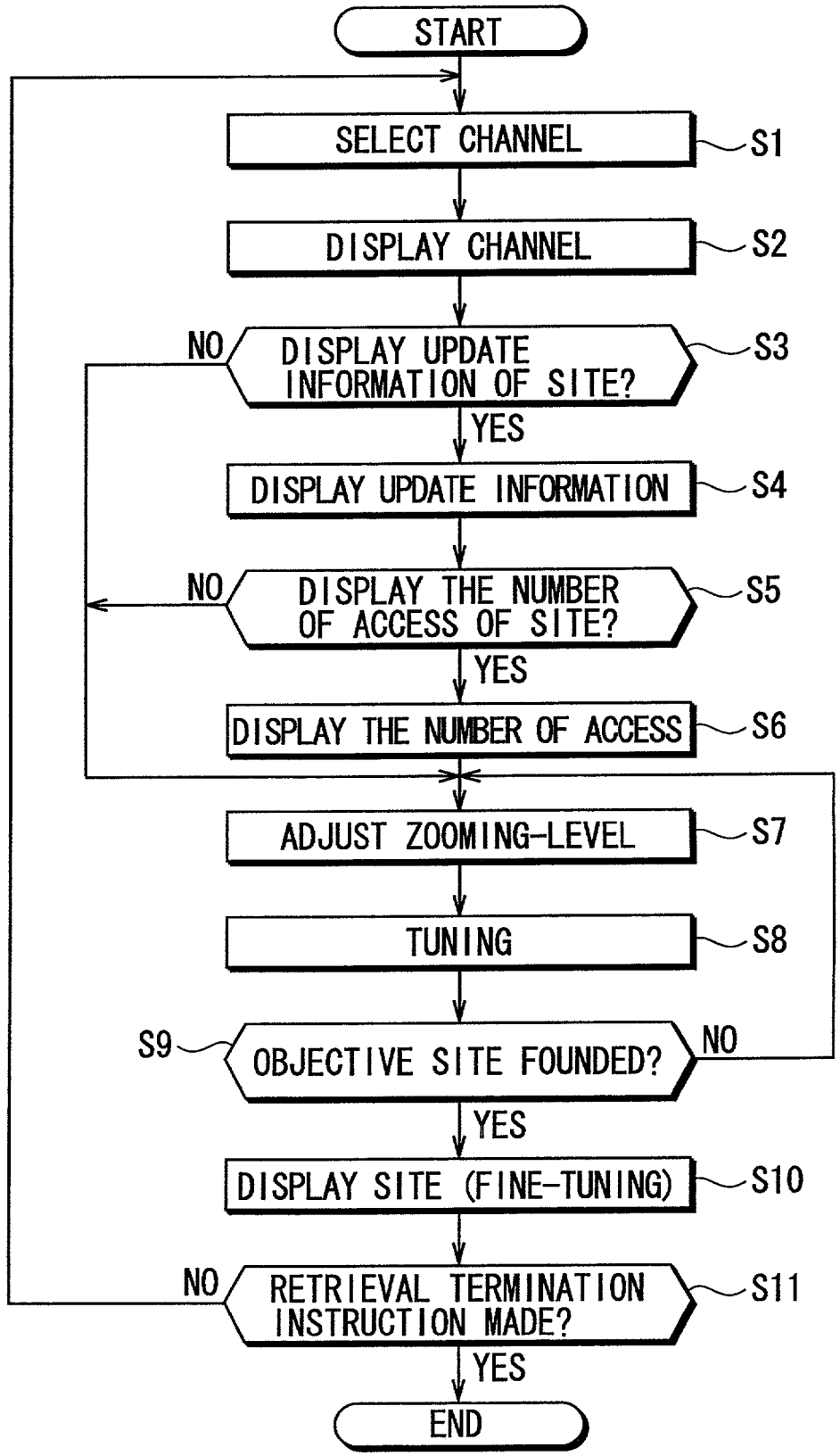
FIG. 55 is a flowchart on the occasion that a client terminal peruses a site practically.

The flow of an actual perusal of a Web site by the client terminal by using the channel formed as described above will be explained by the use of FIG. 55. This processing is one which the internal CPU of the client terminal principally carries out depending on the computer program (information perusal program) of the embodiment of the present invention.

As the processing of STEP S1, the client terminal monitors the operation signal of the tuning controller. When an instruction signal for channel selection is obtained from the tuning controller, the client terminal selects a channel corresponding to the instruction signal.

Next, as the processing of STEP S2, the client terminal displays on the monitor screen the above-described tuning position TP, tuning curve TC, tuning area TE, within-channel site position ST and so forth with respect to the selected channel. In addition, as the processing of STEP S3 and STEP S5, the client terminal determines whether a setting has been made to display update information (freshness of information) and/or the number of accesses (degree of popularity) of the respective sites. When a setting has been made to display either one or both of them, as the processing of STEP S4 and STEP S6, respectively, the client terminal displays the update information and/or the number of accesses in conjunction with the channel.

Next, as the processing of STEP S7, when a signal providing instructions for adjusting the zooming-level is obtained from the tuning controller, the client terminal adjusts the zooming-level corresponding to the instruction signal. In addition, as the processing of STEP S8, when an instruction signal for moving the tuning position TP is obtained from the tuning controller, the client terminal carries out tuning by moving the tuning position TP corresponding to the instruction signal.

At the time of tuning, the client terminal, as the processing of STEP S9, determines whether the user can find the objective site. That is, the client terminal determines whether a signal providing instructions for fine-tuning has been obtained from the tuning controller. When a signal providing instructions for fine tuning has been obtained, the processing proceeds to STEP S10, while when obtaining matters except for the above, the processing returns to STEP S7.

When the client terminal determines that the objective site has been found in STEP S9, as the processing of STEP S10, the client terminal displays only the objective site on the monitor screen (execution of fine tuning).

After that, the client terminal determines whether the user has provided instructions to terminate perusal of the site. When the user has not provided termination instructions, the processing returns to STEP S1, while when the user has provided termination instructions, the processing of this FIG. 55 terminates.

The Entire Configuration of System

Figure 56:
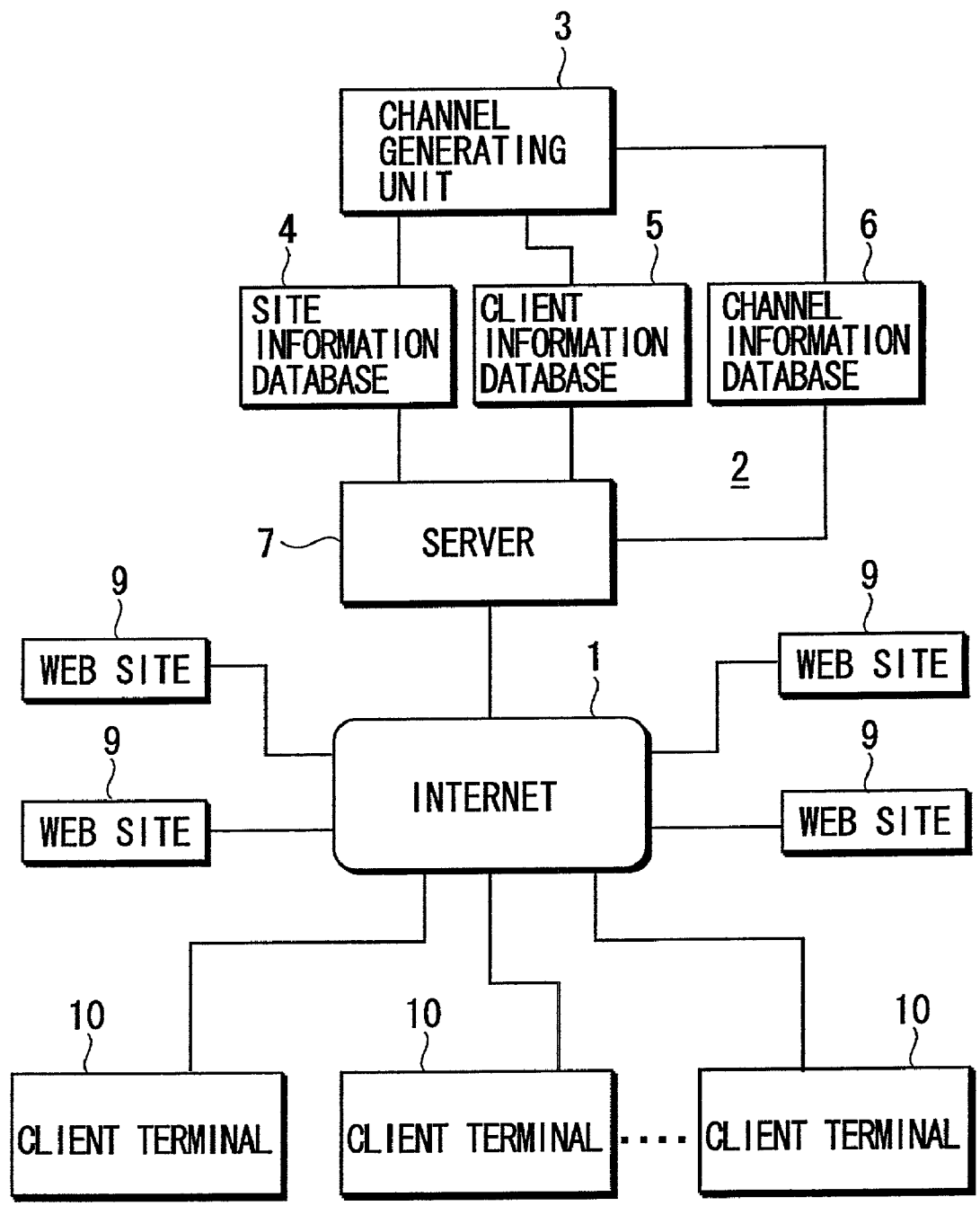
FIG. 56 is a block diagram illustrating the entire configuration of a system in order to realize information perusal processing.

FIG. 56 illustrates the entire configuration of a system for realizing information perusal processing according to the above-described present embodiment.

The system illustrated in FIG. 56 comprises a channel service provision site 2 connected to the Internet 1, a plurality of Web sites 9 including sites arranged on a channel, and a plurality of client terminals 10. The example of FIG. 56 shows only the principal parts of the channel service provision site 2 according to the embodiment of the present invention. Accordingly, configuration elements other than the above diagrammatic representation and explanation are omitted. In addition, the system of this FIG. 56 is an example of the case in which the channel service provision site 2 provides information of the channel to a client terminal 10.

The client terminals 10 are user terminals, such as, for example, personal computers, video game units connectable to the Internet, portable type information devices including a portable telephone, and so forth.

The Web sites 9 are various kinds of plural sites existing on the Internet.

The channel service provision site 2 is provided with a server 7, a site information database 4, a client information database 5, a channel information database 6, a channel generating unit 3 and so forth as its principal configuration elements.

The server 7 executes connection control for the Internet 1, transmission/reception control of information sent from the client terminals 10 or of information about channels and sites provided to the client terminals 10, information collection from respective Web sites 9 (for example, information extraction from a page header and so forth), information collection from the client terminals (for example, information of the adjustment values of a graphic equalizer and so forth), and/or control and/or supervision of writing data to or reading data from the site information database 4, client information database 5, and channel information database 6.

The site information database 4 maintains, for example, information about URLs (IP addresses) of respective Web sites 9 on the Internet, details and kinds of contents that the respective Web sites 9 provide, the number of accesses or the update condition of the respective sites, the number of pages of the respective sites, the file size of pages and so forth, after composing the database thereof.

The client information database 5 maintains information (for example, the adjustment values of a graphic equalizer and so forth) of the client terminals 10 having accessed the server 7 via the Internet 1, or utilization registration information of the client terminals undergoing the provision of the information perusal service of the present embodiment, after composing the database thereof.

The channel generating unit 3 classifies the respective Web sites in every channel while using the site information of the respective Web sites 9 accumulated in the site information database 4. In addition, the channel generating unit 3 generates, if necessary, original channels of respective users depending on the adjustment values of the graphic equalizer that are accumulated in the client information database 5, and generates preset values of the graphic equalizer.

The channel information database 6 maintains information of channels (including original channels or preset values or so forth) generated by the channel generating unit 3. The channel information prepared in the channel information database 6 is read out by the server 7 when requested by the client terminals 10 via the Internet 1. Then the read out information is sent to those client terminals 10. As a result, the client terminals 10 permit channel display and perusal of the sites and so forth, which are explained in the above embodiment.

Configuration of Client Terminal

Figure 57:
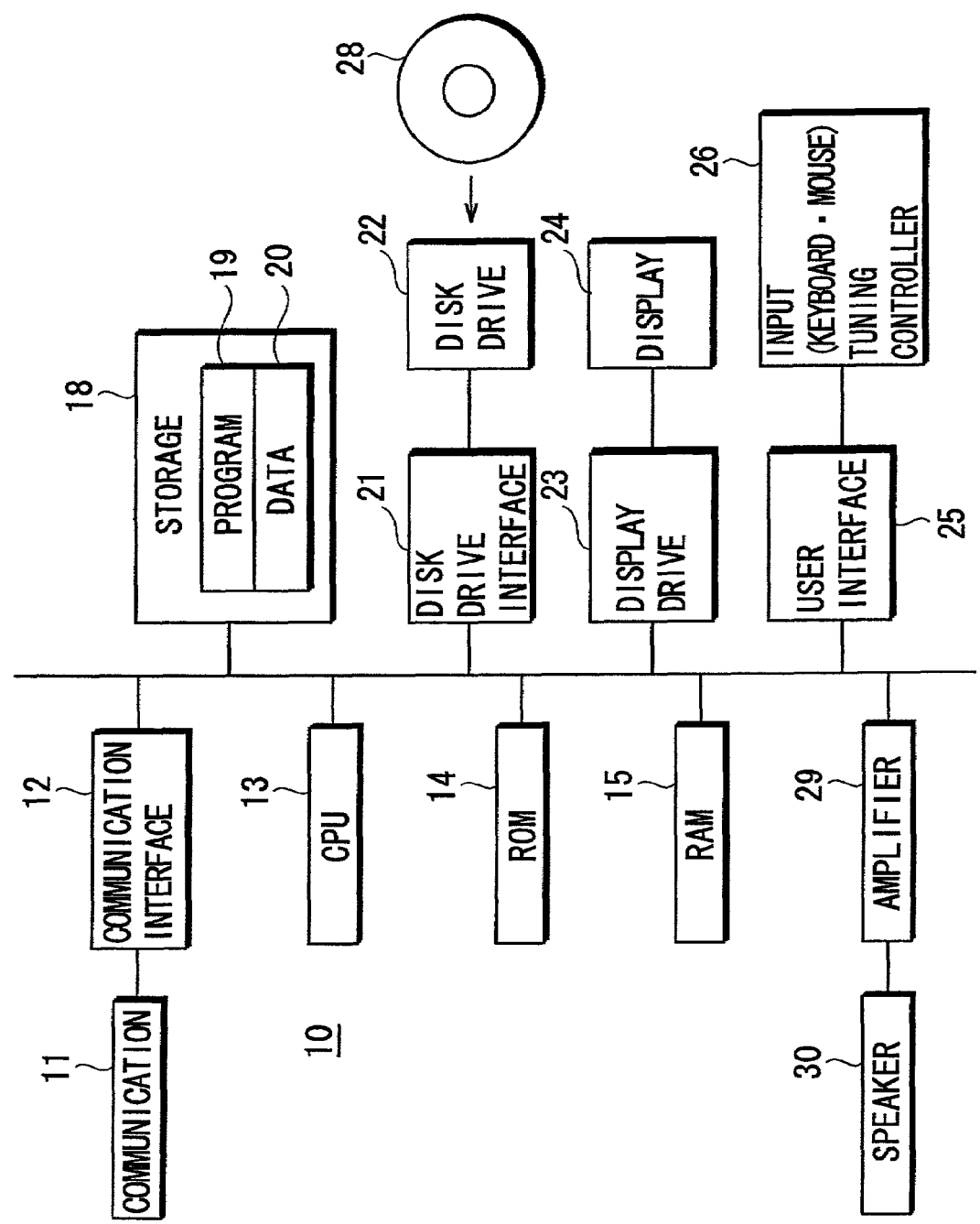
FIG. 57 is a block diagram illustrating an exemplary configuration of a client terminal.

FIG. 57 illustrates an example configuration of the client terminal 10 of the present embodiment. It should be noted that FIG. 57 illustrates only the configuration of the principal portion in the case that a personal computer is used as a client terminal 10.

In FIG. 57, a storage unit 18 is composed of, for example, a hard disk and a drive thereof. The hard disk is provided with at least a program accumulation area 19 and a data accumulation area 20. The program accumulation area 19 accumulates an operating system program, an information perusal program for realizing software-based information perusal processing in accordance with the present embodiment, an information generation program for the case in which channel generation is carried out at the client terminal side, and other application programs. The data accumulation area 20 accumulates, for example, setting data of the user or adjustment values of the graphic equalizer, and other data to be stored temporarily. The information perusal program, the information generation program and/or the other application programs are read out from various kinds of recording media, such as, for example, CD-ROMs, DVD-ROMs or so forth, or the above programs are received via a communications line. These programs are then accumulated in the program accumulation area 19.

Communication unit 11 is a communication device for executing data communication while connected to, for example, an analog public telephone line, a cable television network, or an optical digital communication line. Communication interface 12 is an interface device for executing protocol conversion in order to permit the exchange of data between the communication unit 11 and an internal bus (BUS). The client terminal 10 permits, for example, connection, retrieval, perusal to/of the Internet, transmission/reception of electronic mail and so forth. In addition, the client terminal 10 permits the information perusal program, the information generation program and so forth to be downloaded due to the communication unit 11 and communication interface 12.

Drive 22 is a drive device capable of reading various kinds of programs or data including the information perusal program or information generation program from a disk medium 28, such as, for example, a CD-ROM, a DVD-ROM, a floppy disk and so forth, from a semiconductor memory with a card shape, and so forth. Drive interface 21 is an interface device for providing signals from the drive 22 to connected devices.

Input unit 26 is a general input unit composed of, for example, a keyboard and/or a mouse, touch pad, jog dial and so forth, or a tuning controller or so forth. Namely, the input unit 26 is used for not only general input operations in the personal computer, but also the input section is used when the tuning position TP of FIG. 2 is made to move within the channel on the occasion of information perusal, and when the user selects the channel, sets the zooming-level, sets the operation of fine tuning, or so forth. User interface 25 is an interface device for providing signals from the input unit 26 to connected devices.

It should be noted that this FIG. 57 takes a personal computer as the client terminal 10, for example. However, of course, the client terminal 10 is not limited to a personal computer, so it is alternatively possible that the client terminal 10 may be various kinds of portable information terminals including, for example, portable telephones, video game units or so forth. If the client terminal is a portable information terminal or a video game unit, the tuning controller is the input device (for example, a joy stick or controller of the game unit) provided for the portable terminal or video game unit. In addition, the tuning controller of the input unit 26 may be a dedicated input device provided with a shape and function, such as the dial for selecting the station of a reception channel provided on an analog radio receiver.

Display 24 is a display device, such as, for example, a CRT (cathode ray tube), a liquid crystal display or so forth, and display drive 23 is a drive device for driving the display 24. In the case of the present embodiment, the client terminal shows a screen display as explained in FIG. 5 or FIG. 6 or so forth on the display screen of the display 24.

A speaker 30 is an electricity-voice conversion means for converting electrical signals into sound signals. In the case of the present embodiment, if a page involves sound, the speaker 30 outputs the sound of the page. An amplifier 29 amplifies the sound signal to drive the speaker 30.

A CPU 13 controls the entire operation of the personal computer to be the client terminal 10 on the basis of the operating system program, the information generation program and the information perusal program stored in the storage unit 18.

ROM 14 is a rewritable nonvolatile memory, such as, for example, a flash memory and so forth, and stores therein a BIOS (Basic Input/Output System) or various kinds of initial setting values. RAM 15 loads the application program read out from the hard disk of the storage unit 18 or a program of the present embodiment. The RAM 15 is also used as the working memory of the CPU 13.

In the configuration illustrated in FIG. 57, the CPU 13 executes the information generation program or information perusal program that is an application program read out from the hard disk of the storage unit 18 and then loaded on the RAM 15, so that the CPU 13 carries out processing of the above-described information perusal and generation of channels and so forth if necessary.

As described above, when carrying out perusal and so forth of a site existing on the Internet, the user does not specify a URL, but rather specifies a desired position TP (tuning position TP) within a channel. The tuning position TP exists within a channel in which the tuning position TP has a virtual spread. Therefore, the user is capable of perusing the sites included in this virtual spread simultaneously and easily.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

For example, there may be more than one channel service provision site. In addition, the present invention is also applicable to a plurality of systems connected to a network. In addition, the present invention is usable not only for a browser for perusing sites existing on the Internet, but is also usable for a browser for retrieving and/or perusing details of local files, for example. The browser to which the present invention is applied deals with the directory of the local files as one channel. As a result, the user is able to peruse files with analog-based perusal. In addition, the user is able to peruse very easily the directory of preserving, for example, digital image data.

According to the present invention, information whose storage position is uniquely specified is arranged within a virtual space in which the position of the information is specified within the virtual space, and an arrangement position included in an area having a virtual spread in relation to the specified position is detected. Then information corresponding to the arrangement position is acquired. Therefore, when a user acquires the information, he or she does not need to exactly specify the storage position. Further, the user can acquire information without inputting the storage position accurately. Consequently, according to the present invention, information whose storage position is uniquely specified, such as, for example, a site on the Internet, or local folder and file, or so forth is capable of being perused easily without executing an input operation that is complex and complicated in order to specify the storage position. In addition, it is possible to easily realize perusal of information without a specific object.

The invention claimed is:

1. A method for perusing information, said method comprising:

detecting a user-specified position within a virtual space, the user-specified position being movable within the virtual space, the virtual space being a multidimensional space of at least three dimensions and including a plurality of indicators located at a plurality of positions whereby a given one of the plurality of indicators is located at a specific one of the plurality of positions, the given one of the plurality of indicators representing particular information stored at a unique one of a plurality of storage locations;

detecting whether at least one of the plurality of indicators is located within a virtual spread that encloses the user-specified position;

when a respective one of the plurality of indicators is detected within the virtual spread, acquiring first information represented by the respective one of the plurality of indicators, determining a relation within the virtual space between the user-specified position and the respective one of the plurality of indicators, including determining a distance within the virtual space between the user-specified position and the respective one of the plurality of indicators, and presenting first website content contained within the acquired first information including displaying an image depicting a first page of the first website content on a screen based on the relation, wherein said presenting step includes displaying the image depicting the first page of the first website content with a specified degree of transparency, the specified degree of transparency decreasing as the distance within the virtual space between the user-specified position and the respective one of the plurality of indicators increases; and when the respective one of the plurality of indicators and a further one of the plurality of indicators are detected within the virtual spread, said acquiring step includes acquiring second information represented by the further one of the plurality of indicators, and said presenting step includes concurrently displaying the image depicting the first page of the first website content contained within the acquired first information and a further image depicting a first page of second website content contained within the acquired second information.

2. The method for perusing information according to claim 1, wherein said step of determining the relation includes determining a direction within the virtual space from the user-specified position to the respective one of the plurality of indicators, and said presenting step includes displaying the image depicting the first page of the first website content arranged on the screen based on the detected direction.

3. The method for perusing information according to claim 1, further comprising:

displaying further images depicting at least the virtual space, the respective one of the plurality of indicators within the virtual space, and the user-specified position within the virtual space.

4. The method for perusing information according to claim 1, further comprising:

changing a detectable range within the virtual space in which a portion of the plurality of locations is detectable; and changing the number of indicators within a portion of the plurality of indicators that is detectable within the virtual spread in response to the change in the detectable range.

5. A method for perusing information, said method comprising:

detecting a user-specified position within a virtual space, the user-specified position being movable within the virtual space, the virtual space being a multidimensional space of at least three dimensions and including a plurality of indicators located at a plurality of positions whereby a given one of the plurality of indicators is located at a specific one of the plurality of positions, the given one of the plurality of indicators representing particular information stored at a unique one of a plurality of storage locations;

detecting whether at least one of the plurality of indicators is located within a virtual spread that encloses the user-specified position;

when a respective one of the plurality of indicators is detected within the virtual spread, acquiring first information represented by the respective one of the plurality of indicators, determining a relation within the virtual space between the user-specified position and the respective one of the plurality of indicators, including determining a distance within the virtual space between the user-specified position and the respective one of the plurality of indicators; and presenting first website content contained within the acquired first information including displaying an image depicting a first page of the first website content on a screen based on the relation, wherein said presenting step includes displaying the image depicting the first page of the first website content at a specified angle, the specified angle increasing as the distance within the virtual space between the user-specified position and the respective one of the plurality of indicators increases; and when the respective one of the plurality of indicators and a further one of the plurality of indicators are detected within the virtual spread, said acquiring step includes acquiring second information represented by the further one of the plurality of indicators, and said presenting step includes concurrently displaying the image depicting the first page of the first website content contained within the acquired first information and a further image depicting a first page of second website content contained within the acquired second information.

6. The method for preusal information according to claim 5, wherein said step of determining the relation includes determining a direction within the virtual space from the user-specified position to the respective one of the plurality of indicators; and the image depicting the first page of the first website content on the screen is arranged on the screen based on the detected direction.

7. The method for preusal information according to claim 5, further comprising:

displaying further images depicting at least the virtual space, the respective one of the plurality of indicators within the virtual space, and the user-specified position within the virtual space.

8. The method for preusal information according to claim 5, further comprising:

changing a detectable range within the virtual space in which a portion of the plurality of locations is detectable; and changing the number of indicators within a portion of the plurality of indicators that is detectable within the virtual spread in response to the change in the detectable range.

9. An information perusing apparatus, comprising:

a position detecting unit operable to detect a user-specified position within a virtual space, the user-specified position being movable within the virtual space, the virtual space being a multidimensional space of at least three dimensions and including a plurality of indicators located at a plurality of positions whereby a given one of the plurality of indicators is located at a specific one of the plurality of positions, the given one of the plurality of indicators representing particular information stored at a unique one of a plurality of storage locations;

an arrangement position detecting unit operable to detect whether at least one of the plurality of indicators is located within a virtual spread that encloses the user-specified position;

an information acquiring unit operable to acquire, when a respective one of the plurality of indicators is detected within the virtual spread, first information represented by the respective one of the plurality of indicators;

a presenting unit operable to present first website content contained within the acquired first information; and a relation determining unit operable to determine a relation within the virtual space between the user-specified position and the respective one of the plurality of indicators, wherein said relation determining unit is operable to determine a distance within the virtual space between the user-specified position and the respective one of the plurality of indicators, said presenting unit includes a display unit operable to display an image depicting a first page of the first website content on a screen based on the relation, said display unit being operable to display the image depicting the first page of the first website content with a specified degree of transparency, the specified degree of transparency decreasing as the distance within the virtual space between the user-specified position and the given one of the plurality of indicators increases;

said information acquiring unit being operable to acquire, when the respective one of the plurality of indicators and a further one of the plurality of indicators are detected within the virtual spread, second information represented by the further one of the plurality of indicators, and said display unit being operable to concurrently present the image depicting the first page of the first website content contained within the acquired first information and a further image depicting a first page of second website content contained within the acquired second information.

10. The information perusing apparatus according to claim 9, wherein said relation determining unit is operable to determine a direction within the virtual space from the user-specified position to the respective one of the plurality of indicators, and said display unit is operable to display the image depicting the first page of the first website content arranged on the screen based on the detected direction.

11. The information perusing apparatus according to claim 9, further comprising:
a display unit operable to display further images depicting at least the virtual space, the respective one of the plurality of indicators within the virtual space, and the user-specified position within the virtual space.

12. The information perusing apparatus according to claim 9, further comprising:
a range changing unit operable to change a detectable range within the virtual space in which a portion of the plurality of locations is detectable; and
a number of indicators changing unit operable to change the number of indicators within a portion of the plurality of indicators that is detectable within the virtual spread in response to the change in the detectable range.

13. An information perusing apparatus, comprising:
a position detecting unit operable to detect a user-specified position within a virtual space, the user-specified position being movable within the virtual space, the virtual space being a multidimensional space of at least three dimensions and including a plurality of indicators located at a plurality of positions whereby a given one of the plurality of indicators is located at a specific one of the plurality of positions, the given one of the plurality of indicators representing particular information stored at a unique one of a plurality of storage locations;
an arrangement position detecting unit operable to detect whether at least one of the plurality of indicators is located within a virtual spread that encloses the user-specified position;
an information acquiring unit operable to acquire, when a respective one of the plurality of indicators is detected within the virtual spread, first information represented by the respective one of the plurality of indicators;
a presenting unit operable to present first website content contained within the acquired first information; and
a relation determining unit operable to determine a relation within the virtual space between the user-specified position and the respective one of the plurality of indicators, wherein
said relation determining unit is operable to determine a distance within the virtual space between the user-specified position and the respective one of the plurality of indicators,
said presenting unit includes a display unit operable to display an image depicting a first page of the first website content on a screen based on the relation, said display unit being operable to display the image depicting the first page of the first website content at a specified angle, the specified angle increasing as the distance within the virtual space between the user-specified position and the given one of the plurality of indicators increases;
said information acquiring unit being operable to acquire, when the respective one of the plurality of indicators and a further one of the plurality of indicators are detected within the virtual spread, second information represented by the further one of the plurality of indicators, and
said display unit being operable to concurrently present the image depicting the first page of the first website content contained within the acquired first information and a further image depicting the first page of second website content contained within the acquired second information.

14. The information perusing apparatus according to claim 13, wherein
said relation determining unit is operable to determine a direction within the virtual space from the user-specified position to the respective one of the plurality of indicators, and
said display unit is operable to display the image depicting the first page of the first website content arranged on the screen based on the detected direction.

15. The information perusing apparatus according to claim 13, further comprising
a display unit operable to display further images depicting at least the virtual space, the respective one of the plurality of indicators within the virtual space, and the user-specified position within the virtual space.

16. The information perusing apparatus according to claim 13, further comprising
a range changing unit operable to change a detectable range within the virtual space in which a portion of the plurality of locations is detectable; and
a number of indicators changing unit operable to change the number of indicators within a portion of the plurality of indicators that is detectable within the virtual spread in response to the change in the detectable range.

17. A method for generating and perusing information, said method comprising:
collecting information stored at a plurality of storage locations;
generating a virtual space in which a plurality of indicators is located at a plurality of positions whereby a given one of the plurality of indicators is located at a specific one of the plurality of positions, the virtual space being of at least three dimensions, the given one of the plurality of indicators representing a particular portion of the collected information stored at a unique one of the plurality of storage locations;
generating perusal information to be used when perusing the collected information from the virtual space;
detecting a user-specified position within the virtual space, the user-specified position being movable within the virtual space and being included in the perusal information;
detecting whether at least one of the plurality of indicators is located within a virtual spread that encloses the user-specified position;
when a respective one of the plurality of indicators is detected within the virtual spread,
acquiring first information represented by the respective one of the plurality of indicators,
determining a relation within the virtual space between the user-specified position and the respective one of the plurality of indicators, including determining a distance within the virtual space between the user-specified position and the respective one of the plurality of indicators, and
presenting first website content contained within the acquired first information including displaying an image depicting a first page of the first website content on a screen based on the relation, wherein said presenting step includes displaying the image depicting the first page of the first website content with a specified degree of transparency or at a specified angle, the specified degree of transparency decreasing or the specified angle increasing as the distance within the virtual space between the user-specified position and the respective one of the plurality of indicators increases; and when the respective one of the plurality of indicators and a further one of the plurality of indicators are detected within the virtual spread, said acquiring step includes acquiring the first information represented by the respective one of the plurality of indicators and second information represented by the further one of the plurality of indicators, and said presenting step includes concurrently presenting the first website content contained within the acquired first information and second website content contained within the acquired second information.

18. The method for generating and perusing information according to claim 17, wherein the collected information includes Metadata representing content contained in the collected information;

said collecting step includes extracting the Metadata from the collected information; and said step of generating the virtual space includes:

classifying the portions of the collected information based on the Metadata extracted from that portion of the collected information, and placing the given one of the plurality of indicators at the unique one of the plurality of positions based on the classification of the portion of the collected information represented by the given one of the plurality of indicators.

19. The method for generating and perusing information according to claim 17, further comprising:

collecting user favorite information;

wherein said step of generating the virtual space includes adjusting the number of indicators located within the virtual space based on the collected user favorite information.

20. An information generation and perusal system, comprising:

an information generating apparatus; and an information perusing apparatus;

said information generating apparatus including:

an information collecting unit operable to collect information stored at a plurality of storage locations, a space generating unit operable to generate a virtual space in which a plurality of indicators is located at a plurality of positions whereby a given one of the plurality of indicators is located at a specific one of the plurality of positions, the virtual space being of at least three dimensions, the given one of the plurality of indicators representing a particular portion of the collected information stored at a unique one of the plurality of storage locations, an information generating unit operable to generate perusal information to be used when perusing the collected information from the virtual space, and an information storage unit operable to store the perusal information; and said information perusing apparatus including:

a perusal information acquiring unit operable to acquire the perusal information from the information storage unit of the information generating apparatus, a position detecting unit operable to detect a user-specified position within the virtual space, the user-specified position being movable within the virtual space and being included in the perusal information, an arrangement position detecting unit operable to detect whether at least one of the plurality of indicators is located within a virtual spread that encloses the user-specified position, an information acquiring unit operable to acquire, when a respective one of the plurality of indicators is detected within the virtual spread, first information represented by the respective one of the plurality of indicators, a presenting unit operable to present first website content contained within the acquired first information, and a relation determining unit operable to determine a relation within the virtual space between the user-specified position and the respective one of the plurality of indicators, wherein said relation determining unit is operable to determine a distance within the virtual space between the user-specifiedspecified position and the respective one of the plurality of indicators and said presenting unit includes a display unit operable to display an image depicting a first page of the first website content on a screen based on the relation, said display unit being operable to display the image depicting the first page of the first website content with a specified degree of transparency or at a specified angle, the specified degree of transparency decreasing or the specified angle increasing as the distance within the virtual space between the user-specified position and the given one of the plurality of indicators increases;

said information acquiring unit being operable to acquire, when the respective one of the plurality of indicators and a further one of the plurality of indicators are detected within the virtual spread, the first information represented by the respective one of the plurality of indicators and second information represented by the further one of the plurality of indicators, said presenting unit being operable to concurrently present the first website content contained within the acquired first information and second website content contained within the acquired second information.

21. The information generation and perusal system according to claim 20, wherein the collected information includes Metadata representing contents of the collected information;

said information collecting unit is operable to extract the Metadata from the collected information; and said space generating unit is operable to classify the portions of the collected information based on the Metadata extracted from that portion of the collected information and to place the given one of the plurality of indicators at the unique one of the plurality of positions based on the classification of the portion of the collected information represented by the given one of the plurality of indicators.

22. The information generation and perusal system according to claim 20, further comprising:

a favorite information collecting unit operable to collect user favorite information;

wherein the space generating unit is operable to adjust the number of indicators located within the virtual space based on the collected user favorite information.

23. A computer-readable recording medium having recorded thereon instructions for carrying out a method for perusing information, said method comprising:

detecting a user-specified position within a viitual space, the user-specified position being movable within the virtual space, the virtual space being a multidimensional space of at least three dimensions and including a plurality of indicators located at a plurality of positions whereby a given one of the plurality of indicators is located at a specific one of the plurality of positions, the given one of the plurality of indicators representing particular information stored at a unique one of a plurality of storage locations;

detecting whether at least one of the plurality of indicators is located within a virtual spread that encloses the user-specified position;

when a respective one of the plurality of indicators is detected within the virtual spread, acquiring first information represented by the respective one of the plurality of indicators, determining a relation within the virtual space between the user-specified position and the respective one of the plurality of indicators, including determining a distance within the virtual space between the user-specified position and the respective one of the plurality of indicators, and presenting first website content contained within the acquired first information including displaying an image depicting a first page of the first website content on a screen based on the relation, wherein said presenting step includes displaying the image depicting the first page of the first website content with a specified degree of transparency, the specified degree of transparency decreasing as the distance within the virtual space between the user-specified position and the respective one of the plurality of indicators increases; and when the respective one of the plurality of indicators and a further one of the plurality of indicators are detected within the virtual spread, said acquiring step includes acquiring second information represented by the further one of the plurality of indicators, and said presenting step includes concurrently displaying the image depicting the first page of the first website content contained within the acquired first information and a further image depicting a first page of second website content contained within the acquired second information.

24. The computer-readable recording medium according to claim 23, wherein said step of determining the relation includes determining a direction within the virtual space from the user-specified position to the respective one of the plurality of indicators, and said presenting step includes displaying the image depicting the first page of the first website content arranged on the screen based on the detected direction.

25. The computer-readable recording medium according to claim 23, wherein said method further comprises:

displaying further images depicting at least the virtual space, the respective one of the plurality of indicators within the virtual space, and the user-specified position within the virtual space.

26. The computer-readable recording medium according to claim 23, wherein said method further comprises:

changing a detectable range within the virtual space in which a portion of the plurality of locations is detectable; and changing the number of indicators within a portion of the plurality of indicators that is detectable within the virtual spread in response to the change in the detectable range.

27. A computer-readable recording medium having recorded thereon instructions for carrying out a method for perusing information, said method comprising:

detecting a user-specified position within a virtual space, the user-specified position being movable within the virtual space, the virtual space being a multidimensional space of at least three dimensions and including a plurality of indicators located at a plurality of positions whereby a given one of the plurality of indicators is located at a specific one of the plurality of positions, the given one of the plurality of indicators representing particular information stored at a unique one of a plurality of storage locations;

detecting whether at least one of the plurality of indicators is located within a virtual spread that encloses the user-specified position;

when a respective one of the plurality of indicators is detected within the virtual spread, acquiring first information represented by the respective one of the plurality of indicators, a relation within the virtual space between the user-specified position and the respective one of the plurality of indicators, including determining a distance within the virtual space between the user-specified position and the respective one of the plurality of indicators, and presenting first website content contained within the acquired first information including displaying an image depicting a first page of the first website content on a screen based on the relation, wherein said presenting step includes displaying the image depicting the first page of the first website content at a specified angle, the specified angle increasing as the distance within the virtual space between the user-specified position and the respective one of the plurality of indicators increases; and when the respective one of the plurality of indicators and a further one of the plurality of indicators are detected within the virtual spread, said acquiring step includes acquiring second information represented by the further one of the plurality of indicators, and said presenting step includes concurrently displaying the image depicting the first page of the first website content contained within the acquired first information and a further image depicting a first page of second website content contained within the acquired second information.

28. The computer-readable recording medium according to claim 27, wherein said step of determining the relation includes determining a direction within the virtual space from the user-specified position to the respective one of the plurality of indicators, and said presenting step includes displaying the image depicting the first page of the first website content arranged on the screen based on the detected direction.

29. The computer-readable recording medium according to claim 27, wherein said method further comprises:

displaying further images depicting at least the virtual space, the respective one of the plurality of indicators within the virtual space, and the user-specified position within the virtual space.

30. The computer-readable recording medium according to claim 27, wherein said method further comprises:
changing a detectable range within the virtual space in which a portion of the plurality of locations is detectable; and
changing the number of indicators within a portion of the plurality of indicators that is detectable within the virtual spread in response to the change in the detectable range.

31. A computer-readable recording medium having recorded thereon instructions for carrying out a method for generating and perusing information, said method comprising:
collecting information stored at a plurality of storage locations;
generating a virtual space in which a plurality of indicators is located at a plurality of positions whereby a given one of the plurality of indicators is located at a specific one of the plurality of positions, the virtual space being of at least three dimensions, the given one of the plurality of indicators representing a particular portion of the collected information stored at a unique one of the plurality of storage locations;
generating perusal information to be used when perusing the collected information from the virtual space;
detecting a user-specified position within the virtual space, the user-specified position being movable within the virtual space and being included in the perusal information;
detecting whether at least one of the plurality of indicators is located within a virtual spread that encloses the user-specified position;
when a respective one of the plurality of indicators is detected within the virtual spread,
acquiring first information represented by the respective one of the plurality of indicators,
determining a relation within the virtual space between the user-specified position and the respective one of the plurality of indicators, including determining a distance within the virtual space between the user-specified position and the respective one of the plurality of indicators, and
presenting first website content contained within the acquired first information including displaying an image depicting a first page of the first website content on a screen based on the relation, wherein said presenting step includes displaying the image depicting the first page of the first website content with a specified degree of transparency or at a specified angle, the specified degree of transparency decreasing or the specified angle increasing as the distance within the virtual space between the user-specified position and the respective one of the plurality of indicators increases; and
when the respective one of the plurality of indicators and a further one of the plurality of indicators are detected within the virtual spread,
said acquiring step includes acquiring the first information represented by the respective one of the plurality of indicators and second information represented by the further one of the plurality of indicators, and
said presenting step includes concurrently presenting the first website content contained within the acquired first information and second website content contained within the acquired second information.

32. The computer-readable recording medium according to claim 31, wherein
the collected information includes Metadata representing content contained in the collected information; and
said collecting step includes extracting the Metadata from the collected information; and
said step of generating the virtual space includes:
classifying the portions of the collected information based on the Metadata extracted from that portion of the collected information, and
placing the given one of the plurality of indicators at the unique one of the plurality of positions based on the classification of the portion of the collected information represented by the given one of the plurality of indicators.

33. The computer-readable recording medium according to claim 31, wherein said method further comprises:
collecting user favorite information;
wherein said step of generating the virtual space includes adjusting the number of indicators located within the virtual space based on the collected user favorite information.

34. A system, comprising:
a processor operable to execute instructions for carrying out a method for perusing information, said method comprising:
detecting a user-specified position within a virtual space, the user-specified position being movable within the virtual space, the virtual space being a multidimensional space of at least three dimensions and including a plurality of indicators located at a plurality of positions whereby a given one of the plurality of indicators is located at a specific one of the plurality of positions, the given one of the plurality of indicators representing particular information stored at a unique one of a plurality of storage locations;
detecting whether at least one of the plurality of indicators is located within a virtual spread that encloses the user-specified position;
when a respective one of the plurality of indicators is detected within the virtual spread,
acquiring first information represented by the respective one of the plurality of indicators,
determining a relation within the virtual space between the user-specified position and the respective one of the plurality of indicators, including determining a distance within the virtual space between the user-specified position and the respective one of the plurality of indicators, and
presenting first website content contained within the acquired first information including displaying an image depicting a first page of the first website content on a screen based on the relation, wherein said presenting step includes displaying the image depicting the first page of the first website content with a specified degree of transparency or at a specified angle, the specified degree of transparency decreasing or the specified angle increasing as the distance within the virtual space between the user-specified position and the respective one of the plurality of indicators increases; and
when the respective one of the plurality of indicators and a further one of the plurality of indicators are detected within the virtual spread, said acquiring step includes acquiring the first information represented by the respective one of the plurality of indicators and second information represented by the further one of the plurality of indicators, and said presenting step includes concurrently presenting the first website content contained within the acquired first information and second website content contained within the acquired second information.

35. A system, comprising:

a processor operable to execute instructions for carrying out a method for generating and perusing information, said method comprising:

collecting information stored at a plurality of storage locations, generating a virtual space in which a plurality of indicators is located at a plurality of positions whereby a given one of the plurality of indicators is located at a specific one of the plurality of positions, the virtual space being of at least three dimensions, the given one of the plurality of indicators representing a particular portion of the collected information stored at a unique one of the plurality of storage locations, generating perusal information to be used when perusing the collected information from the virtual space, detecting a user-specified position within the virtual space, the user-specified position being movable within the virtual space and being included in the perusal information, detecting whether at least one of the plurality of indicators is located within a virtual spread that encloses the user-specified position, when a respective one of the plurality of indicators is detected within the virtual spread, acquiring a first portion of the collected information represented by the respective one of the plurality of indicators, determining a relation within the virtual space between the user-specified position and the respective one of the plurality of indicators including determining a distance within the virtual space between the user-specified position and the respective one of the plurality of indicators, and presenting first website content contained within the acquired first portion of the collected information including displaying an image depicting a first page of the first website content on a screen based on the relation, wherein said presenting step includes displaying the image depicting the first page of the first website content with a specified degree of transparency or at a specified angle, the specified degree of transparency decreasing or the specified angle increasing as the distance within the virtual space between the user-specified position and the respective one of the plurality of indicators increases, and when the respective one of the plurality of indicators and a further one of the plurality of indicators are detected within the virtual spread, said acquiring step includes acquiring the first portion of the collected information represented by the respective one of the plurality of indicators and a second portion of the collected information represented by the further one of the plurality of indicators, and said presenting step includes concurrently presenting the first website content contained within the acquired first portion of the collected information and second website content contained within the acquired second portion of the collected information.

36. A method for generating and perusing information, said method comprising:

collecting information stored at a plurality of storage locations;

collecting user favorite information for each of a plurality of genres;

setting, based on the user favorite information, a plurality of adjustment values associated with the plurality of genres such that a given one of the plurality of adjustment values is associated with a particular one of the plurality of genres;

generating a plurality of virtual spaces associated with the plurality of genres such that a given one of the plurality of virtual spaces is associated with a specific one of the plurality of genres, each of the plurality of virtual spaces including an associated plurality of positions and an associated plurality of indicators whereby a given one of the associated plurality of indicators is located at a specific one of the plurality of positions associated with that virtual space, the given one of the plurality of indicators representing a particular portion of the collected information stored at a unique one of the plurality of storage locations in the virtual space, the number of indictors in the associated plurality of indicators being based on the adjustment value associated with the genre that is associated with the virtual space;

generating preusal information to be used when perusing the collected information from the virtual space;

detecting a user-specified position within the virtual space, the user-specified position being movable within the virtual space and being included in the perusal information;

detecting whether at least one of the plurality of indicators is located within a virtual spread that encloses the user-specified position;

when a respective one of the plurality of indicators is detected within the virtual spread, acquiring a first portion of the collected information represented by the respective one of the plurality of indicators, determining a relation within the virtual space between the user-specified position and the respective one of the plurality of indicators, including determining a distance within the virtual space between the user-specified position and the respective one of the plurality of indicators, and presenting first website content contained within the acquired first portion of the collected information including displaying an image depicting a first page of the first website content on a screen based on the relation, wherein said presenting step includes displaying the image depicting the first page of the first website content with a specified degree of transparency or at a specified angle, the specified degree of transparency decreasing or the specified angle increasing as the distance within the virtual space between the user-specified position and the respective one of the plurality of indicators increases;

when the respective one of the plurality of indicators and a further one of the plurality of indicators are detected within the virtual spread, said acquiring step includes acquiring the first portion of the collected information represented by the respective one of the plurality of indicators and a second portion of the collected information represented by the further one of the plurality of indicators, and said presenting step includes concurrently presenting the first website content contained within the acquired first portion of the collected information and second website content contained within the acquired second portion of the collected information.

37. An information generation and perusal system, comprising:
an information generating apparatus; and
an information perusing apparatus;
said information generating apparatus including:
an information collecting unit operable to collect information stored at a plurality of storage locations,
a favorite information collecting unit operable to collect user favorite information for each of a plurality of genres and to set, based on the user favorite information, a plurality of adjustment values associated with the plurality of genres such that a given one of the plurality of adjustment values is associated with a particular one of the plurality of genres,
a space generating unit operable to generate a plurality of virtual spaces associated with the plurality of genres such that a given one of the plurality of virtual spaces is associated with a specific one of the plurality of genres, each of the plurality of virtual spaces including an associated plurality of positions and an associated plurality of indicators whereby a given one of the associated plurality of indicators is located at a specific one of the plurality of positions associated with that virtual space, the given one of the plurality of indicators representing a particular portion of the collected information stored at a unique one of the plurality of storage locations in the virtual space, the number of indictors in the associated plurality of indicators being based on the adjustment value associated with the genre that is associated with the virtual space,
an information generating unit operable to generate pre-usal information to be used when perusing the collected information from the virtual space, and
an information storage unit operable to store the perusal information; and
said information perusing apparatus including:
a perusal information acquiring unit operable to acquire the perusal information from the information storage unit of the information generating apparatus,
a position detecting unit operable to detect a user-specified position within the virtual space, the user-specified position being movable within the virtual space and being included in the perusal information,
an arrangement position detecting unit operable to detect whether at least one of the plurality of indicators is located within a virtual spread that encloses the user-specified position,
an information acquiring unit operable to acquire, when a respective one of the plurality of indicators is detected within the virtual spread, a first portion of the collected information represented by the respective one of the plurality of indicators, and
a presenting unit operable to present first website content contained within the acquired first portion of the collected information, and
a relation determining unit operable to determine a relation within the virtual space between the user-specified position and the respective one of the plurality of indicators,
wherein said relation determining unit is operable to determine a distance within the virtual space between the user-specified position and the respective one of the plurality of indicators and said presenting unit includes a display unit operable to display an image depicting a first page of the first website content on a screen based on the relation, said display unit being operable to display the image depicting the first page of the first website content with a specified degree of transparency or at a specified angle, the specified degree of transparency decreasing of the specified angle increasing as the distance within the virtual space between the user-specified position and the given one of the plurality of indicators increases;
said information acquiring unit being operable to acquire, when the respective one of the plurality of indicators and a further one of the plurality of indicators are detected within the virtual spread, the first portion of the collected information represented by the respective one of the plurality of indicators and a second portion of the collected information represented by the further one of the plurality of indicators,
said presenting unit being operable to concurrently present the first website content contained within the acquired first portion of the collected information and second website content contained within the acquired second portion of the collected information.

38. A computer-readable recording medium having recorded thereon instructions for carrying out a method for generating and preusal information, said method comprising:
collecting information stored at a plurality of storage locations;
collecting user favorite information for each of a plurality of genres;
setting, based on the user favorite information, a plurality of adjustment values associated with the plurality of genres such that a given one of the plurality of adjustment values is associated with a particular one of the plurality of genres;
generating a plurality of virtual spaces associated with the plurality of genres such that a given one of the plurality of virtual spaces is associated with a specific one of the plurality of genres, each of the plurality of virtual spaces including an associated plurality of positions and an associated plurality of indicators whereby a given one of the associated plurality of indicators is located at a specific one of the plurality of positions associated with that virtual space, the given one of the plurality of indicators representing a particular portion of the collected information stored at a unique one of the plurality of storage locations in the virtual space, the number of indictors in the associated plurality of indicators being based on the adjustment value associated with the genre that is associated with the virtual space;
generating preusal information to be used when perusing the collected information from the virtual space;
detecting a user-specified position within the virtual space, the user-specified position being movable within the virtual space and being included in the perusal information;
detecting whether at least one of the plurality of indicators is located within a virtual spread that encloses the user-specified position;
when a respective one of the plurality of indicators is detected within the virtual spread,
acquiring a first portion of the collected information represented by the respective one of the plurality of indicators,
determining a relation within the virtual space between the user-specified position and the respective one of the plurality of indicators, including determining a distance within the virtual space between the user-specified position and the respective one of the plurality of indicators, and presenting first website content contained within the acquired first portion of the collected information including displaying an image depicting a first page of the first website content on a screen based on the relation, wherein said presenting step includes displaying the image depicting the first page of the first website content with a specified degree of transparency or at a specified angle, the specified degree of transparency decreasing or the specified angle increasing as the distance within the virtual space between the user-specified position and the respective one of the plurality of indicators increases;

when the respective one of the plurality of indicators and a further one of the plurality of indicators are detected within the virtual spread, said acquiring step includes acquiring the first portion of the collected information represented by the respective one of the plurality of indicators and a second portion of the collected information represented by the further one of the plurality of indicators, and said presenting step includes concurrently presenting the first website content contained within the acquired first portion of the collected information and second website content contained within the acquired second portion of the collected information.

39. A system, comprising:
a processor operable to execute instructions for carrying out method for generating and perusing information, said method comprising:
collecting information stored at a plurality of storage locations,
collecting user favorite information for each of a plurality of genres,
setting, based on the user favorite information, a plurality of adjustment values associated with the plurality of genres such that a given one of the plurality of adjustment values is associated with a particular one of the plurality of genres,
generating a plurality of virtual spaces associated with the plurality of genres such that a given one of the plurality of virtual spaces is associated with a specific one of the plurality of genres, each of the plurality of virtual spaces including an associated plurality of positions and an associated plurality of indicators whereby a given one of the associated plurality of indicators is located at a specific one of the plurality of positions associated with that virtual space, the given one of the plurality of indicators representing a particular portion of the collected information stored at a unique one of the plurality of storage locations in the virtual space, the number of indictors in the associated plurality of indicators being based on the adjustment value associated with the genre that is associated with the virtual space,
generating preusal information to be used when perusing the collected information from the virtual space,
detecting a user-specified position within the virtual space, the user-specified position being movable within the virtual space and being included in the perusal information,
detecting whether at least one of the plurality of indicators is located within a virtual spread that encloses the user-specified position, when a respective one of the plurality of indicators is detected within the virtual spread, acquiring a first portion of the collected information represented by the respective one of the plurality of indicators, determining a relation within the virtual space between the user-specified position and the respective one of the plurality of indicators, including determining a distance within the virtual space between the user-specified position and the respective one of the plurality of indicators, and presenting first website content contained within the acquired first portion of the collected information including displaying an image depicting a first page of the first website content on a screen based on the relation, wherein said presenting step includes displaying the image depicting the first page of the first website content with a specified degree of transparency or at a specified angle, the specified degree of transparency decreasing or the specified angle increasing as the distance within the virtual space between the user-specified position and the respective one of the plurality of indicators increases, when the respective one of the plurality of indicators and a further one of the plurality of indicators are detected within the virtual spread, said acquiring step includes acquiring the first portion of the collected information represented by the respective one of the plurality of indicators and a second portion of the collected information represented by the further one of the plurality of indicators, and said presenting step includes concurrently presenting the first website content contained within the acquired first portion of the collected information and second website content contained within the acquired second portion of the collected information.

40. A Themethod for perusing information, said method comprising:
detecting a user-specified position within a virtual space, the user-specified position being movable within the virtual space, the virtual space being a multidimensional space of at least three dimensions and including a plurality of indicators located at a plurality of positions whereby a given one of the plurality of indicators is located at a specific one of the plurality of positions, the given one of the plurality of indicators representing particular information stored at a unique one df a plurality of storage locations;
detecting whether at least one of the plurality of indicators is located within a virtual spread that encloses the user-specified position;
when a respective one of the plurality of indicators is detected within the virtual spread,
acquiring first information represented by the respective one of the plurality of indicators, and
presenting first website content contained within the acquired first information; and
when the respective one of the plurality of indicators and a further one of the plurality of indicators are detected within the virtual spread,
acquiring the first information represented by the respective one of the plurality of indicators and second information represented by the further one of the plurality of indicators,
determining a first relation within the virtual space between the user-specified position and the respective one of the plurality of indicators and determining a second relation within the virtual space between the user-specified position and the further one of the plurality of indicators, said determining step including determining a first distance within the virtual space between the user-specified position and the respective one of the plurality of indicators and determining a second distance within the virtual space between the user-specified position and the further one of the plurality of indicators, and
concurrently presenting the first website content contained within the acquired first information and second website content contained within the acquired second information including concurrently displaying a first image on a display based on the first relation and a second image on the display based on the second relation, the first image depicting a first web page of the first website content, and the second image depicting a first web page of the second website content, said concurrently presenting step including displaying the first image with a first degree of transparency and the second image a second degree of transparency, the first and second images overlapping, the first degree of transparency being based on the first distance and the second degree of transparency being based on the second distance such that the more transparent one of the first and second images indicates a greater distance from the user-specified position.

41. The method for perusing information according to claim 40, wherein
said determining step includes determining a first direction within the virtual space between the user-specified position and the respective one of the plurality of indicators and determining a second direction within the virtual space between the user-specified position and the further one of the plurality of indicators; and
said concurrently presenting step includes displaying the first image according to the first detected direction and displaying the second image according to the second detected direction.

42. A method for perusing information, said method comprising:
detecting a user-specified position within a virtual space, the user-specified position being movable within the virtual space, the virtual space being a multidimensional space of at least three dimensions and including a plurality of indicators located at a plurality of positions whereby a given one of the plurality of indicators is located at a specific one of the plurality of positions, the given one of the plurality of indicators representing particular information stored at a unique one of a plurality of storage locations;
detecting whether at least one of the plurality of indicators is located within a virtual spread that encloses the user-specified position;
when a respective one of the plurality of indicators is detected within the virtual spread,
acquiring first information represented by the respective one of the plurality of indicators, and
presenting first website content contained within the acquired first information; and
when the respective one of the plurality of indicators and a further one of the plurality of indicators are detected within the virtual spread,
acquiring the first information represented by the respective one of the plurality of indicators and second information represented by the further one of the plurality of indicators,
determining a first relation within the virtual space between the user-specified position and the respective one of the plurality of indicators and determining a second relation within the virtual space between the user-specified position and the further one of the plurality of indicators, said determining step including determining a first distance within the virtual space between the user-specified position and the respective one of the plurality of indicators and determining a second distance within the virtual space between the user-specified position and the further one of the plurality of indicators; and
concurrently presenting the first website content contained within the acquired first information and second website content contained within the acquired second information including concurrently displaying a first image on a display based on the first relation and a second image on the display based on the second relation, the first image depicting a first web page of the first website content, and the second image depicting a first web page of the second website content, said concurrently presenting step including displaying the first image at a first angle and displaying the second image at a second angle, the first angle being based on the first distance and the second angle being based on the second distance such that the greater one of the first and second angles indicates a greater distance from the user-specified position.

43. The method for preusal information according to claim 42, wherein
said determining step includes determining a first direction within the virtual space between the user-specified position and the respective one of the plurality of indicators and determining a second direction within the virtual space between the user-specified position and the further one of the plurality of indicators; and
said concurrently presenting step includes displaying the first image according to the first detected direction and displaying the second image according to the second detected direction.

44. An information perusing apparatus, comprising:
a position detecting unit operable to detect a user-specified position within a virtual space, the user-specified position being movable within the virtual space, the virtual space being a multidimensional space of at least three dimensions and including a plurality of indicators located at a plurality of positions whereby a given one of the plurality of indicators is located at a specific one of the plurality of positions, the given one of the plurality of indicators representing particular information stored at a unique one of a plurality of storage locations;
an arrangement position detecting unit operable to detect whether at least one of the plurality of indicators is located within a virtual spread that encloses the user-specified position;
an information acquiring unit operable to acquire, when a respective of the plurality of indicators is detected within the virtual spread, first information represented by the respective one of the plurality of indicators;
a presenting unit operable to present first website content contained within the acquired first information; and
a relation determining unit operable to determine, when the respective one of the plurality of indicators and a further one of the plurality of indicators are detected within the virtual spread, a first relation within the virtual space between the user-specified position and the respective one of the plurality of indicators and to determine a second relation within the virtual space between the user-specified position and the further one of the plurality of indicators, wherein said relation determining unit is operable to determine a first distance within the virtual space between the user-specified position and the respective one of the plurality of indicators and to determine a second distance within the virtual space between the user-specified position and the further one of the plurality of indicators, said information acquiring unit being operable to acquire the first information represented by the respetive one of the plurality of indicators and second information represented by the further one of the plurality of indicators, and said presenting unit being operable to concurrently present the first website content contained within the acquired first information and second website content contained within the acquired second information, wherein said presenting unit is operable to concurrently display a first image on a display based on the first relation and a second image on the display based on the second relation, the first image depicting a first web page of the first website content, and the second image depicting a first web page of the second website content, said presenting unit being operable to display the first image with a first degree of transparency and to display the second image with a second degree of transparency, the first and second images overlapping, the first degree of transparency being based on the first distance and the second degree of transparency being based on the second distance such that the more transparent one of the first and second images indicates a greater distance from the user-specified position.

45. The information perusing apparatus according to claim 44, wherein said relation determining unit is operable to determine a first distance within the virtual space between the user-specified position and the respective one of the plurality of indicators and to determine a second distance within the virtual space between the user-specified position and the further one of the plurality of indicators; and said display unit is operable to display the first image according to the first detected direction and to display the second image according to the second detected direction.

46. An information perusing apparatus, comprising:

a position detecting unit operable to detect a user-specified position within a virtual space, the user-specified position being movable within the virtual space, the virtual space being a multidimensional space of at least three dimensions and including a plurality of indicators located at a plurality of positions whereby a given one of the plurality of indicators is located at a specific one of the plurality of positions, the giver one of the plurality of indicators representing particular information stored at a unique one of a plurality of storage locations;

an arrangement position detecting unit operable to detect whether at least one of the plurality of indicators is located within a virtual spread that encloses the user-specified position;

an information acquiring unit operable to acquire, when a respective of the plurality of indicators is detected within the virtual spread, first information represented by the respective one of the plurality of indicators;

a presenting unit operable to present first website content contained within the acquired first information; and a relation determining unit operable to determine, when the respective one of the plurality of indicators and a further one of the plurality of indicators are detected within the virtual spread, a first relation within the virtual space between the user-specified position and the respective one of the plurality of indicators and to determine a second relation within the virtual space between the user-specified position and the further one of the plurality of indicators, wherein said relation determining unit is operable to determine a first distance within the virtual space between the user-specified position and the respective one of the plurality of indicators and to determine a second distance within the virtual space between the user-specified position and the further one of the plurality of indicators, said information acquiring unit being operable to acquire the first information represented by the respective one of the plurality of indicators and second information represented by the further one of the plurality of indicators, and said presenting unit being operable to concurrently present the first website content contained within the acquired first information and second website content contained within the acquired second information, wherein said presenting unit is operable to concurrently display a first image on a display based on the first relation and a second image on the display based on the second relation, the first image depicting a first web page of the first website content, and the second image depicting a first web age of the second website content, said presenting unit being operable to display the first image at a first angle and to display the second image at a second angle, the first angle being based on the first distance and the second angle being based on the second distance such that the greater one of the first and second angles indicates a greater distance from the user-specified position.

47. The information perusing apparatus according to claim 46, wherein said relation determining unit is operable to determine a first direction within the virtual space between the user-specified position and the respective one of the plurality of indicators and to determine a second direction within the virtual space between the user-specified position and the further one of the plurality of indicators; and said display unit is operable to display the first image according to the first detected direction and to display the second image according to the second detected direction.

48. A computer-readable recording medium having recorded thereon instructions for carrying out a method for preusal information, said method comprising:

detecting a user-specified position within a virtual space, the user-specified position being movable within the virtual space, the virtual space being a multidimensional space of at least three dimensions and including a plurality of indicators located at a plurality of positions whereby a given one of the plurality of indicators is located at a specific one of the plurality of positions, the given one of the plurality of indicators representing particular information stored at a unique one of a plurality of storage locations;

detecting whether at least one of the plurality of indicators is located within a virtual spread that encloses the user-specified position;

when a respective one of the plurality of indicators is detected within the virtual spread,
acquiring first information represented by the respective one of the plurality of indicators, and
presenting first website content contained within the acquired first information; and
when the respective one of the plurality of indicators and a further one of the plurality of indicators are detected within the virtual spread,
acquiring the first information represented by the respective one of the plurality of indicators and second information represented by the further one of the plurality of indicators,
determining a first relation within the virtual space between the user-specified position and the respective one of the plurality of indicators and determining a second relation within the virtual space between the user-specified position and the further one of the plurality of indicators, said determining step including determining a first distance within the virtual space between the user-specified position and the respective one of the plurality of indicators and determining a second distance within the virtual space between the user-specified position and the further one of the plurality of indicators, and
concurrently presenting the first website content contained within the acquired first information and second website content contained within the acquired second information including concurrently displaying a first image on a display based on the first relation and a second image on the display based on the second relation, the first image depicting a first web page of the first website content, and the second image depicting a first web page of the second website content, said concurrently presenting step including displaying the first image with a first degree of transparency and the second image with a second degree of transparency, the first and second images overlapping, the first degree of transparency being based on the first distance and the second degree of transparency being based on the second distance such that the more transparent one of the first and second images indicates a greater distance from the user-specified position.

49. The computer-readable recording medium according to claim 48, wherein
said determining step includes determining a first direction within the virtual space between the user-specified position and the respective one of the plurality of indicators and determining a second direction within the virtual space between the user-specified position and the further one of the plurality of indicators; and
said concurrently presenting step includes displaying the first image according to the first detected direction and displaying the second image according to the second detected direction.

50. A computer-readable recording medium having recorded thereon instructions for carrying out a method for preusal information, said method comprising:
detecting a user-specified position within a virtual space, the user-specified position being movable within the virtual space, the virtual space being a multidimensional space of at least three dimensions and including a plurality of indicators located at a plurality of positions whereby a given one of the plurality of indicators is located at a specific one of the plurality of positions, the given one of the plurality of indicators representing particular information stored at a unique one of a plurality of storage locations;
detecting whether at least one of the plurality of indicators is located within a virtual spread that encloses the user-specified position;
when a respective one of the plurality of indicators is detected within the virtual spread,
acquiring first information represented by the respective one of the plurality of indicators, and
presenting first website content contained within the acquired first information; and
when the respective one of the plurality of indicators and a further one of the plurality of indicators are detected within the virtual spread,
acquiring the first information represented by the respective one of the plurality of indicators and second information represented by the further one of the plurality of indicators,
determining a first relation within the virtual space between the user-specified position and the respective one of the plurality of indicators and determining a second relation within the virtual space between the user-specified position and the further one of the plurality of indicators, said determining step including determining a first distance within the virtual space between the user-specified position and the respective one of the plurality of indicators and determining a second distance within the virtual space between the user-specified position and the further one of the plurality of indicators; and
concurrently presenting. the first website content contained within the acquired first information and second website content contained within the acquired second information including concurrently displaying a first image on a display based on the first relation and a second image on the display based on the second relation, the first image depicting a first web page of the first website content, and the second image depicting a first web page of the second website content, said concurrently presenting step including displaying the first image at a first angle and displaying the second image at a second angle, the first angle being based on the first distance and the second angle being based on the second distance such that the greater one of the first and second angles indicates a greater distance from the user-specified position.

51. The computer-readable recording medium according to claim 50, wherein
said determining step includes determining a first direction within the virtual space between the user-specified position and the respective one of the plurality of indicators and determining a second direction within the virtual space between the user-specified position and the further one of the plurality of indicators; and
said concurrently presenting step includes displaying the first image according to the first detected direction and displaying the second image according to the second detected direction.

* * * * *

UNITED STATES PATENT AND TRADEMARK OFFICE
CERTIFICATE OF CORRECTION

PATENT NO. : 7,290,213 B2  Page 1 of 1
APPLICATION NO. : 10/177399
DATED : October 30, 2007
INVENTOR(S) : Tomokazu Kake, Yousuke Kimoto and Tadashi Nakamura It is certified that error appears in the above-identified patent and that said Letters Patent is hereby corrected as shown below:

Column 44, line 30, before "a", insert --determining--.

Column 50, line 6, "of" should read --or--.

Column 51, line 32, after "out", insert --a--.

Column 52, line 35, "Themethod" should read --method--.

Column 52, line 45, "df" should read --of--.

Column 54, line 56, after "respective", insert --one--.

Column 55, line 36, "distance" should read --direction--.

Column 55, lines 38-39, "distance" should read --direction--.

Column 56, line 30, "age" should read --page--.

Signed and Sealed this

Eleventh Day of November, 2008

JON W. DUDAS
*Director of the United States Patent and Trademark Office*